US008732896B2

(12) United States Patent
Lucas et al.

(10) Patent No.: US 8,732,896 B2
(45) Date of Patent: May 27, 2014

(54) HYBRID ELECTRIC CLEANING DEVICE

(75) Inventors: Delbert E. Lucas, Bowling Green, KY (US); Justin Lucas, Stone Mountain, GA (US); Ryan J. Lucas, Atlanta, GA (US); Paul Brent Boyd, Bowling Green, KY (US); Lance Servais, Bowling Green, KY (US)

(73) Assignee: MTD Products Inc, Valley City, OH (US)

( * ) Notice: Subject to any disclaimer, the term of this patent is extended or adjusted under 35 U.S.C. 154(b) by 1650 days.

(21) Appl. No.: 12/077,079

(22) Filed: Mar. 14, 2008

(65) Prior Publication Data
US 2008/0284363 A1 Nov. 20, 2008

Related U.S. Application Data

(63) Continuation-in-part of application No. 11/906,546, filed on Oct. 1, 2007, now abandoned, and a continuation-in-part of application No. 11/906,541, filed on Oct. 1, 2007, now Pat. No. 7,884,560, each which is a continuation-in-part of application No. 11/899,616, filed on Sep. 5, 2007, now abandoned, which is a continuation-in-part of application No. 11/670,932, filed on Feb. 2, 2007, now Pat. No. 7,728,534, which is a continuation-in-part of application No. 11/550,476, filed on Oct. 18, 2006, now Pat. No. 7,482,768, which is a continuation-in-part of application No. 11/550,104, filed on Oct. 17, 2006, now Pat. No. 7,479,754.

(51) Int. Cl.
*A47L 5/00* (2006.01)

(52) U.S. Cl.
USPC .............................. 15/319; 15/339

(58) Field of Classification Search
USPC .................. 15/319, 339, 327.5, 345, 405

IPC ......................................................... A47L 5/00
See application file for complete search history.

(56) References Cited

U.S. PATENT DOCUMENTS

| 963,146 | A | 7/1910 | Harrison |
| 1,115,350 | A | 10/1914 | Vincent |

(Continued)

FOREIGN PATENT DOCUMENTS

| EP | 0024268A1 | A1 | 2/1981 |
| EP | 0639881B1 | A1 | 3/1997 |
| EP | 1110678A1 | A1 | 6/2001 |

OTHER PUBLICATIONS

International Search Report and Written Opinion mailed Apr. 8, 2008 for PCT/US2007/022101 filed Oct. 16, 2007.

(Continued)

*Primary Examiner* — David Redding
(74) *Attorney, Agent, or Firm* — Wegman, Hessler & Vanderburg

(57) ABSTRACT

A cleaning device includes a housing configured with a working element. The device also includes a motor configured for urging motion of the working element. The device also includes a power control module which may be electrically connected with at least one of the motor, a first power source configuration and a second power source configuration. Electric current is provided to the motor by the first and/or the second power source configurations. The first power source configuration may be electrically connected to a battery assembly having a DC power output. The second power source configuration may be electrically connected to a power inverter which may receive AC power and output DC power to the second power source configuration. The motor may be one of a permanent magnet DC (PMDC) motor, a universal motor and an induction motor, the motor receiving power via the power control module from at least one of the first power source configuration and the second power source configuration.

19 Claims, 45 Drawing Sheets

(56) References Cited

U.S. PATENT DOCUMENTS

| | | |
|---|---|---|
| 1,357,396 A | 11/1920 | Gater |
| 1,383,178 A | 6/1921 | Voges |
| 1,387,578 A | 8/1921 | Yost |
| 1,401,156 A | 12/1921 | Jenkins |
| 1,490,127 A | 4/1924 | Peters |
| 1,558,465 A | 10/1925 | Dahl |
| 1,567,055 A | 12/1925 | Huff |
| 1,603,637 A | 10/1926 | Ott |
| 1,643,656 A | 9/1927 | Haselton |
| 1,669,471 A | 5/1928 | Jones |
| 1,674,847 A | 6/1928 | Watson |
| 1,725,487 A | 8/1929 | Steinmetz et al. |
| 1,819,791 A | 8/1931 | Reed |
| 1,823,215 A | 9/1931 | Seal |
| 1,827,559 A | 10/1931 | Beazley |
| 1,829,690 A | 10/1931 | Turner |
| 1,866,380 A | 7/1932 | Wagner |
| RE18,944 E | 9/1933 | Beazley |
| 1,954,579 A | 4/1934 | Smith |
| 2,052,535 A | 8/1936 | Sherman |
| 2,053,535 A | 9/1936 | Schielein |
| D101,512 S | 10/1936 | Young et al. |
| 2,167,222 A | 7/1939 | Shelor |
| 2,185,659 A | 1/1940 | Chernow |
| 2,237,521 A | 4/1941 | Frazier |
| 2,298,135 A | 10/1942 | Klein |
| 2,417,613 A | 3/1947 | Radabaugh |
| 2,458,200 A | 1/1949 | Renfroe et al. |
| 2,469,022 A | 5/1949 | Walker et al. |
| D154,108 S | 6/1949 | Emmons |
| 2,480,944 A | 9/1949 | Malpass |
| 2,485,729 A | 10/1949 | Gentry |
| 2,496,022 A | 1/1950 | Remonte |
| 2,498,609 A | 2/1950 | Reil |
| 2,498,796 A | 2/1950 | Downer |
| D158,847 S | 6/1950 | Flanigan |
| 2,514,278 A | 7/1950 | Dunn et al. |
| 2,521,262 A | 9/1950 | Smith |
| 2,547,328 A | 4/1951 | Koch et al. |
| 2,549,317 A | 4/1951 | Laughlin |
| 2,554,790 A | 5/1951 | Miller |
| 2,592,856 A | 4/1952 | Brockman |
| 2,597,735 A | 5/1952 | Jepson |
| D167,129 S | 7/1952 | Abel et al. |
| D168,683 S | 1/1953 | Heineke |
| 2,633,688 A | 4/1953 | Yeck et al. |
| D172,807 S | 8/1954 | Rosenberg |
| D172,936 S | 8/1954 | Phelps |
| 2,690,892 A | 10/1954 | La Bar |
| 2,700,862 A | 2/1955 | Abel |
| 2,702,448 A | 2/1955 | Smith |
| 2,708,977 A | 5/1955 | Scheppe |
| 2,709,882 A | 6/1955 | Abel |
| 2,716,559 A | 8/1955 | Boyce |
| 2,724,229 A | 11/1955 | Graham |
| 2,728,182 A | 12/1955 | Fulton et al. |
| 2,763,116 A | 9/1956 | Flinchbaugh et al. |
| 2,766,573 A | 10/1956 | Shewmon |
| 2,770,085 A | 11/1956 | Laughlin |
| D179,511 S | 1/1957 | Graham et al. |
| 2,793,484 A | 5/1957 | McNeill et al. |
| 2,793,485 A | 5/1957 | Emmons et al. |
| RE24,594 E | 1/1959 | Smith |
| 2,867,960 A | 1/1959 | Stiles et al. |
| D184,861 S | 4/1959 | Ellies |
| 2,906,081 A | 9/1959 | Flanigan |
| 2,908,128 A | 10/1959 | Mauro |
| 2,909,885 A | 10/1959 | Smith |
| 2,926,478 A | 3/1960 | Jepson |
| 2,926,926 A | 3/1960 | Rowe et al. |
| 2,929,926 A | 3/1960 | Fibranz |
| 2,938,323 A | 5/1960 | Livingston et al. |
| 2,941,346 A | 6/1960 | Perry |
| 2,942,397 A | 6/1960 | Clark |
| 2,970,419 A | 2/1961 | Lieberman |
| 2,979,878 A | 4/1961 | Kaposta |
| 2,983,057 A | 5/1961 | Erickson |
| D191,675 S | 10/1961 | Ernest |
| 3,017,733 A | 1/1962 | Evans |
| D192,373 S | 3/1962 | Mascaro |
| D192,605 S | 4/1962 | Mascaro |
| 3,028,717 A | 4/1962 | West |
| 3,034,275 A | 5/1962 | Happe et al. |
| 3,035,386 A | 5/1962 | Jepson et al. |
| D193,197 S | 7/1962 | Czerwonky |
| 3,077,066 A | 2/1963 | Nokes |
| 3,128,840 A | 4/1964 | Barrett, Jr. |
| 3,144,258 A | 8/1964 | Ottosen et al. |
| 3,147,987 A | 9/1964 | Ritums |
| 3,212,244 A | 10/1965 | Wilgus |
| 3,217,824 A | 11/1965 | Jepson |
| 3,221,481 A | 12/1965 | Mattson et al. |
| 3,230,695 A | 1/1966 | West |
| 3,271,939 A | 9/1966 | Granger, Jr. et al. |
| 3,298,163 A | 1/1967 | Ottosen et al. |
| D207,230 S | 3/1967 | Stewart |
| D207,326 S | 4/1967 | Stewart |
| D207,721 S | 5/1967 | Stewart |
| D207,856 S | 6/1967 | Averitt et al. |
| 3,350,864 A | 11/1967 | Sheps et al. |
| 3,375,338 A | 3/1968 | Delf |
| D211,264 S | 6/1968 | Stewart et al. |
| 3,456,430 A | 7/1969 | Maloney |
| 3,481,123 A | 12/1969 | Lessig, III |
| 3,485,017 A | 12/1969 | Duran et al. |
| 3,485,018 A | 12/1969 | Beckering et al. |
| 3,485,418 A | 12/1969 | Webster |
| 3,496,706 A | 2/1970 | Mattson |
| 3,500,085 A | 3/1970 | Smith |
| 3,500,620 A | 3/1970 | Duran et al. |
| 3,525,912 A | 8/1970 | Wallin |
| D218,766 S | 9/1970 | Musichuk |
| 3,550,714 A | 12/1970 | Bellinger |
| 3,564,186 A | 2/1971 | Mittelstadt et al. |
| 3,570,226 A | 3/1971 | Haverkamp et al. |
| 3,570,227 A | 3/1971 | Bellinger |
| 3,581,480 A | 6/1971 | O'Connor, III et al. |
| 3,583,138 A | 6/1971 | Mattson |
| 3,586,275 A | 6/1971 | Mittelstadt et al. |
| 3,593,505 A | 7/1971 | Mittelstadt |
| 3,593,950 A | 7/1971 | Tetzlaff |
| D221,574 S | 8/1971 | Bunyea |
| 3,603,065 A | 9/1971 | Weber |
| 3,613,338 A | 10/1971 | Furtaw |
| 3,617,786 A | 11/1971 | Stielper |
| 3,631,659 A | 1/1972 | Horowitz |
| 3,641,749 A | 2/1972 | Dwyer, Jr. et al. |
| 3,657,868 A | 4/1972 | Cousino |
| 3,659,170 A | 4/1972 | Burkett et al. |
| 3,696,593 A | 10/1972 | Thorud et al. |
| 3,731,471 A | 5/1973 | Bening |
| 3,732,671 A | 5/1973 | Allen et al. |
| 3,733,794 A | 5/1973 | Allen |
| 3,789,939 A | 2/1974 | Geislinger |
| 3,800,902 A | 4/1974 | Keller |
| 3,809,975 A | 5/1974 | Bartels |
| 3,916,280 A | 10/1975 | Heindl |
| 3,924,389 A | 12/1975 | Kita |
| 3,948,024 A | 4/1976 | Allen et al. |
| 3,955,653 A | 5/1976 | Comer |
| 3,969,593 A | 7/1976 | Vlahos |
| 3,969,875 A | 7/1976 | Nofel |
| 3,970,913 A | 7/1976 | Heindl |
| 3,980,068 A | 9/1976 | Karsten et al. |
| 4,003,190 A | 1/1977 | Braun et al. |
| 4,008,423 A | 2/1977 | Christianson |
| 4,081,737 A | 3/1978 | Miyahara |
| D249,266 S | 9/1978 | Furuya |
| 4,145,864 A | 3/1979 | Brewster, Jr. |
| 4,178,741 A | 12/1979 | Lonn et al. |
| 4,181,206 A | 1/1980 | Seilenbinder |
| 4,236,494 A | 12/1980 | Fairchild |
| 4,244,160 A | 1/1981 | Carolan |
| 4,267,914 A | 5/1981 | Saar |

(56) References Cited

U.S. PATENT DOCUMENTS

| | | | |
|---|---|---|---|
| 4,292,571 A | 9/1981 | Cuneo | |
| 4,294,327 A | 10/1981 | Howard | |
| 4,307,325 A | 12/1981 | Saar | |
| 4,318,266 A | 3/1982 | Taube | |
| 4,321,523 A | 3/1982 | Hammel | |
| 4,333,302 A | 6/1982 | Thomas et al. | |
| 4,371,906 A | 2/1983 | Alessio et al. | |
| 4,412,158 A | 10/1983 | Jefferson et al. | |
| 4,430,604 A | 2/1984 | Loganbill et al. | |
| 4,447,786 A | 5/1984 | Saar et al. | |
| 4,489,267 A | 12/1984 | Saar et al. | |
| 4,503,370 A | 3/1985 | Cuneo | |
| 4,527,101 A | 7/1985 | Zavis et al. | |
| 4,536,757 A | 8/1985 | Ijntema | |
| 4,550,277 A | 10/1985 | Carney | |
| 4,628,233 A | 12/1986 | Bradus | |
| 4,764,715 A | 8/1988 | Kowalewski et al. | |
| 4,835,409 A * | 5/1989 | Bhagwat et al. | 307/64 |
| 4,870,811 A | 10/1989 | Steele | |
| 4,878,338 A | 11/1989 | Aldred et al. | |
| 4,887,415 A | 12/1989 | Martin | |
| 4,893,067 A | 1/1990 | Bhagwat et al. | |
| 4,905,300 A | 2/1990 | Bhagwat et al. | |
| RE33,376 E | 10/1990 | Gibbons et al. | |
| 4,964,265 A | 10/1990 | Young | |
| 4,987,729 A | 1/1991 | Paytas | |
| 4,990,843 A | 2/1991 | Moren et al. | |
| 5,028,853 A | 7/1991 | Brown, Jr. et al. | |
| 5,055,725 A | 10/1991 | LaSota | |
| 5,085,043 A | 2/1992 | Hess et al. | |
| 5,086,491 A | 2/1992 | Cuneo | |
| D330,210 S | 10/1992 | Sirois et al. | |
| 5,173,650 A | 12/1992 | Hedlund | |
| D333,309 S | 2/1993 | Hess et al. | |
| 5,203,147 A | 4/1993 | Long | |
| 5,208,519 A | 5/1993 | Dykstra et al. | |
| 5,227,710 A | 7/1993 | Lewus | |
| D342,425 S | 12/1993 | Watanabe et al. | |
| 5,301,494 A | 4/1994 | Peot et al. | |
| D346,810 S | 5/1994 | Schulz et al. | |
| D347,640 S | 6/1994 | Chunn et al. | |
| 5,321,939 A | 6/1994 | Fuse et al. | |
| 5,325,650 A | 7/1994 | Fuse et al. | |
| 5,379,991 A | 1/1995 | Delam et al. | |
| 5,388,176 A | 2/1995 | Dykstra et al. | |
| D356,581 S | 3/1995 | Chunn et al. | |
| D357,690 S | 4/1995 | Gobel | |
| 5,410,229 A | 4/1995 | Sebastian et al. | |
| D361,771 S | 8/1995 | Ledingham | |
| 5,440,215 A | 8/1995 | Gilmore | |
| 5,442,901 A | 8/1995 | Niemela et al. | |
| 5,455,886 A | 10/1995 | Glenn et al. | |
| 5,465,016 A | 11/1995 | Mancl et al. | |
| 5,490,370 A | 2/1996 | McNair et al. | |
| 5,528,148 A | 6/1996 | Rogers | |
| 5,551,220 A | 9/1996 | Suller et al. | |
| 5,563,668 A | 10/1996 | Ozaki et al. | |
| D375,963 S | 11/1996 | Braun et al. | |
| 5,572,856 A | 11/1996 | Ku | |
| 5,584,723 A | 12/1996 | Sutliff et al. | |
| 5,596,236 A | 1/1997 | Lee et al. | |
| 5,602,459 A | 2/1997 | Rogers | |
| 5,606,851 A | 3/1997 | Bruener et al. | |
| 5,610,499 A | 3/1997 | Rogers | |
| 5,615,540 A | 4/1997 | Yang | |
| 5,619,845 A | 4/1997 | Bruener et al. | |
| 5,638,667 A | 6/1997 | Ellson et al. | |
| 5,638,668 A | 6/1997 | Kallevig et al. | |
| D381,665 S | 7/1997 | Hinklin et al. | |
| 5,686,807 A | 11/1997 | Kusano et al. | |
| 5,703,450 A | 12/1997 | Josephs | |
| D390,576 S | 2/1998 | Shimamura | |
| 5,713,189 A | 2/1998 | Toman | |
| 5,727,372 A | 3/1998 | Kanitz et al. | |
| 5,730,397 A | 3/1998 | Van Niekerk | |
| 5,731,673 A | 3/1998 | Gilmore | |
| 5,736,837 A | 4/1998 | Noda | |
| 5,751,124 A | 5/1998 | Josephs | |
| 5,757,154 A | 5/1998 | Peot | |
| 5,757,162 A | 5/1998 | Weber | |
| 5,761,892 A | 6/1998 | Quiroga | |
| 5,775,074 A | 7/1998 | Walter | |
| 5,775,473 A | 7/1998 | Cordero | |
| 5,787,693 A | 8/1998 | Dyke | |
| 5,790,355 A | 8/1998 | Ishmael | |
| 5,794,422 A | 8/1998 | Reimers et al. | |
| 5,819,513 A | 10/1998 | Braun et al. | |
| 5,864,223 A | 1/1999 | Meyer | |
| 5,894,715 A | 4/1999 | Braun et al. | |
| 5,906,088 A | 5/1999 | Inui et al. | |
| 5,910,091 A | 6/1999 | Iida et al. | |
| 5,911,670 A | 6/1999 | Angott et al. | |
| RE36,250 E | 7/1999 | Hess et al. | |
| 5,934,051 A | 8/1999 | Hahn | |
| 5,934,053 A | 8/1999 | Fillman et al. | |
| 5,937,622 A | 8/1999 | Carrier et al. | |
| 5,937,623 A | 8/1999 | Wolf | |
| 5,953,890 A | 9/1999 | Shimada et al. | |
| 5,969,507 A | 10/1999 | Meyer | |
| 5,974,347 A | 10/1999 | Nelson | |
| 5,994,857 A | 11/1999 | Peterson, Jr. et al. | |
| 6,009,358 A | 12/1999 | Angott et al. | |
| D419,163 S | 1/2000 | Sirois et al. | |
| 6,018,231 A | 1/2000 | Shaver et al. | |
| D421,265 S | 2/2000 | Ohsumi et al. | |
| 6,018,937 A | 2/2000 | Shimada et al. | |
| 6,019,010 A | 2/2000 | Trinder | |
| 6,039,598 A | 3/2000 | Ciavarella | |
| D422,605 S | 4/2000 | Danthois | |
| D426,836 S | 6/2000 | Sirois et al. | |
| 6,087,805 A | 7/2000 | Langston et al. | |
| 6,092,355 A | 7/2000 | Ishmael | |
| 6,094,025 A | 7/2000 | Rosa | |
| 6,104,155 A | 8/2000 | Rosa | |
| 6,104,162 A | 8/2000 | Sainsbury et al. | |
| 6,105,348 A | 8/2000 | Turk et al. | |
| 6,114,833 A | 9/2000 | Langston et al. | |
| 6,124,791 A | 9/2000 | Wolf | |
| 6,154,007 A | 11/2000 | Shaver et al. | |
| 6,170,173 B1 | 1/2001 | Caston | |
| 6,170,179 B1 | 1/2001 | Paytas et al. | |
| 6,170,241 B1 | 1/2001 | Shibilski et al. | |
| 6,172,437 B1 | 1/2001 | Du | |
| 6,195,970 B1 | 3/2001 | Held et al. | |
| 6,202,396 B1 | 3/2001 | Thomas | |
| 6,220,005 B1 | 4/2001 | Plamper et al. | |
| 6,240,713 B1 | 6/2001 | Thomas | |
| 6,269,617 B1 | 8/2001 | Blanchard | |
| 6,286,609 B1 | 9/2001 | Carrier et al. | |
| D449,840 S | 10/2001 | Concari et al. | |
| D450,064 S | 11/2001 | Concari et al. | |
| 6,316,891 B1 | 11/2001 | Hough | |
| 6,320,351 B1 | 11/2001 | Ng et al. | |
| 6,359,344 B1 | 3/2002 | Klein et al. | |
| 6,374,584 B1 | 4/2002 | Blanchard | |
| D457,897 S | 5/2002 | Jong | |
| 6,404,078 B1 | 6/2002 | Thomas et al. | |
| D460,083 S | 7/2002 | Rosse | |
| D460,973 S | 7/2002 | Jong | |
| 6,424,799 B1 | 7/2002 | Gilmore | |
| 6,425,231 B1 | 7/2002 | Yilmaz | |
| 6,427,429 B1 | 8/2002 | Brabenec | |
| 6,448,732 B1 * | 9/2002 | Block | 318/635 |
| 6,456,508 B1 | 9/2002 | Namai et al. | |
| 6,479,958 B1 | 11/2002 | Thompson et al. | |
| 6,479,964 B2 | 11/2002 | Woodroffe et al. | |
| 6,484,484 B1 | 11/2002 | Thomas | |
| 6,487,837 B1 | 12/2002 | Fillman et al. | |
| 6,490,752 B2 * | 12/2002 | Kushida et al. | 15/319 |
| 6,523,334 B1 | 2/2003 | Dettmann | |
| 6,525,509 B1 | 2/2003 | Petersson et al. | |
| 6,531,850 B1 | 3/2003 | Griffin et al. | |
| 6,538,403 B2 | 3/2003 | Gorti et al. | |
| 6,558,829 B1 | 5/2003 | Faris et al. | |

(56) References Cited

U.S. PATENT DOCUMENTS

| | | |
|---|---|---|
| 6,571,542 B1 | 6/2003 | Fillman et al. |
| 6,586,908 B2 | 7/2003 | Petersson et al. |
| 6,591,593 B1 | 7/2003 | Brandon et al. |
| 6,604,348 B2 | 8/2003 | Hunt |
| 6,606,845 B1 | 8/2003 | Spies |
| 6,646,406 B1 | 11/2003 | Pollock et al. |
| 6,658,829 B2 | 12/2003 | Kobayashi et al. |
| 6,666,008 B2 | 12/2003 | Iida et al. |
| 6,668,530 B2 | 12/2003 | Kern et al. |
| 6,707,268 B1 | 3/2004 | Bell et al. |
| 6,720,679 B2 | 4/2004 | Harada et al. |
| 6,728,607 B1 | 4/2004 | Anderson |
| D489,734 S | 5/2004 | Lin |
| 6,729,114 B2 | 5/2004 | Fillman et al. |
| 6,734,647 B2 | 5/2004 | Wakitani et al. |
| 6,750,622 B2 | 6/2004 | Simizu et al. |
| 6,758,030 B2 | 7/2004 | Dettmann |
| 6,765,317 B2 | 7/2004 | Chu |
| 6,779,749 B2 | 8/2004 | Laporta |
| 6,788,020 B1 | 9/2004 | Pollock et al. |
| 6,798,160 B2 | 9/2004 | Wakitani et al. |
| 6,802,175 B2 | 10/2004 | Fillman et al. |
| 6,826,895 B2 | 12/2004 | Iida et al. |
| 6,834,413 B2 * | 12/2004 | Sanders et al. ................... 15/405 |
| 6,836,614 B2 | 12/2004 | Gilmore |
| 6,850,029 B1 | 2/2005 | Pollock et al. |
| 6,857,253 B2 | 2/2005 | Reimers et al. |
| 6,867,561 B1 | 3/2005 | Pollock et al. |
| 6,874,306 B2 | 4/2005 | Hishida |
| 6,886,317 B2 | 5/2005 | Jackson et al. |
| D508,923 S | 8/2005 | Henssler et al. |
| D509,513 S | 9/2005 | Henssler et al. |
| 6,938,400 B2 | 9/2005 | Fillman et al. |
| 6,943,510 B2 | 9/2005 | Gorti |
| 6,946,762 B2 | 9/2005 | Rinholm et al. |
| 6,948,299 B2 | 9/2005 | Osborne |
| 6,949,898 B2 | 9/2005 | Inui et al. |
| D511,348 S | 11/2005 | Elsworthy |
| 6,971,951 B2 | 12/2005 | Boyer |
| 6,977,473 B2 | 12/2005 | Wakitani et al. |
| D513,756 S | 1/2006 | Henssler et al. |
| 6,983,583 B2 | 1/2006 | Bucher |
| 6,987,328 B2 | 1/2006 | Osborne |
| 7,007,446 B2 | 3/2006 | Dettmann |
| 7,015,662 B2 | 3/2006 | Wakitani et al. |
| 7,017,327 B2 | 3/2006 | Hunt et al. |
| 7,023,159 B2 | 4/2006 | Gorti et al. |
| 7,051,498 B2 | 5/2006 | Modzik et al. |
| D523,805 S | 6/2006 | Martin |
| 7,111,443 B2 | 9/2006 | Anderson et al. |
| 7,116,065 B2 | 10/2006 | Wakitani et al. |
| 7,134,261 B2 | 11/2006 | Inui et al. |
| 7,164,252 B1 | 1/2007 | Myers et al. |
| 7,168,227 B2 | 1/2007 | Derby et al. |
| 7,208,892 B2 * | 4/2007 | Tondra et al. ................... 318/53 |
| 7,282,818 B2 | 10/2007 | Kovarik |
| 7,382,104 B2 | 6/2008 | Jacobson et al. |
| 7,424,766 B2 * | 9/2008 | Reindle et al. ................... 15/319 |
| 7,526,833 B2 | 5/2009 | Cochran et al. |
| 7,578,357 B2 | 8/2009 | Schell |
| 7,823,249 B2 * | 11/2010 | Zahuranec et al. ............. 15/319 |
| 8,146,199 B2 * | 4/2012 | Yoo et al. ..................... 15/327.2 |
| 2002/0069631 A1 | 6/2002 | Dyke et al. |
| 2002/0093299 A1 | 7/2002 | Kobayashi et al. |
| 2002/0100265 A1 | 8/2002 | Mil'shtein et al. |
| 2002/0174639 A1 | 11/2002 | Fowler |
| 2002/0184865 A1 | 12/2002 | Short |
| 2003/0037522 A1 | 2/2003 | Kobayashi et al. |
| 2003/0037523 A1 | 2/2003 | Shimada et al. |
| 2003/0037524 A1 | 2/2003 | Iida et al. |
| 2003/0062723 A1 | 4/2003 | Mancl et al. |
| 2003/0127932 A1 | 7/2003 | Ishida et al. |
| 2003/0222607 A1 | 12/2003 | Simizu et al. |
| 2004/0134175 A1 | 7/2004 | Osborne |
| 2004/0135373 A1 | 7/2004 | Osborne |
| 2005/0005588 A1 | 1/2005 | Jager |
| 2005/0029025 A1 | 2/2005 | Medina |
| 2005/0044835 A1 | 3/2005 | Hishida |
| 2005/0066643 A1 | 3/2005 | Fukushima et al. |
| 2005/0126149 A1 | 6/2005 | Heinz et al. |
| 2005/0146308 A1 | 7/2005 | Quazi et al. |
| 2005/0156559 A1 | 7/2005 | Thibedeau et al. |
| 2005/0188665 A1 | 9/2005 | Reimers et al. |
| 2005/0193707 A1 | 9/2005 | Hancock et al. |
| 2005/0217230 A1 | 10/2005 | Bucher |
| 2005/0230168 A1 | 10/2005 | Fillman et al. |
| 2005/0262819 A1 | 12/2005 | Weber et al. |
| 2006/0042212 A1 | 3/2006 | Shoemaker et al. |
| 2006/0059880 A1 | 3/2006 | Angott |
| 2006/0087185 A1 | 4/2006 | Patridge |
| 2006/0087280 A1 | 4/2006 | Miyashita et al. |
| 2006/0087285 A1 | 4/2006 | Phillips et al. |
| 2006/0096266 A1 | 5/2006 | Dettmann |
| 2007/0209344 A1 | 9/2007 | Berkeley |
| 2007/0209644 A1 | 9/2007 | Gannam |

OTHER PUBLICATIONS

International Search Report and Written Opinion mailed Apr. 23, 2008 for PCT/US2007/022107 filed Oct. 16, 2007.
International Preliminary Report on Patentability mailed Oct. 29, 2008 for PCT/US2007/022101 filed Oct. 16, 2007.
International Preliminary Report on Patentability mailed Oct. 27, 2008 for PCT/US2007/022107 filed Oct. 16, 2007.

* cited by examiner

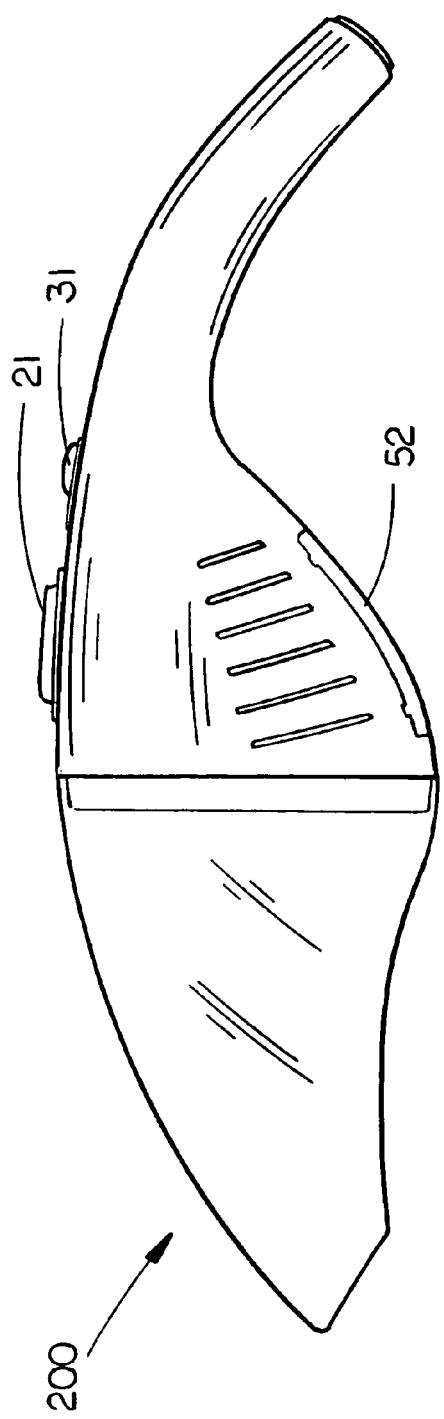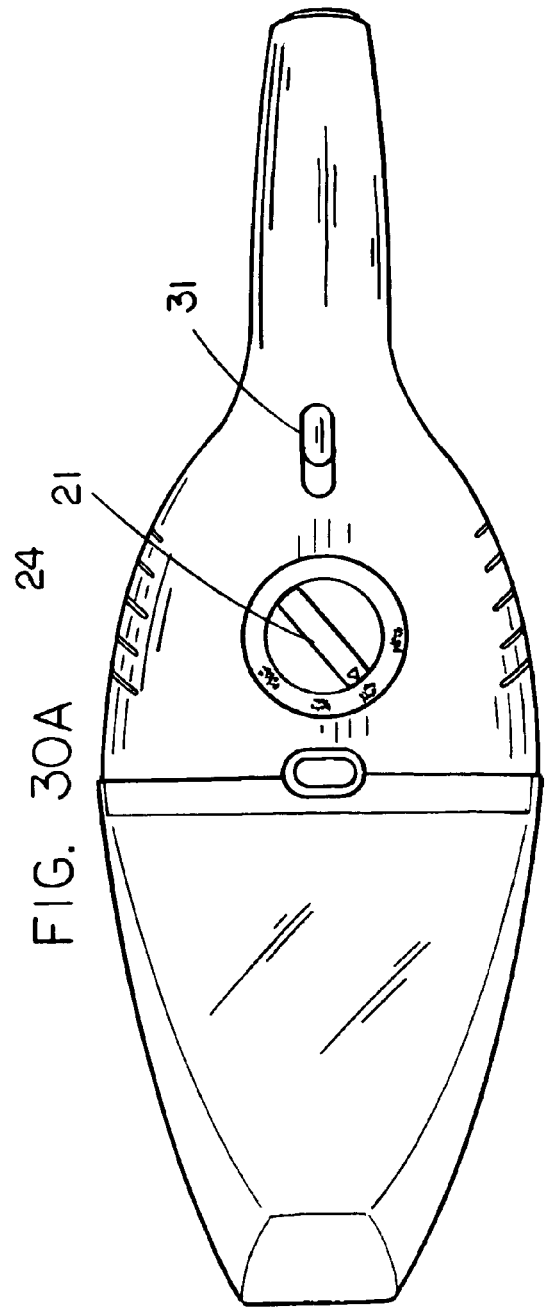
FIG. 30A
FIG. 30B

US 8,732,896 B2

HYBRID ELECTRIC CLEANING DEVICE

CROSS-REFERENCE TO RELATED APPLICATIONS

The present application is a continuation-in-part application and claims priority under 35 U.S.C. §120 to U.S. patent application Ser. No. 11/906,546 entitled: Hybrid Electric Device filed Oct. 1, 2007 now abandoned, which is a continuation-in-part application and claims priority under 35 U.S.C. §120 to U.S. patent application Ser. No. 11/899,616 entitled: Hybrid Electric Lawnmower filed Sep. 5, 2007 now abandoned, which is a continuation-in-part application claiming priority under 35 U.S.C. §120 to U.S. patent application Ser. No. 11/670,932 entitled: Hybrid Electric Lawnmower filed Feb. 2, 2007 now U.S. Pat. No. 7,728,534, which is a continuation-in-part application claiming priority under 35 U.S.C. §120 to U.S. patent application Ser. No. 11/550,476 entitled: Hybrid Electric Lawnmower Having Dual Power Supply filed Oct. 18, 2006 now U.S. Pat. No. 7,482,768, which is a continuation-in-part application claiming priority under 35 U.S.C. §120 to U.S. patent application Ser. No. 11/550,104 entitled: Hybrid Electric Lawnmower filed Oct. 17, 2006 .

The present application is also a continuation-in-part application and claims priority under 35 U.S.C. §120 to U.S. patent application Ser. No. 11/906,541 entitled: Hybrid Electric Device filed Oct. 1, 2007 now U.S. Pat. No. 7,884,560, which is a continuation-in-part application and claims priority under 35 U.S.C. §120 to U.S. patent application Ser. No. 11/899,616 entitled: Hybrid Electric Lawnmower filed Sep. 5, 2007 now abandoned, which is a continuation-in-part application claiming priority under 35 U.S.C. §120 to U.S. patent application Ser. No. 11/670,932 entitled: Hybrid Electric Lawnmower filed Feb. 2, 2007 now U.S. Pat. No. 7,728,534, which is a continuation-in-part application claiming priority under 35 U.S.C. §120 to U.S. patent application Ser. No. 11/550,476 entitled: Hybrid Electric Lawnmower Having Dual Power Supply filed Oct. 18, 2006 now U.S. Pat. No. 7,482,768, which is a continuation-in-part application claiming priority under 35 U.S.C. §120 to U.S. patent application Ser. No. 11/550,104 entitled: Hybrid Electric Lawnmower filed Oct. 17, 2006 now U.S. Pat. No. 7,479,754 .

U.S. patent application Ser. Nos. 11/906,546, 11/906,541, 11/899,616, 11/670,932, 11/550,476 and 11/550,104 are hereby incorporated by reference in their entireties herein. Further, U.S. patent application entitled Hybrid Electric Device filed Mar. 14, 2008 and having Express Mail Mailing Label Number EM 117519013US is also hereby incorporated by reference its entirety herein.

FIELD OF THE INVENTION

The present invention generally relates to the field of hybrid electric devices, and more particularly to a hybrid electric device having a boost/conserve power feature and a dual mode power supply for providing power to an electric motor.

BACKGROUND OF THE INVENTION

Power tools are frequently utilized for indoor (e.g. household and office space) and property maintenance operations in and around various properties. The tools may be commonly utilized for operations that require a motor, such as operations requiring the rotational actuation of a working element, such as an impeller (fan), and/or a brush. One such power tool is a vacuum cleaner. Another such tool is a floor polisher. Still another such tool is an outdoor blower/vacuum. Vacuum cleaners typically utilize an impeller and/or a brush, while floor polishers typically utilize a brush. Some power tools may be operated from AC mains, such as power supplied by a utility company or from an AC generator. Other power tools may be operated utilizing a battery.

SUMMARY OF THE INVENTION

Accordingly, an embodiment of the present invention is directed to a cleaning device including: a housing configured with a working element; a motor configured for urging motion of the working element; a power control module, the power control module configurable for being in electrical connection with at least one of the motor, a first power source configuration and a second power source configuration, the first power source configuration configurable for being electrically connected to a battery assembly having a Direct Current (DC) power output, the second power source configuration configurable for being electrically connected to a power inverter, the power inverter configured for receiving an Alternating Current (AC) power and further configured for outputting a DC power to the second power source configuration, wherein the motor receives power via the power control module from at least one of the first power source configuration and the second power source configuration.

An additional embodiment of the present invention is directed to a cleaning device, including: a housing configured with a working element; a motor configured for urging motion of the working element; a power control module, the power control module configurable for being in electrical connection with at least one of the motor, a first power source configuration and a second power source configuration, the first power source configuration configurable for being electrically connected to a battery assembly having a DC power output, the second power source configuration configurable for being electrically connected to a power inverter, the power inverter configured for receiving an AC power and further configured for outputting a DC power to the second power source configuration, wherein the motor receives power via the power control module from at least one of the first power source configuration and the second power source configuration, wherein the power control module further includes a boost conserve switch including a conserve mode for supplying a first voltage to the motor when the boost conserve switch is established in the conserve mode and a boost mode for supplying a second voltage to the motor when the boost conserve switch is established in the boost mode, the first voltage being less than the second voltage.

A further embodiment of the present invention is directed to a cleaning device, including: a housing configured with a first working element and a second working element; a first motor configured for urging motion of the first working element; a second motor configured for urging motion of the second working element; a power control module configurable for being in electrical connection with at least one of the first motor, the second motor, a first power source configuration and second power source configuration, the first power source configuration configurable for being electrically connected to a battery assembly having a DC power output, the second power source configuration configurable for being electrically connected to a power inverter, the power inverter configured for receiving an AC power and further configured for outputting a DC power to the second power source configuration, wherein the first motor and the second motor are configured for receiving power via the power control module from at least one of the first power source configuration and the second power source configuration.

A further embodiment of the present invention is directed to a cleaning device, including: a housing configured with a working element; a motor configured for urging motion of the working element; a power control module, the power control module configurable for being in electrical connection with at least one of the motor, a first power source configuration and a second power source configuration, the first power source configuration configurable for being electrically connected to a battery assembly having a Direct Current (DC) power output, the second power source configuration configurable for being electrically connected to a power inverter, the power inverter configured for receiving an Alternating Current (AC) power and further configured for outputting a DC power to the second power source configuration; and a switch for selecting between a first mode for charging the battery assembly when the power control module is receiving AC power and a second mode for not charging the battery, wherein the motor receives power via the power control module from at least one of the first power source configuration and the second power source configuration.

A further embodiment of the present invention is directed to a cleaning device, including: a housing configured with a working element; a motor configured for urging motion of the working element, the motor having a first coil and a second coil, both of the first coil and the second coil being wrapped on an armature of the motor; a first brush configured for being in electrical contact with a first commutator, the first commutator configured for being electrically connected to the first coil; a second brush configured for being in electrical contact with a second commutator, the second commutator configured for being electrically connected to the second coil; a hybrid controller configured for receiving electrical power from at least one of a first voltage configuration and a second voltage configuration, and delivering said electrical power to at least one of the first brush and the second brush, wherein the hybrid controller includes a first circuit setting and a second circuit setting, the hybrid controller configured for electrically connecting the first brush and the second brush in a parallel configuration when the hybrid controller is established at the first circuit setting, the hybrid controller further configured for electrically connecting the first brush and the second brush in a series configuration when the hybrid controller is established at the second circuit setting.

A further embodiment of the present invention is directed to a cleaning device, including: a housing configured with a working element; a motor configured for urging motion of the working element; a power control module, the power control module configurable for being in electrical connection with at least one of the motor, a first power source configuration and a second power source configuration, a electric current is provided to the motor by at least one of the first and the second power source configuration, the first power source configuration configurable for being electrically connected to a battery assembly having a Direct Current (DC) power output, the second power source configuration configurable for being electrically connected to a power inverter, the power inverter configured for receiving an Alternating Current (AC) power and further configured for outputting a DC power to the second power source configuration, wherein the motor is one of a permanent magnet DC (PMDC) motor, a universal motor and an induction motor, the motor receiving power via the power control module from at least one of the first power source configuration and the second power source configuration.

A further embodiment of the present invention is directed to a cleaning device, including: a housing configured with a working element; a motor configured for urging motion of the working element; a power control module, the power control module configurable for being in electrical connection with at least one of the motor, a first power source configuration and a second power source configuration, a electric current is provided to the motor by at least one of the first and the second power source configuration, the first power source configuration configurable for being electrically connected to a battery assembly having a Direct Current (DC) power output, the second power source configuration configurable for being electrically connected to a power inverter, the power inverter configured for receiving an Alternating Current (AC) power and further configured for outputting a DC power to the second power source configuration; an electronic controller, the electronic controller configurable for controlling the electric current provided to the motor, wherein the motor receives power via the power control module from at least one of the first power source configuration and the second power source configuration.

A further embodiment of the present invention is directed to a cleaning device, including: a housing configured with a working element; a motor configured for urging motion of the working element; a power control module, the power control module configurable for being in electrical connection with at least one of the motor, a first power source configuration and a second power source configuration, a electric current is provided to the motor by at least one of the first and the second power source configuration, the first power source configuration configurable for being electrically connected to a battery assembly having a Direct Current (DC) power output, the second power source configuration configurable for being electrically connected to a power inverter, the power inverter configured for receiving an Alternating Current (AC) power and further configured for outputting a DC power to the second power source configuration; a circuit protection device for affecting the electric current provided to the motor, wherein the motor receives power via the power control module from at least one of the first power source configuration and the second power source configuration.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 30A is a side elevation view of the handheld vacuum cleaner illustrated in FIG. 29;

FIG. 30B is a top plan view of the handheld vacuum cleaner illustrated in FIG. 29;

DETAILED DESCRIPTION OF THE INVENTION

Reference will now be made in detail to the presently preferred embodiments of the invention, examples of which are illustrated in the accompanying drawings.

Figure 1:
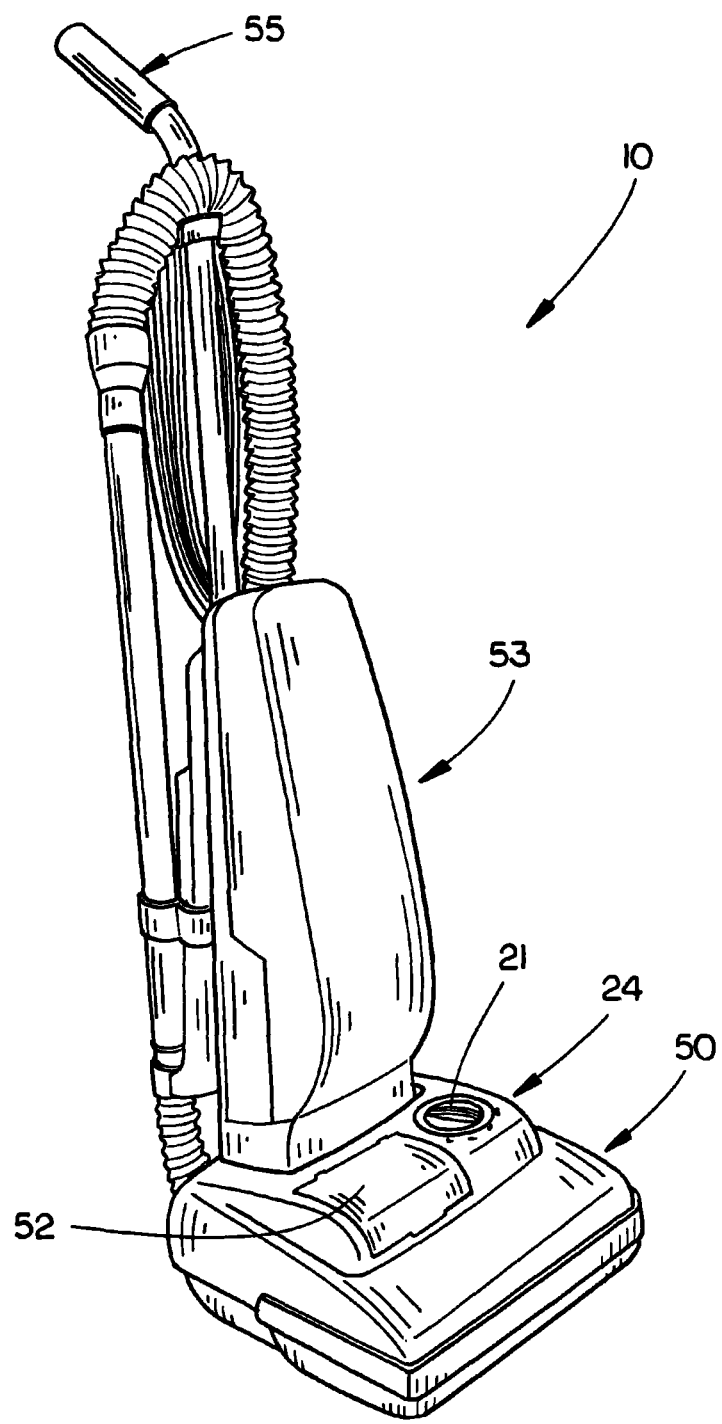
FIG. 1 is an isometric view of a hybrid vacuum cleaner.
Figure 2:
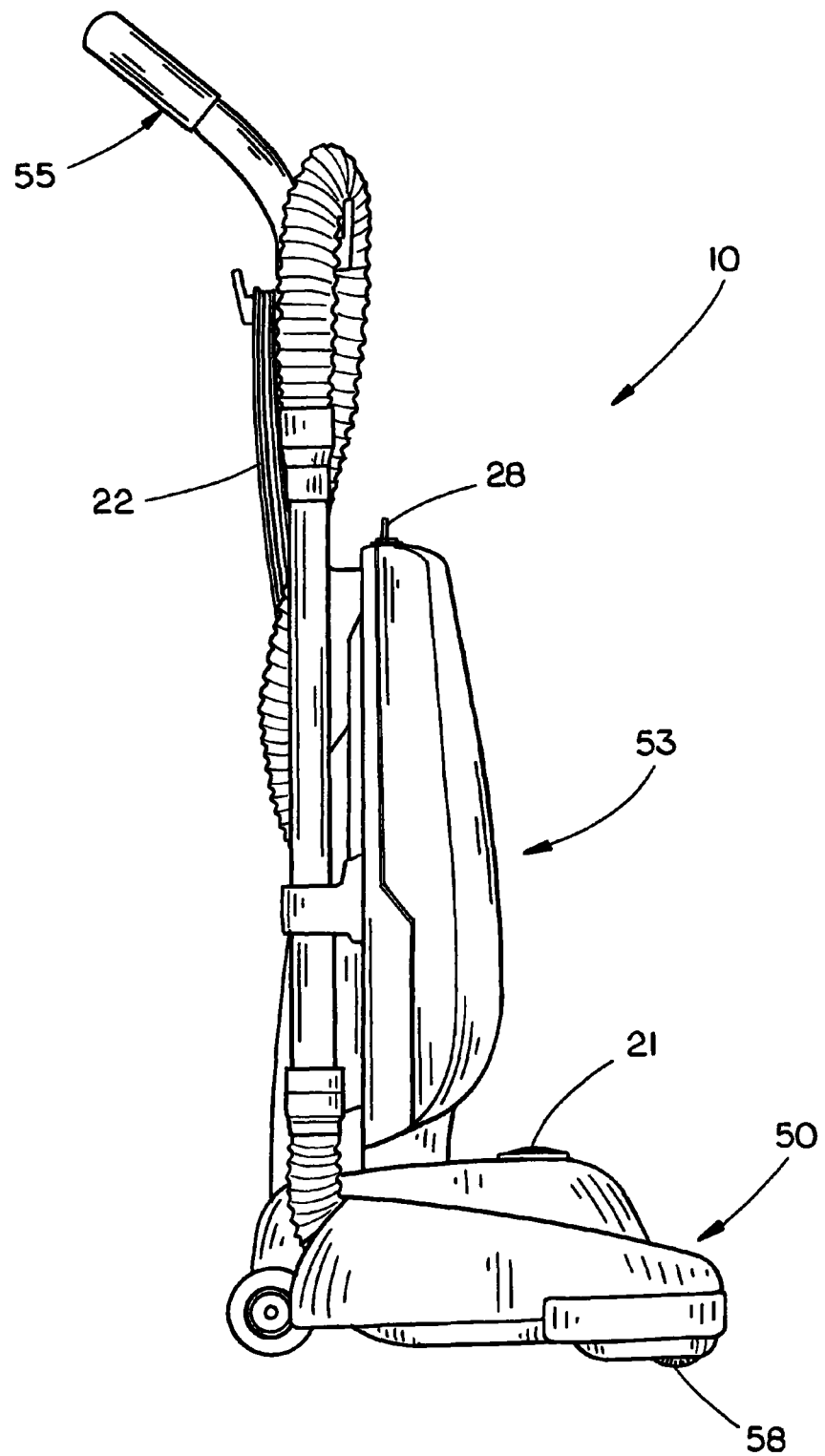
FIG. 2 is a side elevation view of the hybrid vacuum cleaner illustrated in FIG. 1.
Figure 3:
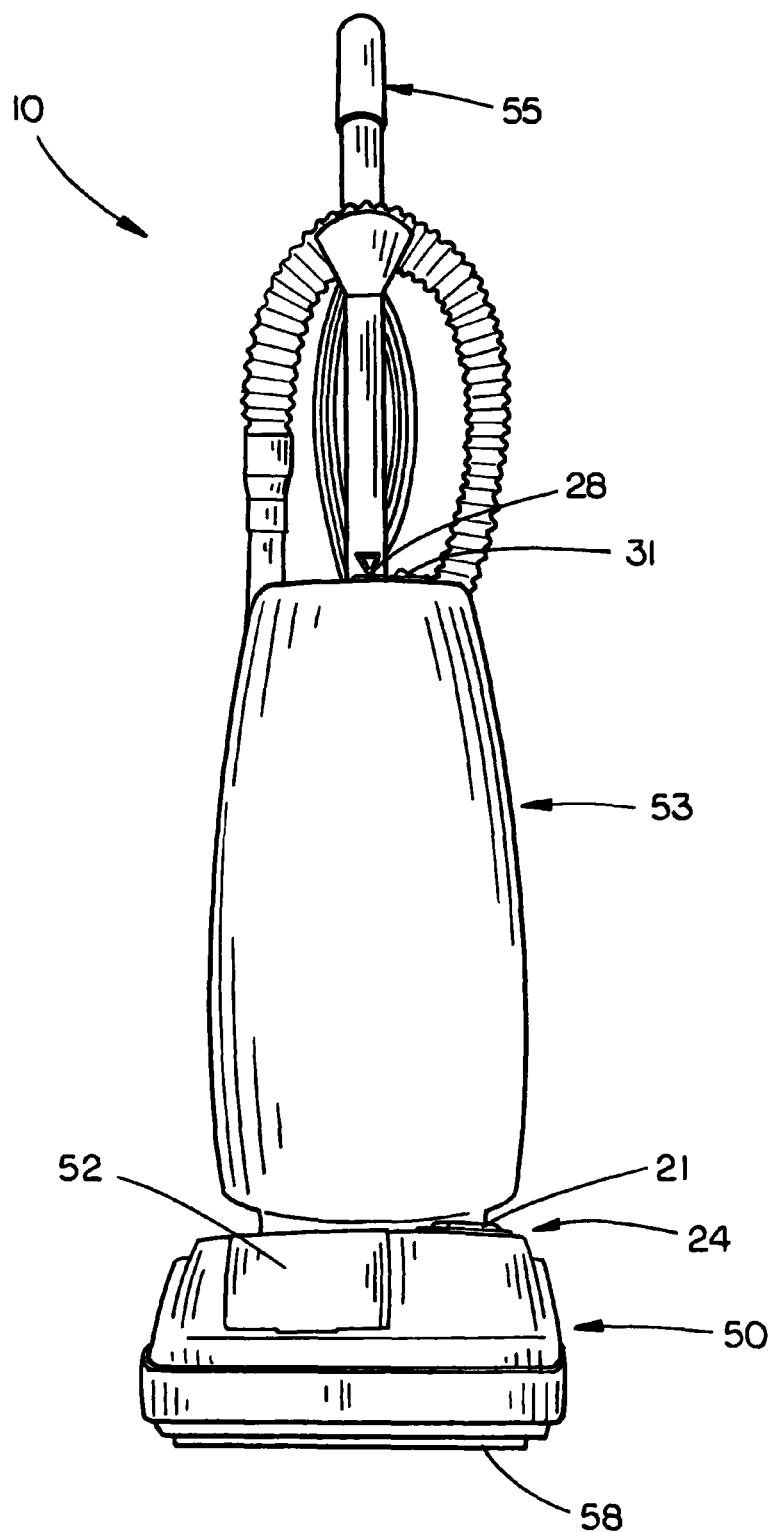
FIG. 3 is a front elevation view of the hybrid vacuum cleaner illustrated in FIG. 1.
Figure 4:
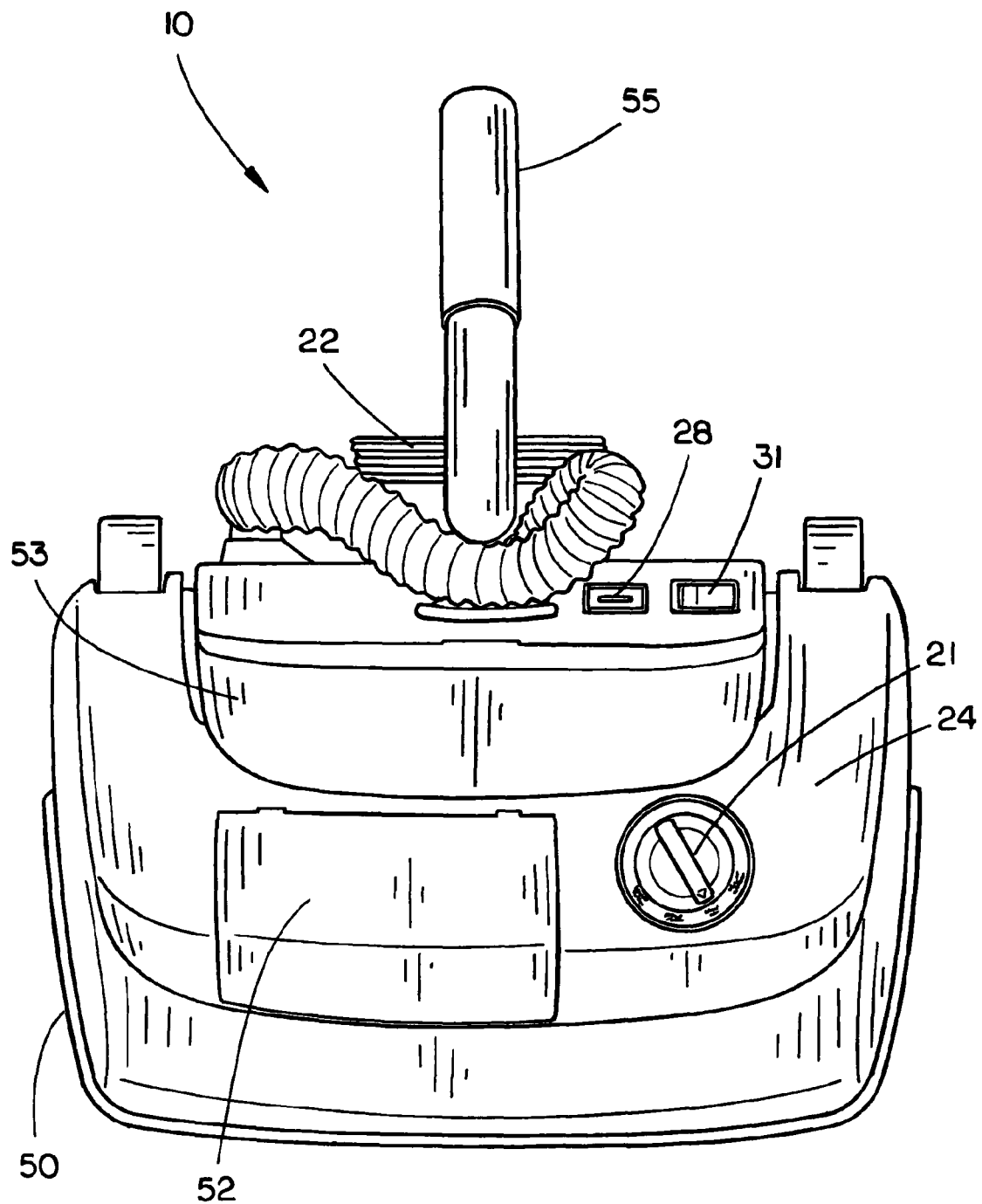
FIG. 4 is a top plan view of the hybrid vacuum cleaner illustrated in FIG. 1.

A hybrid electric cleaning device is described herein and set forth in the claims and is partially depicted in the perspective view of FIG. 1 wherein an exemplary embodiment of a hybrid upright vacuum cleaner 10 is shown. The hybrid upright vacuum cleaner 10 includes a motor housing 50. Positioned on top of the motor housing 50 is a control box 24 including a controller and at least one power selection switch 21. A waste collector housing 53 containing a waste collector (dust bag) is pivotly attached to the motor housing. The motor housing 50 further includes a number of features including, but not limited to, the power control and supply described herein as well as a DC motor, a vacuum chamber having an impeller (fan), a beater bar, a dust connecting hose having a first end connected to the vacuum chamber and a second end connected to the dust bag, and other necessary features for making the vacuum cleaner described herein operable to function as desired. Such function and structure includes the DC motor for driving the impeller and the beater bar, the DC motor being powered by alternative power supplies (power source configurations) which may include 120 VAC line voltage or DC power supply such as a battery assembly 52. The motor drives the impeller and the beater bar, while the power control system/power supply system of the hybrid electric vacuum cleaner allows the user to select the power source whether it be AC power supply or DC power supply. In either selection, the power control system of the vacuum cleaner provides adequate voltage to the motor. Further, a selection is available for the user of the present embodiment to drive the motor in either conserve or boost mode. Conserve mode utilizes less power from the power source than boost mode, thereby increasing run time for each full battery charge under such selection, should the DC operation mode be selected. It is understood that conserve and boost mode may also be operable in AC operation mode.

Further, the motor may be designed as a dual voltage motor which has the capability to operate on two different DC voltages, such as a motor as described in U.S. Pat. No. 6,172,437. In one embodiment, the dual voltage motor utilizes two separate commutators on a single armature. Each commutator connects to one set of windings (coils) that are separated from the other. Each commutator is also in electric contact with a corresponding set of brushes. The two sets of brushes may be selectively configured through the use of a user selection switch which reconfigures the two sets of coils on the motor from series connectivity, for higher voltage source such as rectified line voltage, to parallel connectivity, for a lower voltage source such as a battery pack.

In this dual voltage motor configuration, if the higher voltage is approximately twice the potential of the lower voltage, the power supply will provide substantially the same voltage potential across a first and a second commutator on the electric motor. For example if the vacuum cleaner is connected to a standard AC power source of 120 VAC, a rectifier may rectify the voltage to about 120 VDC (a higher voltage source). In such case, a series configuration will provide each set of coils about 60 VDC. Alternatively, the vacuum cleaner may be connected to a 60 VDC battery pack (a lower voltage source). In such case, a parallel configuration will provide each set of coils about 60 VDC also. Substantially the same voltage provided to the sets of coils in both higher and lower voltages results in substantially the same revolutions-per-minute or rounds-per-minute (RPM) of the motor. In this manner, the dual-voltage vacuum cleaner may be capable of executing speed control over the motor and the impeller without the utilization of an electronic controller. This may represent a significant cost benefit to a consumer. In one specific embodiment, the lack of a controller may represent a cost savings of approximately ten percent. It will be appreciated that the number of windings in the motor may vary and/or the diameter of wires including the windings may vary.

It will be appreciated that the vacuum cleaner may be configured to limit the speed of the impeller and/or the beater bar to a pre-determined level to satisfy applicable safety and/or energy consumption regulations. It is contemplated that the vacuum cleaner may include a feedback sensor to maintain the speed of the vacuum cleaner's impeller and/or beater bar. Speed control may be accomplished by adjusting the voltage of the power supplied to the motor. For example, the power may be adjusted from approximately 72V to 80V to 90V, depending upon the suction strength desired of the vacuum cleaner.

It is understood that alternative designs of the vacuum cleaner may be employed without departing from the scope and spirit of the present invention. For example, in one embodiment, the vacuum cleaner utilizes a second electric motor in order to increase the suction strength of the vacuum cleaner. It is also understood that the present invention may be employed by alternative types of cleaning device including, but not limited to, canister vacuums, backpack vacuums, handheld vacuums, steam vacuums, floor polishers and outdoor blower/vacuums. Moreover, it will be appreciated that in addition to permanent magnet DC motors, many other various types of motors may be utilized with the present invention. These motors may include, but are not limited to, a universal motor, a brushless DC motor, a switched reluctance motor, a stepper motor, and/or an induction motor.

Referring generally to FIGS. 1 through 10. A hybrid vacuum cleaner with a boost conserve feature of the present embodiment is depicted. A plurality of wheels support the motor housing 50 such that the hybrid vacuum cleaner 10 may roll, be powered or be pushed over area to be cleaned. The specific configuration of the hybrid vacuum cleaner 10 of the present embodiment, as depicted in FIG. 1, is not necessarily limiting in that the many structures and switches which are depicted may be positioned on multiple surfaces or in multiple positions on the hybrid vacuum cleaner 10 and thus, the particular location and limitation of the depictions and structure set forth are considered to be merely exemplary.

The hybrid vacuum cleaner 10 of the present embodiment incorporates controls located on the motor housing 50. A circuit breaker 28 having a key 28a is utilized to break the electrical connection to the impeller 51 and the beater bar 58, should the key 28a be removed from a fully inserted position. Further, the circuit breaker 28 also serves as a theft-prevention device as the motor cannot be started without the key 28a. Also found located on the motor housing 50 is a power switch 31. The power switch 31 is utilized to engage and disengage the DC motor 56 from rotating the impeller 51 and the beater bar 58.

Figure 5:
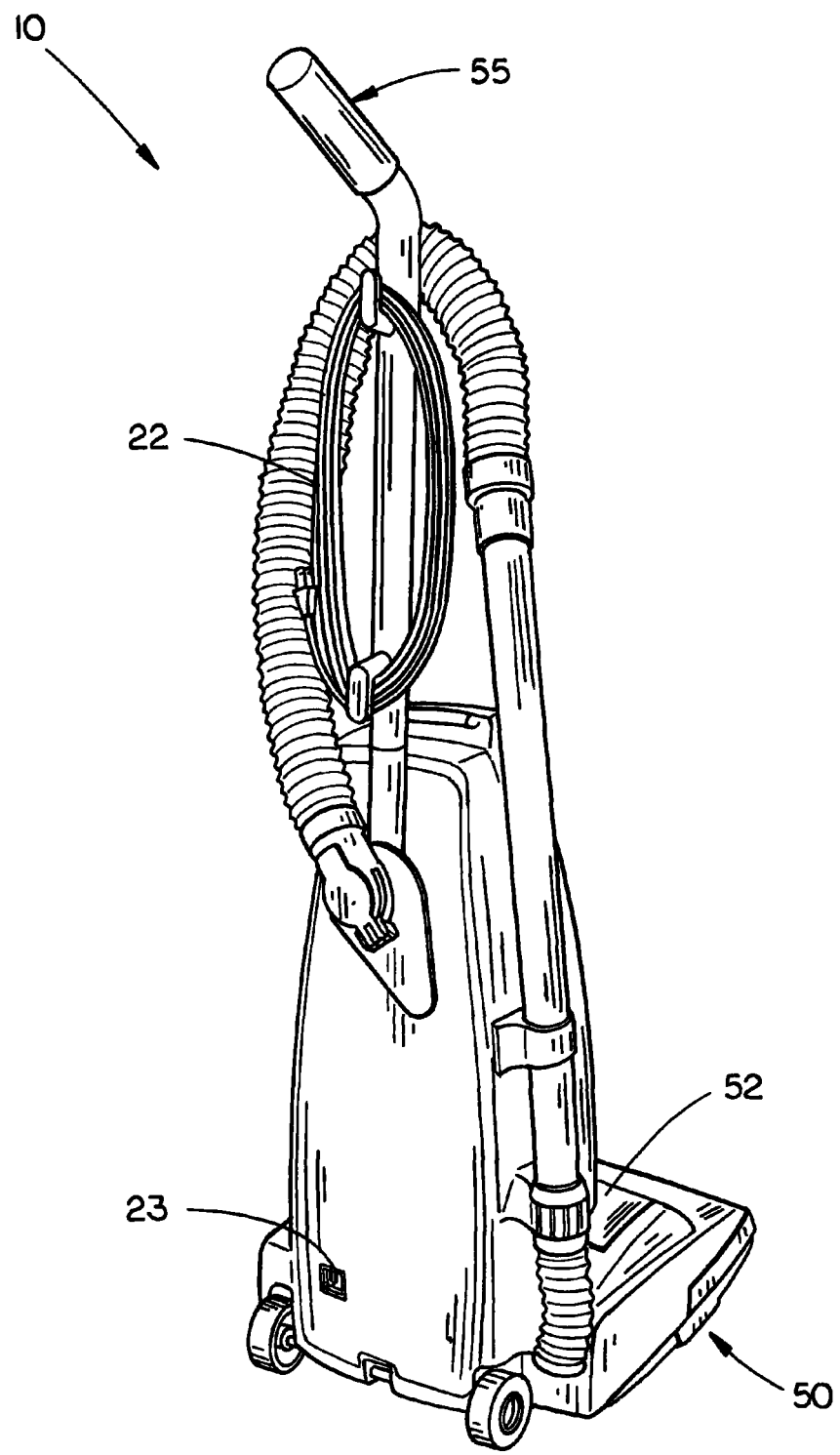
FIG. 5 is another perspective view of the hybrid vacuum cleaner illustrated in FIG. 1.
Figure 6:
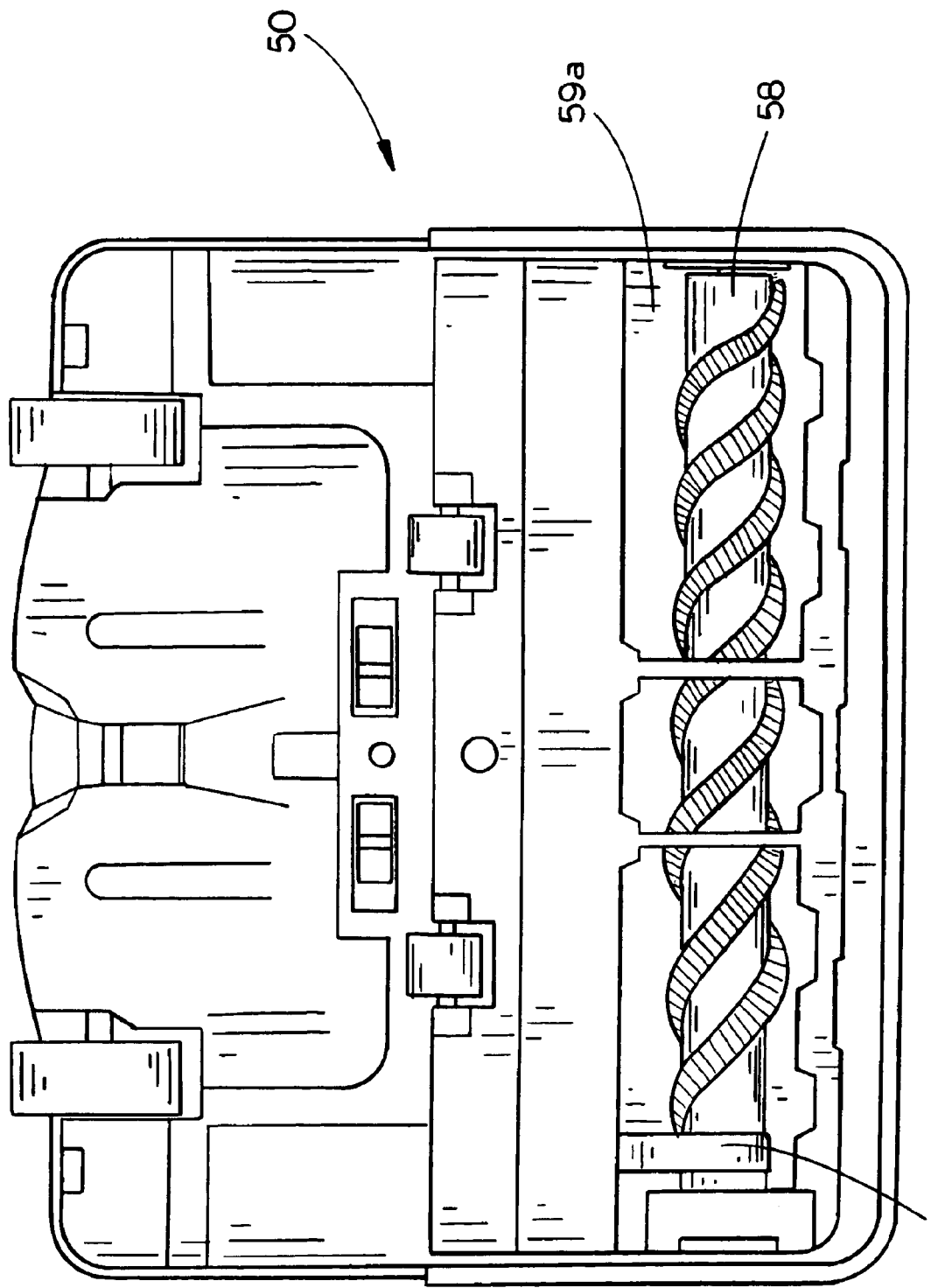
FIG. 6 is a bottom view of the hybrid vacuum cleaner illustrated in FIG. 1.
Figure 7:
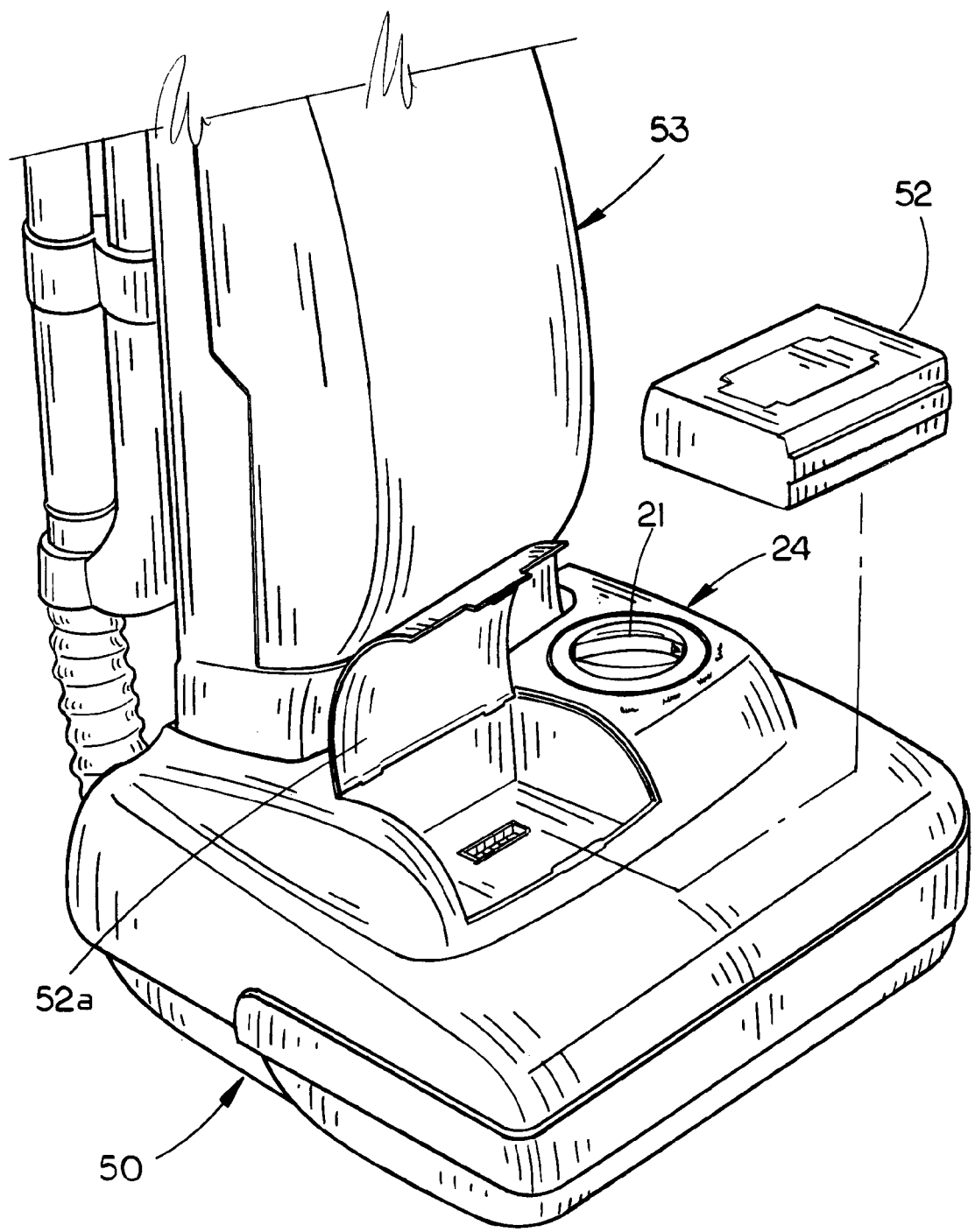
FIG. 7 is a perspective view of the hybrid vacuum cleaner illustrated in FIG. 1.

The hybrid vacuum cleaner 10 of the present embodiment is designed to be operated on either AC line voltage from an AC power source (such as a wall plug or other AC source), or from a DC battery assembly (pack) 52 which is mounted on the motor housing 50 or in close conductive and operative relationship with the DC motor 56 depicted. The hybrid vacuum cleaner 10 of the present embodiment is designed such that the operator may operatively select functionality of the hybrid vacuum cleaner 10 and the motor 56 by either AC or DC power. When the vacuum cleaner 10 is connected to an AC power source, as depicted in FIG. 5, an AC cord 22 is electrically connected to an AC receptacle 23 positioned on the vacuum cleaner 10. The AC cord may be directly plugged into AC line voltage which is typically 60 Hz 120 Volts. A battery pack 52 located on the motor housing 50 may provide DC power to the motor 56. The battery pack 52 may be rechargeable.

Figure 11:
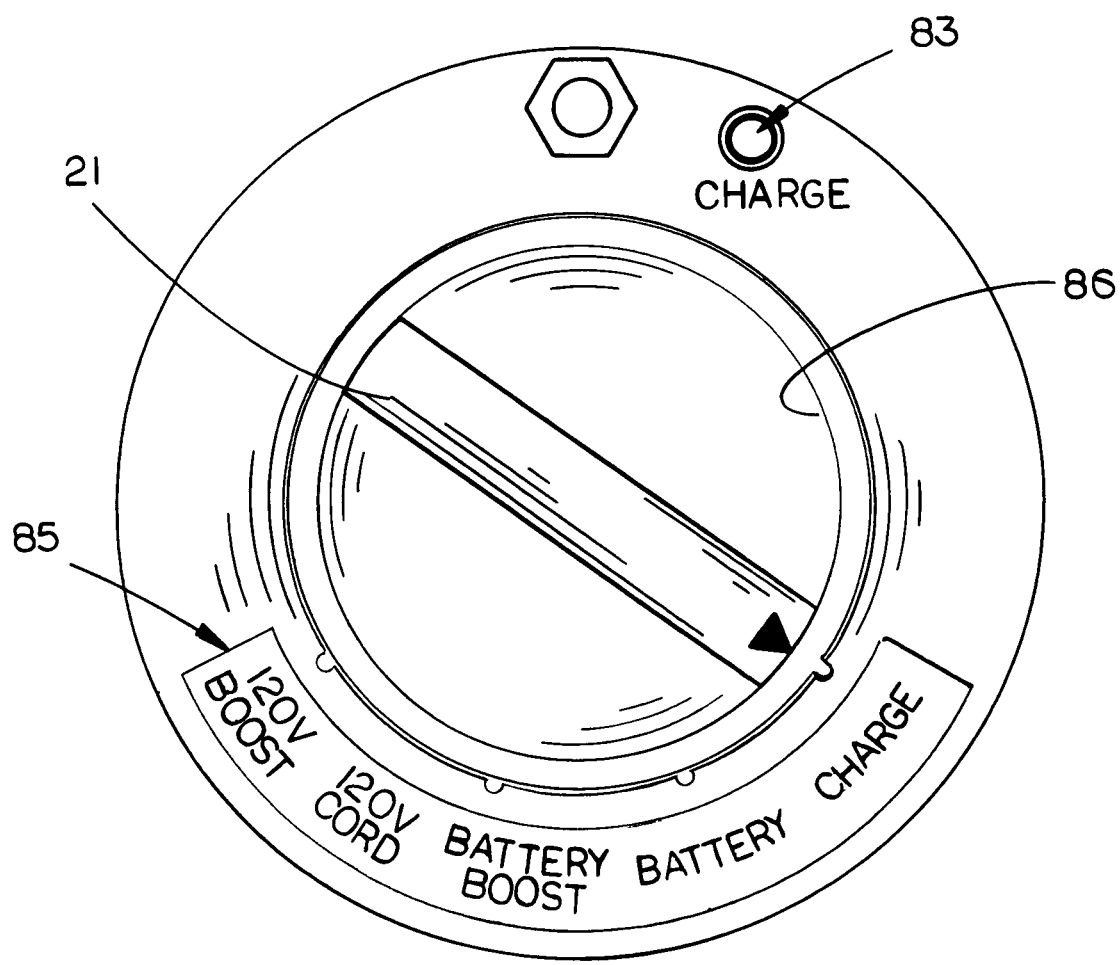
FIG. 11 is a top plan view of a power selection switch.

Positioned on the vacuum cleaner 10 is also a power selection switch 21, as depicted in FIG. 11. In one specific embodiment, the power selection switch 21 includes a battery charge indicator 83, a plurality of power source selections 85, and a knob 86 for selecting a specific power mode. In the present embodiment, the power source selections 85 include a charge mode, a battery mode, a battery boost mode, a 120V cord mode and a 120V boost mode. The battery mode and the 120V cord mode are conserve modes, while the battery boost mode and the 120V boost mode are boost modes. The boost modes provide the functionality of increasing the voltage provided to the DC motor 56 thereby increasing the rotational speed of the impeller 51 and the beater bar 58 compared to conserve modes. When a boost mode is selected, a boost conserve switch in the controller is turned on. Conversely, when a conserve mode is selected, the boost conserve switch in the controller is turned off. Selecting boost or conserve mode may increase or decrease the voltage and thereby increase or decrease the actual drain on the battery pack 52 or other power supply due to the increased current provided to the DC motor 56. It is understood that the power selection switch may have different configuration. For example a plurality of buttons may be utilized in place of a knob. Further, a different set of power source selections may be provided.

In a present embodiment, the hybrid control system of the hybrid vacuum cleaner 10 allows for the hybrid vacuum cleaner 10 to be powered from regular household AC line voltage or from a DC voltage battery pack. The battery pack may be designed to have a lower available operating voltage than the average peak voltage of household current. This arrangement may be provided in order to allow the vacuum cleaner to run in a possible conservation mode in order to preserve battery run time under less demanding cleaning conditions. Alternatively, when the vacuum cleaner is plugged in to AC household current or line voltage or when additional voltage is tapped from the battery pack or from a battery associated with the battery pack, the hybrid vacuum cleaner 10 of the present embodiment may selectively be operated in a boost or power mode, the boost mode allowing for greater suction strength or pick up of various debris, during operation.

Figure 8:
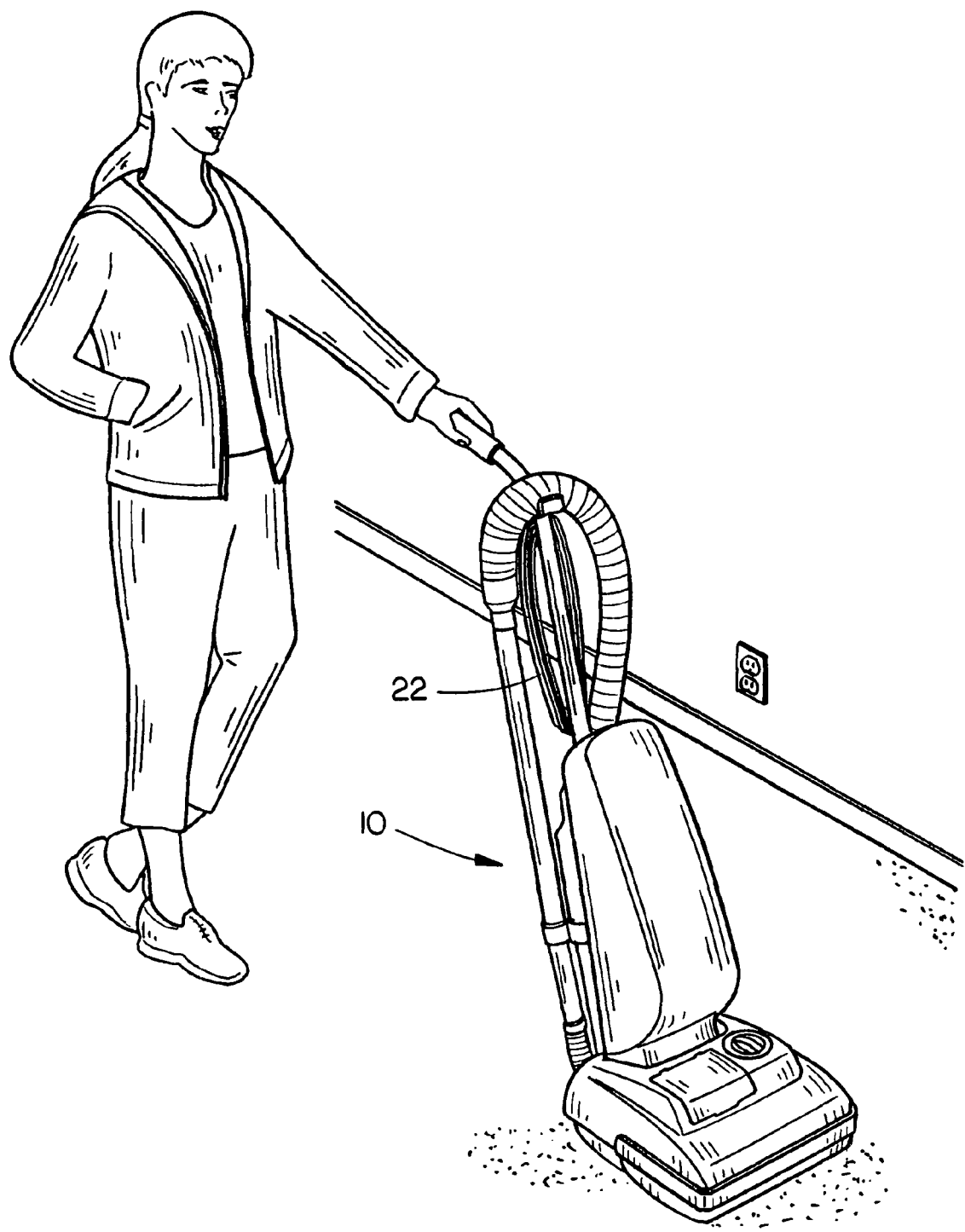
FIG. 8 is an isometric view of the hybrid vacuum cleaner illustrated in FIG. 1, wherein the hybrid vacuum cleaner is operated via a battery.

Thus, for an example, when the hybrid vacuum cleaner 10 with power boost conserve feature of the present embodiment is in operation/being used for cleaning relatively thinner carpet as shown in FIG. 8, since such task requires less power, the battery mode (a conserve mode) may be selected by the power selection switch 21. The battery pack 52 may be brought in electrical conductivity with the DC motor 56 and the conserve setting may reduce the rotational speed of the impeller 51 and the beater bar 58 thereby decreasing the rate of drain of the battery pack 52 and also increasing the run and operation time of the hybrid vacuum cleaner 10 per charge. However, should there be a need to increase the rotational speed of the impellor 51 and the beater bar 58, the battery boost mode may be selected to increase the voltage being supplied to the motor 56. It will be appreciated that the battery boost mode may supply added voltage to the motor from a secondary battery, and/or from any other auxiliary power source included with and/or connected to the hybrid vacuum cleaner 10 as needed.

Figure 9:
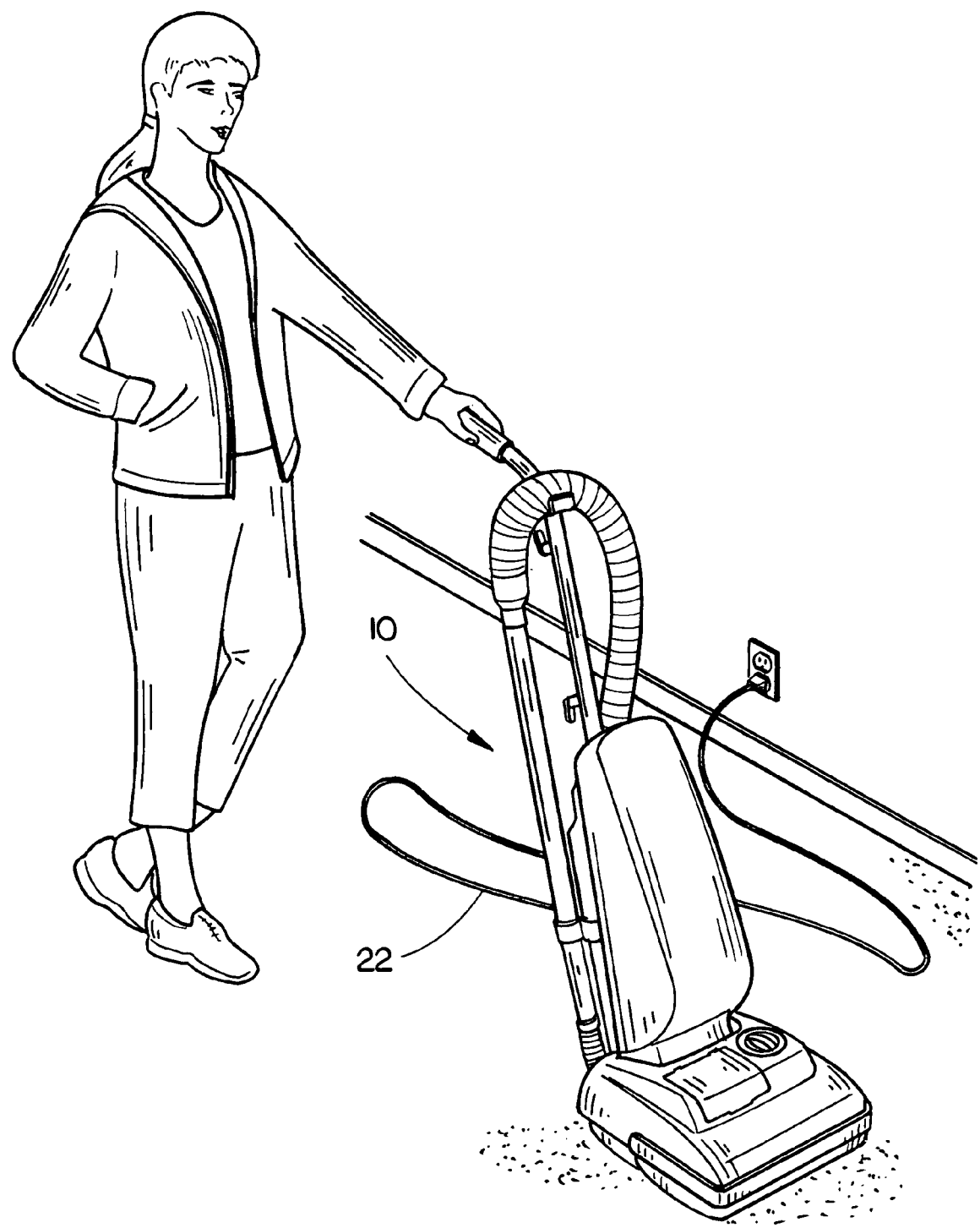
FIG. 9 is an isometric view of the hybrid vacuum cleaner illustrated in FIG. 1, wherein the hybrid vacuum cleaner is operated via AC current.
Figure 10:
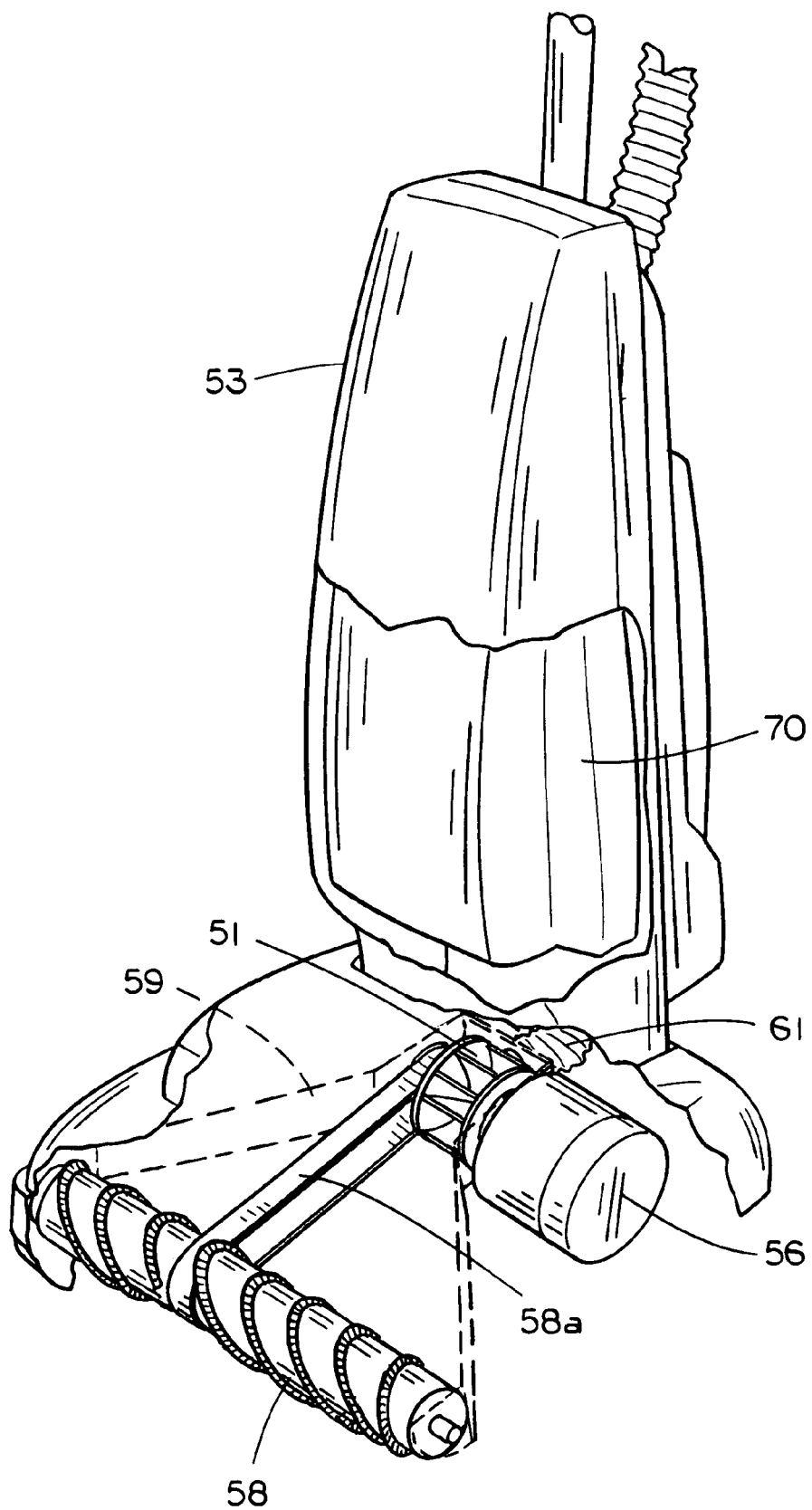
FIG. 10 is a partial cross-sectional isometric view of the hybrid vacuum cleaner illustrated in FIG. 1.

Alternatively, the hybrid vacuum cleaner 10 with power boost conserve feature of the present embodiment may be in operation while connected to an AC power source, as shown in FIG. 9. Thus, for example for cleaning relatively thicker carpet, which requires more power, the 120V boost mode may be selected by the power selection switch 21. It will be appreciated that the 120V boost mode may supply added voltage to the motor from the battery pack 52, from a secondary battery, and/or from any other auxiliary power source included with and/or connected to the hybrid vacuum cleaner 10 as needed. However, should there be a need to decrease the rotational speed of the impeller 51 and the beater bar 58 (for example when operating over an area where the carpet is generally less dirty), the 120V mode (a conserve mode) may be selected to decrease the voltage being supplied to the motor 56 to conserve energy. Thus, the boost and conserve feature as shown and depicted in the examples may be integrated with either power selection of the AC power input line or DC power input line to the DC motor 56. Further descriptions and implementations of such examples will be described hereinafter.

It may also be desirable in one of the present inventive embodiments, to provide a battery pack 52 which is easily removable from the vacuum cleaner motor housing 50. The hybrid vacuum cleaner 10 of the present embodiment may be used without the battery pack so as to be more easily maneuverable in sloped areas due to the reduced weight of not having the battery pack 52 installed. Removing the battery assembly may reduce a considerable amount of the weight. Additionally, the vacuum cleaner 10 of the present invention may make it easier to stow/store the vacuum cleaner and charge the battery pack 52 separately or alternatively, may promote ease of charging the battery when the vacuum cleaner 10 is still in operation (i.e., when AC power is available). It may also be desirable that a battery cover 52a, as shown in FIG. 1 at a closed position and in FIG. 7 at an open position, be provided to cover the location of the battery pack 52. It will be appreciated that operation time may be increased as a function of the charge on the battery. Further, it should be noted that operation time is maximized when the battery is fully charged. For this reason, the vacuum cleaner may be provided with a charging light for indicating that the vacuum cleaner is charging and/or is fully charged. The charging light may utilize various colors for indicating a charge condition. Alternatively, the charging light may utilize various on/off patterns, including blinking and the like. Further, it will be appreciated that more than one light may be included with the vacuum cleaner, and together, the lights may utilize a variety of color and/or flashing combinations.

The DC motor 56 may be a permanent magnet type DC motor and may be designed to receive power from the battery and/or from the hybrid power controller which will be described herein. The DC motor 56 may be provided to power the impeller 51 and the beater bar 58 while operating and the motor 56 may act as a generator in order to provide resistive breaking after deactivation of the power switch described thereby providing a resistive load to stop the impeller and the beater bar quickly once the power switch 31 is set to OFF position. It is contemplated that alternative embodiments with multiple motors or with multiple commutators selectively operating in series or in parallel may also be provided. It should be noted that the power consumed by the vacuum cleaner may be a function of the square of the motor speed. For this reason, it is contemplated that the speed of the motor may be adjusted to balance power requirements for cleaning carpet against the need for a desired operation time, which may be limited by battery power consumption.

As previously described, higher speeds may be indicated/attained when operating from AC line voltage while lower speeds may be recognized/attained when operating off of Battery DC voltage. Alternatively, in a low power or conservation mode, the run time may be considerably longer with battery life expected to be increased and with the speed of the DC motor 56 correspondingly decreasing to drive the impeller 51 at a pre-determined speed. The various speeds of the impeller 51 can correspond to a plurality of voltage outputs from the hybrid power supply as seen/detected/received by the DC motor 56. Namely, to provide higher speed functionality of the impeller, a voltage of 66V or 72V DC may be presented to the DC motor with a 300 watt/hr batter charge capacity. Alternatively, in conservation or low speed mode, which may thereby correspond to higher battery pack run time duration or less current draw from the power supply, the power consumption may be significantly reduced by providing 60V or less to the DC motor 56. These various power consumption modes may be provided through the use of the boost and conserve switch which, as can be seen from the examples depicted herein, may be a single pole double throw switch as shown in order to increase the voltage through the various techniques/hardware depicted and described in the multiple examples hereof.

Thus, when the vacuum cleaner 10 is in conservative mode, the corresponding impeller speed may be at the pre-determined speed or less thereby significantly increasing the battery pack charge run time when the battery pack is in operation and the power selection switch 21 is selected/positioned in the battery mode. In such an instance, the 60 volts may be provided to the DC motor by the battery pack 52, which may include a series of five batteries connected in series, each of the batteries providing 12 volts. Alternatively, should the power selection switch 21 be set to the battery boost mode, an additional or secondary battery which may be integrated with or separated from the battery pack 52, may be brought in series with the battery pack 52 power supply thereby increasing the voltage to 66 or 72 volts, depending on desirability and the impeller speed at which the vacuum cleaner 10 is to be operated.

Figure 14:
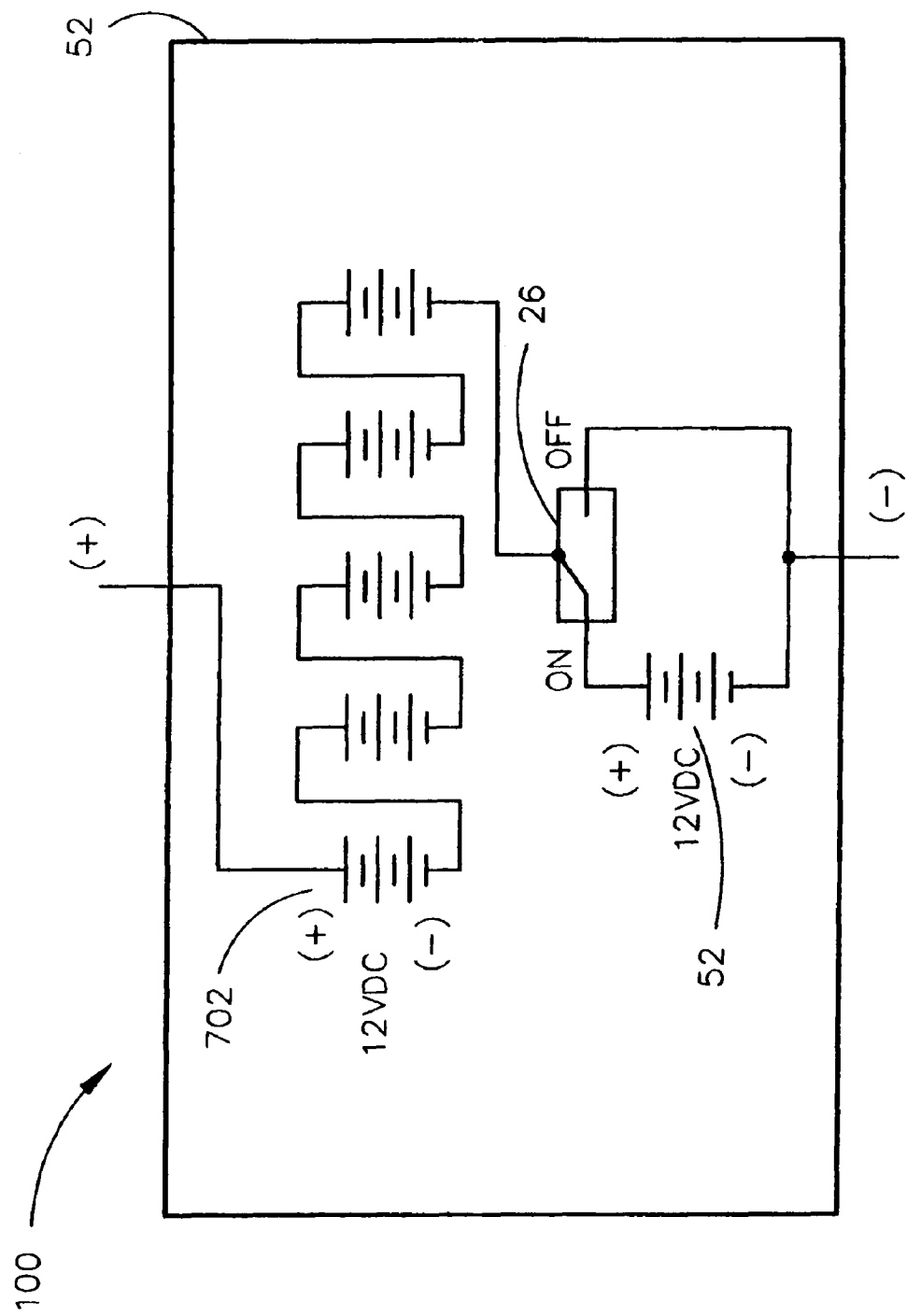
FIG. 14 is a circuit diagram of one option of a battery assembly for use with the hybrid vacuum cleaner illustrated in FIG. 1.

The battery assembly may include a stack of DC batteries connected in series. In one specific embodiment, as shown in FIG. 14, the battery assembly 700 includes a stack of five lead acid five amp-hour 12V DC batteries 702. In this configuration the voltage of the battery assembly may be around 60V. It will be appreciated that when fully charged, the voltage of the battery assembly 700 may be approximately 66V and, during battery discharge, may be reduced to approximately 50V. Further, it will be appreciated that as the battery discharges, the speed of the vacuum cleaner impeller may be reduced proportionally. For this reason, it is contemplated that the speed of the vacuum cleaner impeller may be set based on the fully-charged voltage of the battery assembly and/or the battery assembly and one or more other power sources, as utilized in a power boosting configuration.

In a further embodiment, the battery assembly 700 may be connected in series with an auxiliary battery 54 in a power boosting configuration, through the control of the boost conserve switch 26. The auxiliary battery 54 may be a five amp-hour 12V DC battery. In this configuration, when in the power boosting mode (boost conserve switch 26 is set to ON), the voltage of the battery assembly and the auxiliary battery together may be around 72V. It is understood that variations may be provided in the configuration and implementation while running in DC mode for the battery pack depicted herein as this example is provided merely for descriptive purposes only and many other embodiments including bringing batteries in parallel, series, or providing additional power sources may be utilized.

Figure 15:
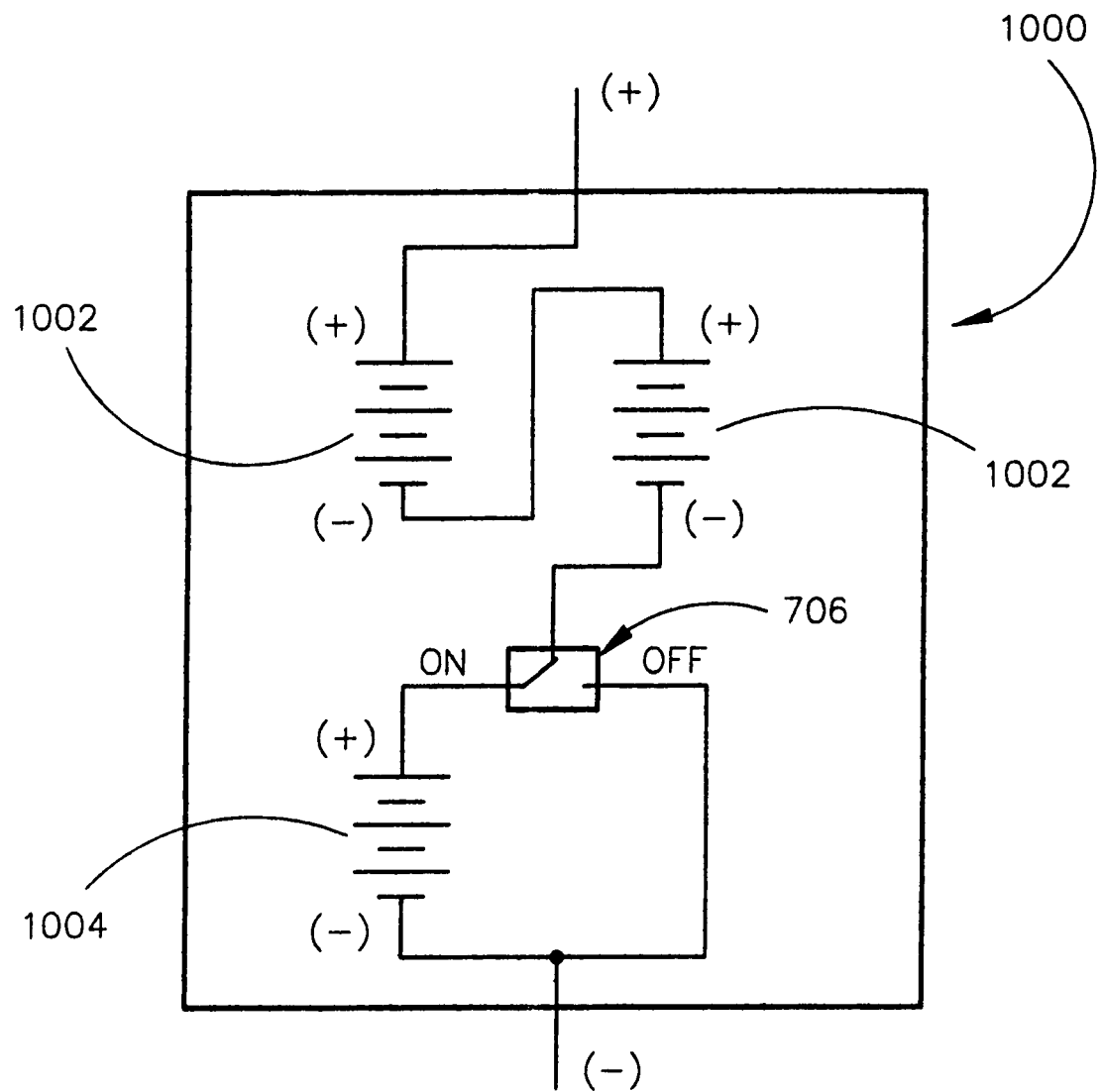
FIG. 15 is a circuit diagram illustrating a two battery assembly configuration for implementation with the hybrid vacuum cleaner of the present invention.

In another specific embodiment, the vacuum cleaner may include circuitry/hardware for rectifying and limiting 120V AC power to 90V DC power. In this configuration, a hybrid vacuum cleaner may include a 90V DC battery assembly. Because of the weight of such an assembly utilizing current battery technologies, it will be appreciated that the 90V DC battery assembly may comprise two or more separate assemblies, such as two 45V battery assemblies, or the like. This two battery assembly 1000 configuration is illustrated in FIG. 15. The two battery assembly 1000 comprises a stack of two, lead acid five amp-hour 45V DC batteries 1002. In this configuration the voltage of the two battery assembly may comprise around 90V. In a further embodiment, the battery assembly 1000 may be connected in series with an auxiliary battery 1004 in a power boosting configuration, through the control of a boost switch 706. The auxiliary battery 1004 may comprise a five amp-hour 12V DC battery. In this configuration, when in the power boosting mode (boost switch 706 is set to ON), the voltage of the battery assembly and the auxiliary battery together may comprise around 102V.

It is understood that variations may be provided in configuration and implementation of the battery pack depicted herein when the vacuum cleaner 10 is running in DC mode, as this example is provided merely for descriptive purposes only and many other embodiments including connecting batteries in parallel, series, or providing additional power sources may be utilized. It is also understood that various combinations of batteries may be utilized to satisfy different voltage and/or amperage needs, including, but not limited to 36V, 48V, 72V, among other voltage and/or amperage levels.

While the example of the conserve and boost switch has been provided for operation in DC mode, alternative embodiments which may provide an increase in motor speed while running in AC mode will also be described herein. Such embodiments may include increasing the step down voltage from the power supply controller as presented to the DC motor or alternatively bringing in series the secondary battery while also operating in AC mode thereby increasing the DC voltage presented to the motor and resulting in an increase in rotational speed of the impeller. Thus alternative embodiments are shown and depicted wherein the power supply of the present embodiment generates DC power to the motor and wherein the boost or increased voltage may be derived from either the power supply by various techniques, such as depicted, or by providing additional voltage from the battery pack or secondary battery, either of which may result in increased operational speed of the motor and impeller speed.

One other aspect of the present embodiment of the hybrid vacuum cleaner 10 of the present embodiment is the ability to provide a user selectable power supply to a DC motor driving the impeller 51. In the hybrid vacuum cleaner 10 of the present embodiment, a DC motor 56 is provided to rotate impeller 51 due to its energy use and supply characteristics. A user selectable alternative power supply or power selection switch 21 is provided in order that the DC motor 56 may be user switchable from power sources, namely from an AC 120 volt 60 Hz power input representing line voltage should an extension cord or line voltage be readily accessible, or alternatively, to a battery pack DC voltage provided on board of the vacuum cleaner, both power supplies selectable by the operator and both power supplies driving the same motor mounted on the vacuum cleaner motor housing 50. Such an option may be highly desirable and unique in that the user may selectively operate the vacuum cleaner from various user selectable inputs representing alternative power inputs, a first power input being provided at the power selection switch 21 representing a power input line from a battery pack 52, with a second power input being provided at the power selection switch 21 representing the AC line 22.

Further, as an alternative design element, an automatic mode may be available for the power selection switch 21. Under the automatic mode, the power control circuit 60 could include a solid state relay which, as an example, has a zero crossing circuit for voltage detection to activate a triac or other relay device to automatically connect the electric motors to line voltage, when plugged into the power control circuit. Such user selectable power selection can thus be automated by an automated voltage or other detection circuit or may be actuated by the switch 21 herein described. It is appreciated that the automatic selection may be overwritten by the user selection by setting the power selection switch 21 to an alternative power source selection. In exemplary embodiments, a switch/relay/solid-state switching device may be utilized to accomplish power supply selection.

The controller may employ a set of algorithms to control the battery assembly charge logic. For example, during an operation in AC power mode, the algorithm employed by the controller may examine the charge level of the battery assembly, and determine if recharging of the battery assembly is necessary. In one embodiment, a PIC algorithm(s) programmed on to an ASIC programmable controller chip is utilized to control all of the charge logic. It is further contemplated that the controller may contain a current sensor that senses the electric current going to the motor 56 and examines/references/compares the current level against the impeller speed to provide a soft start ramp up. The current sensor may also serve as a current overload protection device, preventing circuit breaker trip should a sudden drop of load occur (moving from a thicker carpeted area to a thinner or no carpet area). Further, the current sensor may signal a raise of the voltage to meet an increased power demand, thus maintaining the impeller speed at a relatively consistent level.

Figure 45:
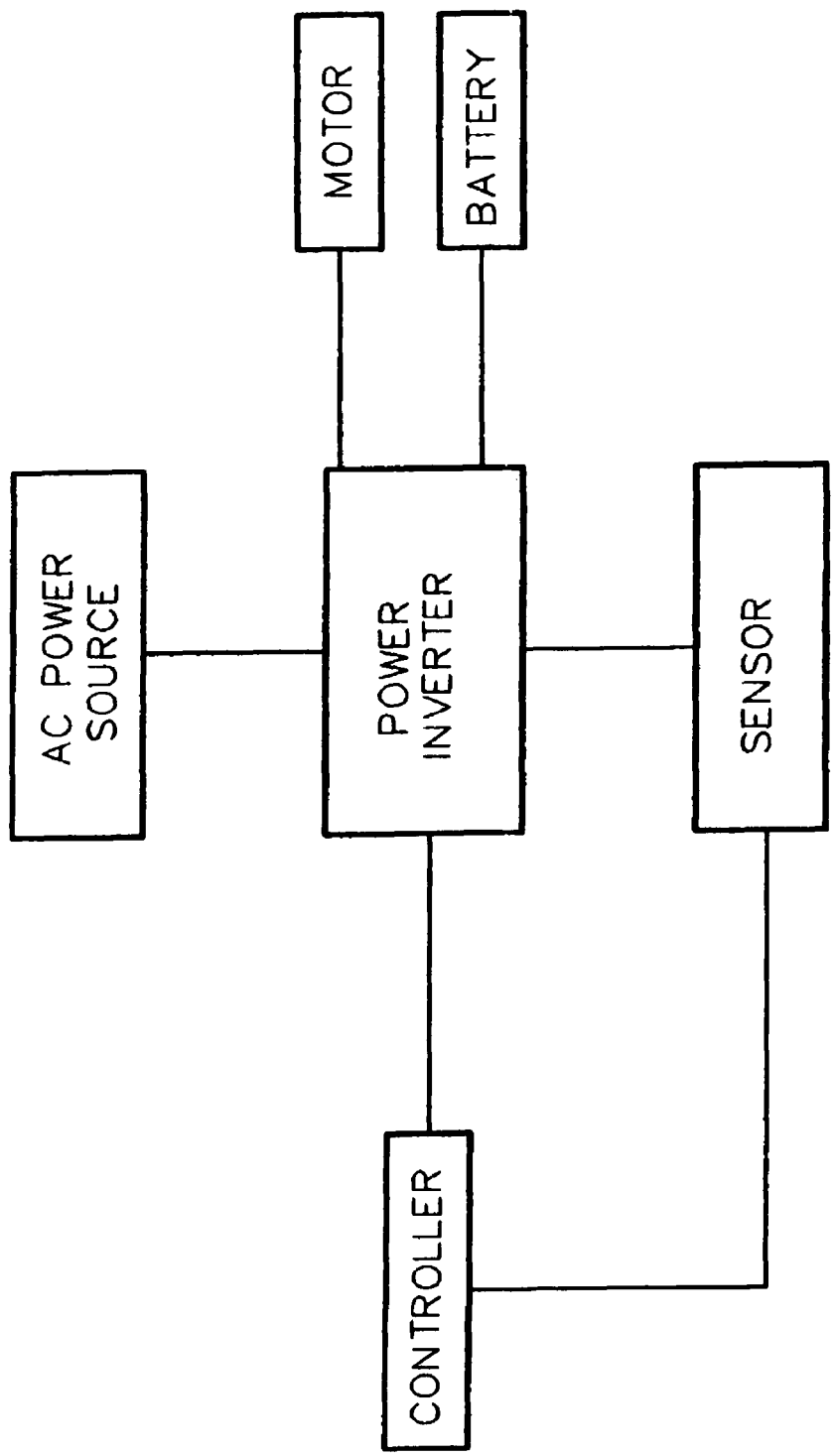
FIG. 45 is a block diagram of a battery charging mechanism for use with the hybrid vacuum cleaner of the present invention.

The controller may employ a set of algorithms to control the battery assembly charge logic/mechanism. For example, as illustrated in FIG. 45, when the hybrid vacuum cleaner is connected to an AC power source, the algorithm employed by the controller may examine the charge level of the battery assembly utilizing one or more sensors (e.g., a voltage sensor and/or a current sensor), and determine if recharging of the battery assembly is necessary. In one embodiment, a PIC algorithm may be programmed on an ASIC programmable controller chip (controller) and utilized to control the charge logic. It is contemplated that the algorithm may further contain logic to achieve a rapid charging during a charging process. In a specific embodiment, a PIC algorithm/PIC controller may be utilized to configure the charging mechanism as a switch mode charger.

Figure 46:
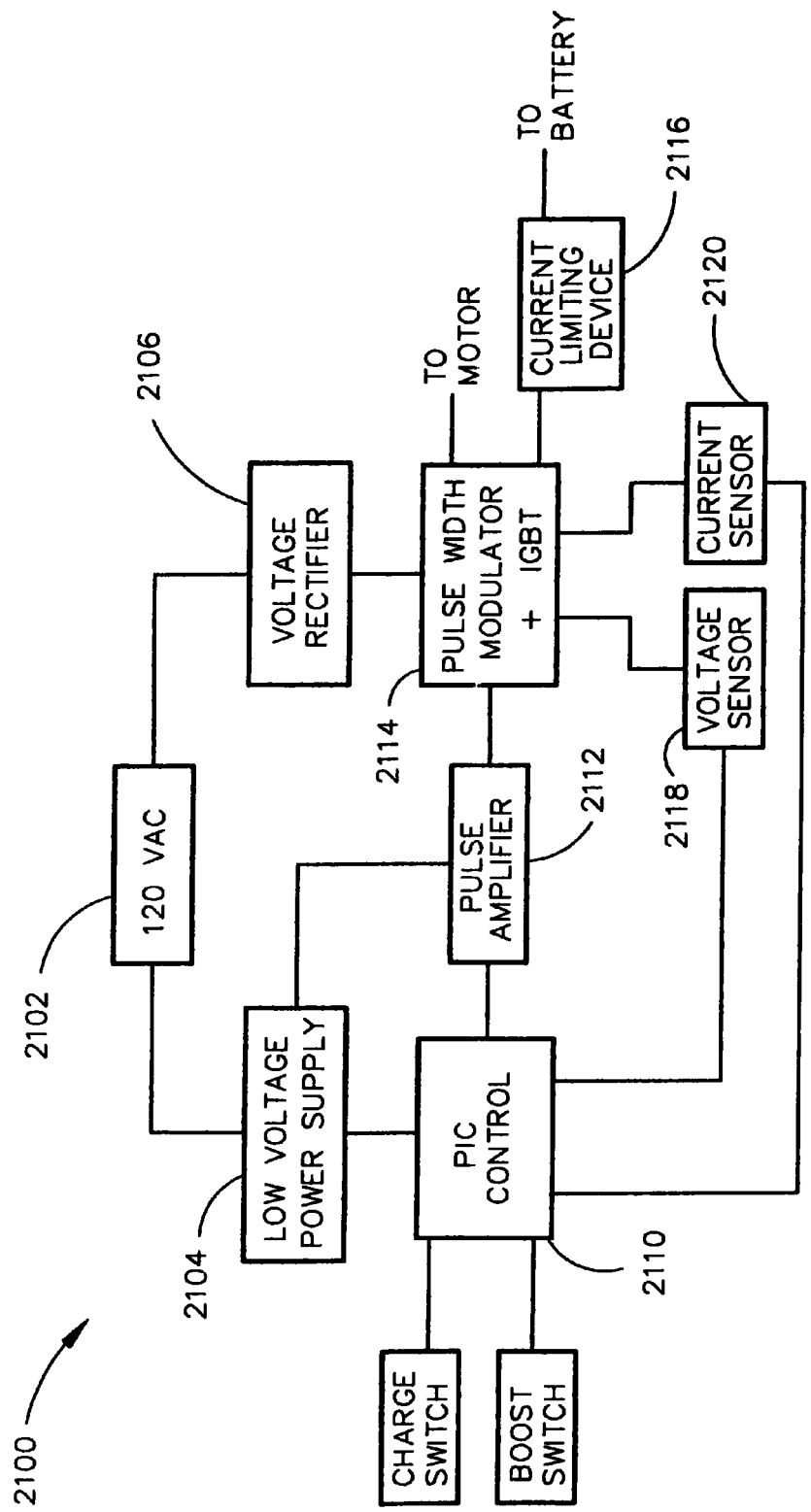
FIG. 46 is another block diagram of a battery charging mechanism for use with the hybrid vacuum cleaner of the present invention.

Referring now to FIG. 46, there is shown a block diagram of an exemplary battery charging mechanism 2100 for use with the hybrid vacuum cleaner 10. In one specific embodiment, a PIC algorithm (PIC controller) 2110 embedded in the hybrid vacuum cleaner controller is utilized to configure the charging mechanism 2100 as a switch mode charger. An AC power source 2102 provides current to a low voltage power supply 2104 and a voltage rectifier 2106. The low voltage power supply 2104 supplies rectified low voltage DC (e.g. 5 VDC) to power the PIC control 2110 and a pulse amplifier 2112. The voltage rectifier 2106 supplies rectified DC voltage to a pulse width modular (PWM) 2114. The PWM 2114 is capable of providing current to the motor and/or the battery of the hybrid vacuum cleaner 10. The current provided to the motor and/or the battery by the PWM 2114 is controlled by the pulse amplifier 2112, which is controlled by the PIC controller 2110. A modifiable duty cycle controlled by the PIC controller 2110 is utilized to provide appropriate average voltages per cell to achieve a rapid charging.

The PIC controller 2110 utilizes a voltage sensor 2118 and a current sensor 2120 to sense voltage and current levels, respectively. A current limiting device 2116 (e.g. a resistor or a transformer) is utilized to limit the voltage level from the PWM 2114 to the battery to appropriate levels. In one specific embodiment, a 0.01 ohm current sense resistor (current limiting device) 2116 is used to infer the state of charge of the battery by sensing the current flowing through the battery. During each "on time" (e.g., where "on time" represents a time period during which a charge is applied to the battery) of a cycle, multiple current samples are taken by the current sensor 2120. A fixed number of the most recent current samples (e.g. the most recent 20 samples) are analyzed to determine an average current level for this cycle. The average current level is monitored to determine the time elapsed between transitions from one current level to the next.

In one specific embodiment, during rapid charging process, current flow from the PWM 2114 to the battery is turned on by the PIC control 2110 for two (2) seconds, and then turned off for seven (7) seconds. This duty cycle configuration provides approximately 2.5 Volts per cell on average. When current samples taken by the PIC controller 2110 indicates that the speed of transitions has increased, correlating to a battery that is more than 80% charged, the PIC controller 2110 modifies the duty cycle of the charging cycle by changing the duration and period of the charging pulse waveform, effectively lowering the average voltage to the battery to approximately 2.25 Volts per cell, which is appropriate for the float charge cycle of the battery, and prevents overcharging.

It is contemplated that the PIC controller 2110 may comprise additional logic controls for the battery charging mechanism. For example, in one specific embodiment, a timer logic is utilized to specify a predetermined maximum charge time. Once the predetermined maximum charge time (e.g. 12.5 hours) have passed without meeting the criteria of the regular charge completed algorithm described above, the charging mechanism may be automatically switched to a trickle charge (maintenance) mode instead of active charging mode. In another embodiment, a battery sensing algorithm is employed to detect if the battery is installed incorrectly. In still another embodiment, the controller is capable of sensing line voltage frequency (e.g., 50 or 60 Hz), and adjust charging characteristics accordingly. It is further contemplated that the PIC controller algorithm may be modified to allow for more charge stages than is depicted above, by varying the pulse width and/or duty cycle of the charge signal in response to current or voltage measurements on the battery.

It will be appreciated that the battery charging mechanism 2100 utilizing charging cycles may also provide functionality as a battery desulphator. Such functionality may be particularly desirable for hybrid vacuum cleaner batteries, as there may be a season of storage wherein the battery may be stored in a discharged state during which sulphate buildups may occur. It is further contemplated that the charging mechanism may comprise additional components/logics. For example, in a specific embodiment, a charging indicator (e.g., a Light Emitting Diode (LED) or another type of light and/or indicator) is utilized to indicate the state of charge of the battery. In another embodiment, a temperature sensor is utilized to turn off charging if the battery overheats during charging, and/or if the surrounding temperature exceeds a predetermined level.

It is also contemplated that a more precise state-of-charge determination may be possible by comparing current level samples taken within an "on time" of a cycle (comparing early current levels sampled with later current levels sampled within the same on time). Direct battery voltage detection circuitry may be employed to realize a more precise state-of-charge determination. An additional microcontroller may be utilized (e.g., together with the battery) to monitor and record current transfer in and out of the battery and communicate that information back to the PIC controller for more precise state-of-charge determination. It is further contemplated that the PIC controller may be employed to control charging mechanisms for other types of batteries. Further, it will be appreciated that the PIC controller may be configured for different charging voltages and characteristics. It is also contemplated that charging while operating on line (AC) voltage may be supported.

It is further contemplated that the controller may contain a current sensor that senses the electric current going to the motor 56 and examines/references/compares the current level against the blade speed to provide a soft start ramp up. The current sensor may also serve as a current overload protection device, preventing circuit breaker trip should a sudden drop of load occur (moving from a taller grass area to a shorter or no grass area). Further, the current sensor may signal a raise of the voltage to meet an increased power demand, thus maintaining the blade speed at a relatively consistent level.

Figure 12:
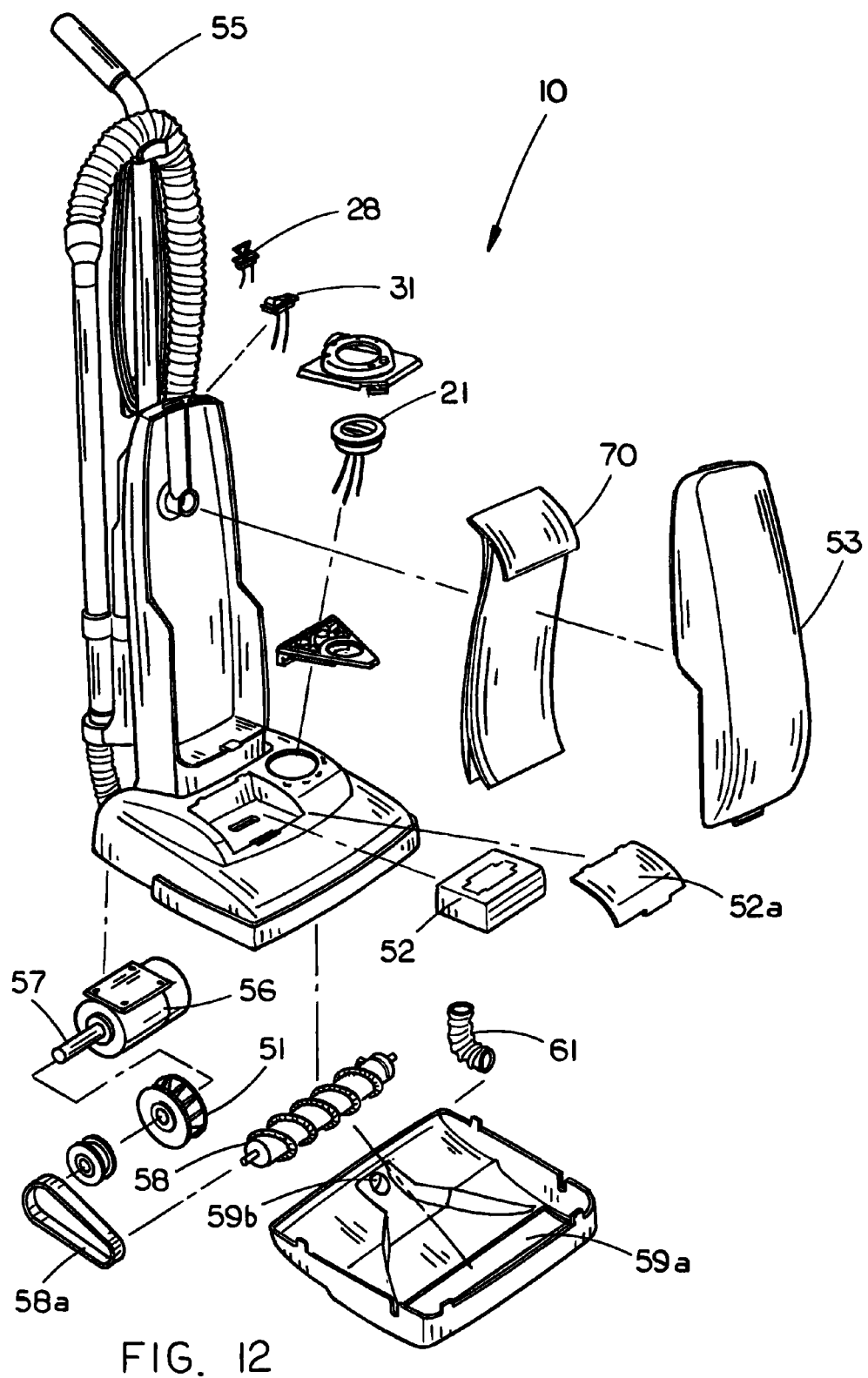
FIG. 12 is an exploded isometric view of the hybrid vacuum cleaner illustrated in FIG. 1.
Figure 13:
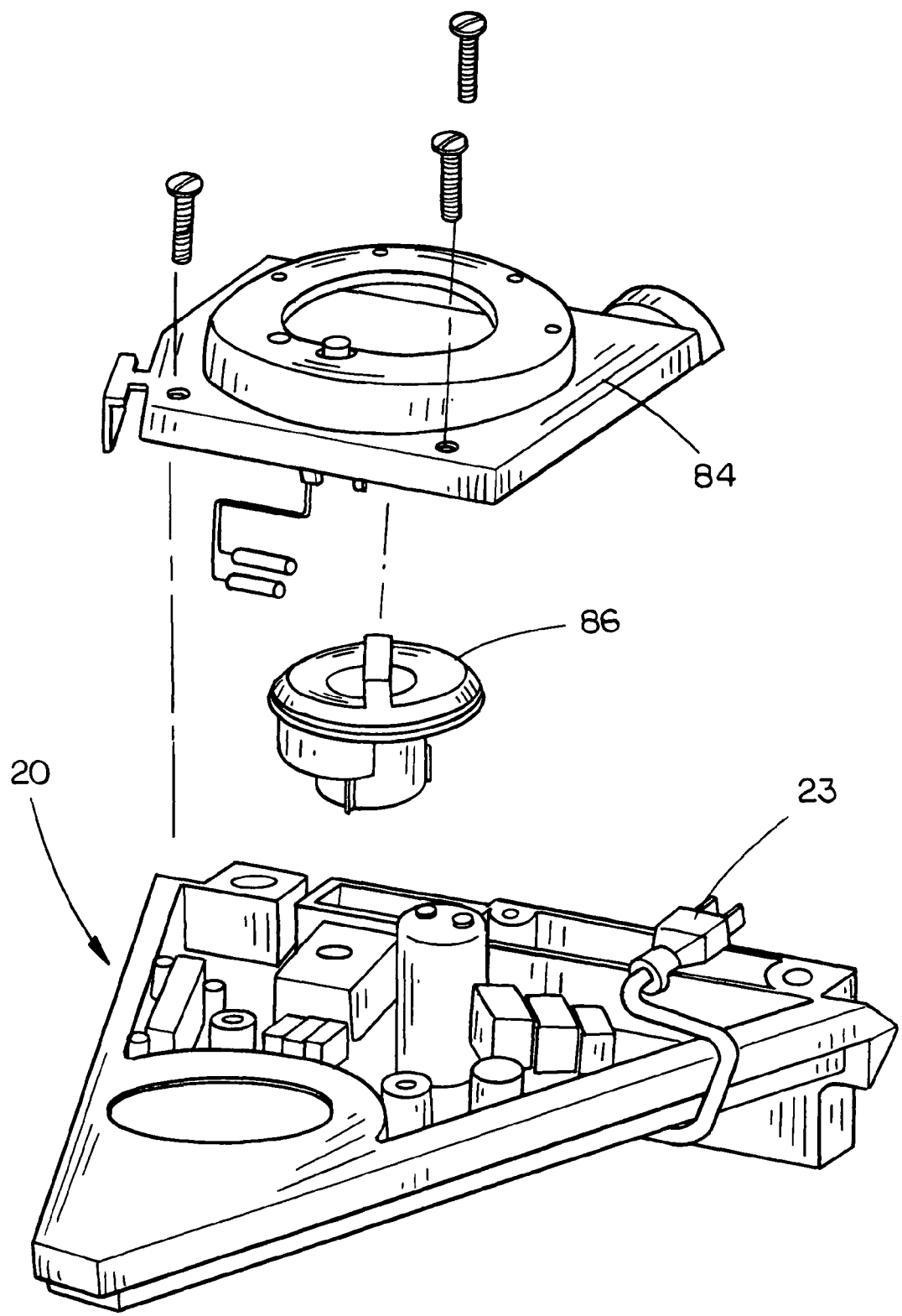
FIG. 13 is an exploded isometric view illustrating a control unit for the hybrid vacuum cleaner illustrated in FIG. 1.

Referring to FIGS. 12 and 13, there is shown an exploded view of an exemplary embodiment of the vacuum cleaner 10. Enclosed in the motor housing 50 includes a battery assembly 52, a controller (power control module) 20 mounted on to a generally triangular shaped support plate (control mount). Positioned on top of the controller is the power selection switch knob 86, covered by a control box cover 84. In one specific embodiment, the control mount is formed as an A-frame structure that is independent of the cover of the motor housing 50. This configuration may aid in the assembly of the hybrid vacuum cleaner 10. The knob 86 is accessible by a user through an opening on the cover of the housing 50. Also mounted on to the support plate are additional circuit boards, electrical connectors and an AC receptacle 23. Attached to the bottom of the support plate is a side portion of the motor 56, which is electrically connected to the controller 20, and mounted to the bottom portion of the housing 50.

The housing 50 further comprises a vacuum chamber 59, having a first opening 59a at the bottom of the motor housing 50, and a second opening 59b towards a waste collector housing 53 pivotly attached to the motor housing 50. A shaft 57 having a first end attached to the motor 56 transfers rotational energy to an impeller 51 enclosed in the vacuum chamber 59. A second (opposite) end of the shaft 57 is extended through the impeller 51, and is attached to a drive belt 58a to transfer rotational energy to a beater bar 58 located at the first opening 59a of the vacuum chamber 59. The waste collector housing 53 comprises a dust bag (waste collector) 70, which is connected to the second opening 59b of the vacuum chamber 59 with a dust connecting hose 61. The waste collector housing 53 further comprises a handle 55.

It is understood that alternative designs of the vacuum cleaner may be employed without departing from the scope and spirit of the present invention. For example, in one embodiment, the power control switch 21 is positioned near the controller 20 on the motor housing 50 to reduce the amount of wiring needed for connection. In an alternative embodiment, the power control switch 21 may be positioned near the handle 55 to promote ease of use. Further, an AC cord holding device may be utilized to promote easier retrieving or retracting of the AC cord 22. In one embodiment, an AC cord holding device of a generally rectangular shape is rotatably attached to the handle. Rotating the device in one circular direction (for example clockwise) may retract the AC cord 22, while rotating the device in a reverse circular direction (for example counterclockwise) may allow user to retrieve more of the AC cord 22. Alternatively, the device may be configured in other geometrical shapes, for example, in a generally circular shape. In still another alternative embodiment, the cord holding device includes two stationary holders distanced apart from each other (for instance 1 foot apart), where the user may wind/unwind the AC cord around the two stationary holders to retract/retrieve the cord 22.

Figure 16:
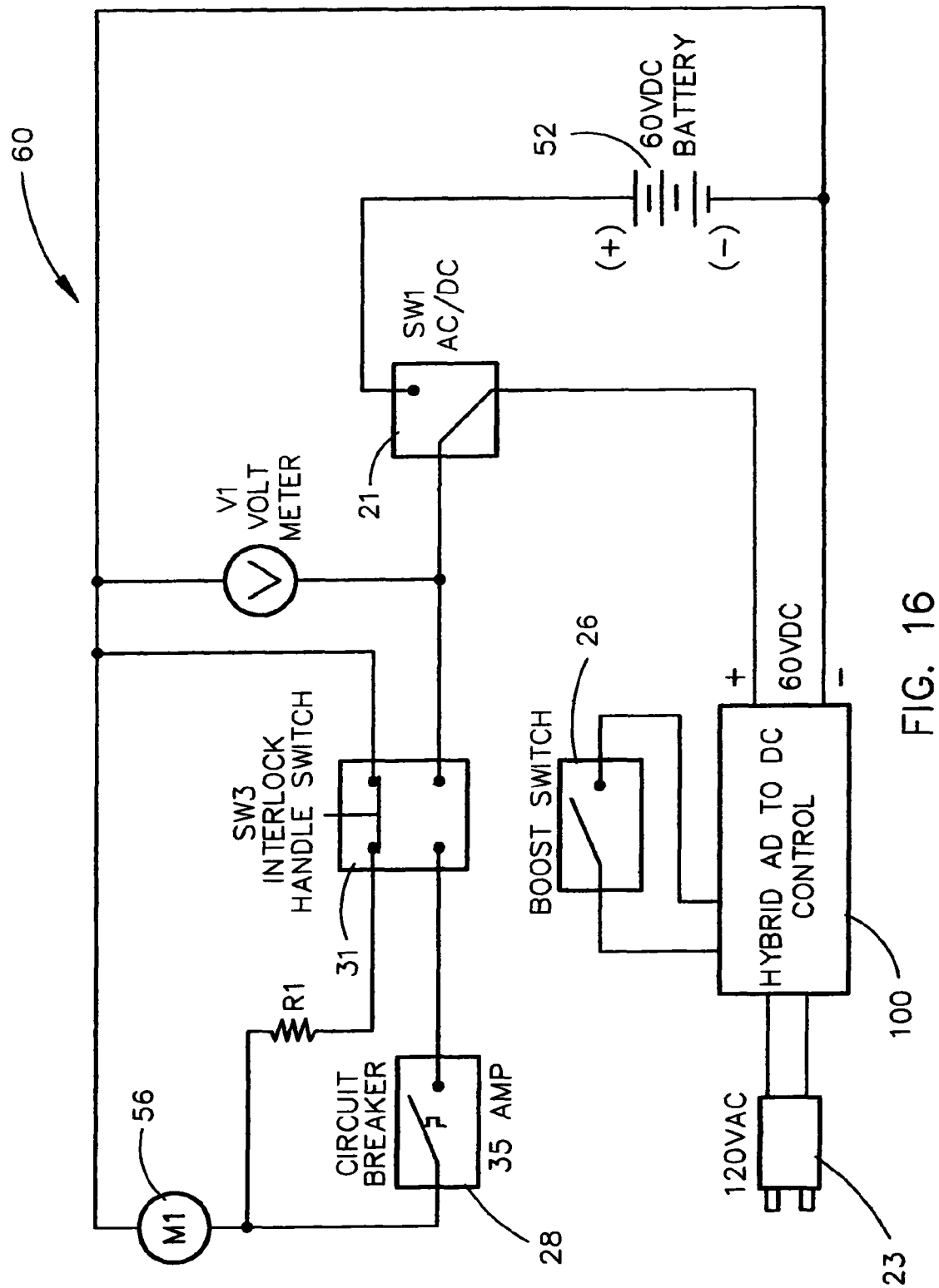
FIG. 16 is a circuit diagram of one option of a power control circuit for use with the hybrid vacuum cleaner illustrated in FIG. 1.

Turning to an exemplary embodiment shown in FIG. 16 wherein a power control circuit 60 is depicted providing, among other things, the boost and conserve power features of the present embodiment. The DC electric motor 56 is shown in electrical connectivity with the various power control circuit elements 60, 100 which include the interlock handle switch 31, for example being a double pole double throw switch, a circuit breaker 28 being, as depicted herein, a 35 amp breaker, a boost/conserve switch 26, in this example being a single pole double throw switch, a power selection switch 21, in this example being a single pole double throw switch, a battery pack 52 which is depicted as a 60 volt DC battery pack providing 60 volts presented to the motor 56 when operatively selected by the power selection switch 21, and a hybrid AC/DC controller 100 which serves as a power inverter or step down controller for converting the line voltage 120 VAC presented by the plug 23. The battery pack is shown as sharing a common ground with other portions of the power control circuit but may be in electrical connectivity with the power control circuit in many known and understood manners without actual connected electrical wiring as long as the user operation of the vacuum cleaner is actuated through activation of the various switches.

In this present example, the boost selection switch 26 provides an increased voltage to the motor 56 by virtue of modifying an input resistive value or timing signal value to the pulse width modulation control unit 120 (see FIG. 17), which will be described below, in order to alter the gating of the IGBT thereby affecting the voltage wave form at the output of the power inverter or step down controller 100. The in rush current limiter may be provided as shown in order to prevent over-saturation of the circuit during the initial startup and energizing of the circuit. The rectifier 110 (see FIG. 17) as is commonly understood rectifies the voltage from AC to DC, in this case utilizing a full bridge rectifier as shown. However, many different forms of providing a step down controller are known in the art and the depictions set forth are not to be considered unduly limiting.

As depicted in FIG. 16, the design consists of the AC receptacle 23 which connects to the hybrid AC/DC controller 100 acting as a voltage converter which in turn is connected to a single pole double throw power selection switch 21 and a single pole double throw boost switch 26. The boost switch 26 is the boost conserve switch depicted and described herein and it provides resistive loads to the CMOS micro-controller for pulse width modulation control 120 when selected and opens the contacts when off. The power selection switch 21 toggles the DC motor between the output of the step down controller 100 and the DC battery voltage source 52. The output of the power selection switch 21 feeds a voltage meter shown which may be connected in parallel with the double pole double throw interlock handle switch 31, the interlock handle switch 31 toggling between shorting the DC motor 56 through resister R1 to ground and connecting the output of the power selection switch 21 through a circuit breaker 28 to the DC motor 56.

In this embodiment as depicted in FIG. 16, the boost switch 26 may provide increased voltage to the motor 56 when the hybrid vacuum cleaner 10 of the present embodiment is plugged in and running off of line voltage AC power. Such boost may be effectuated by modifying the pulse width modulation control 120 through alteration of the input resistive load at input pin 7 of the micro-controller shown in FIG. 17. More description of the power inverter and/or step down controller 100 of the power supply and vacuum cleaner of the present invention will be set forth herein.

Figure 26:
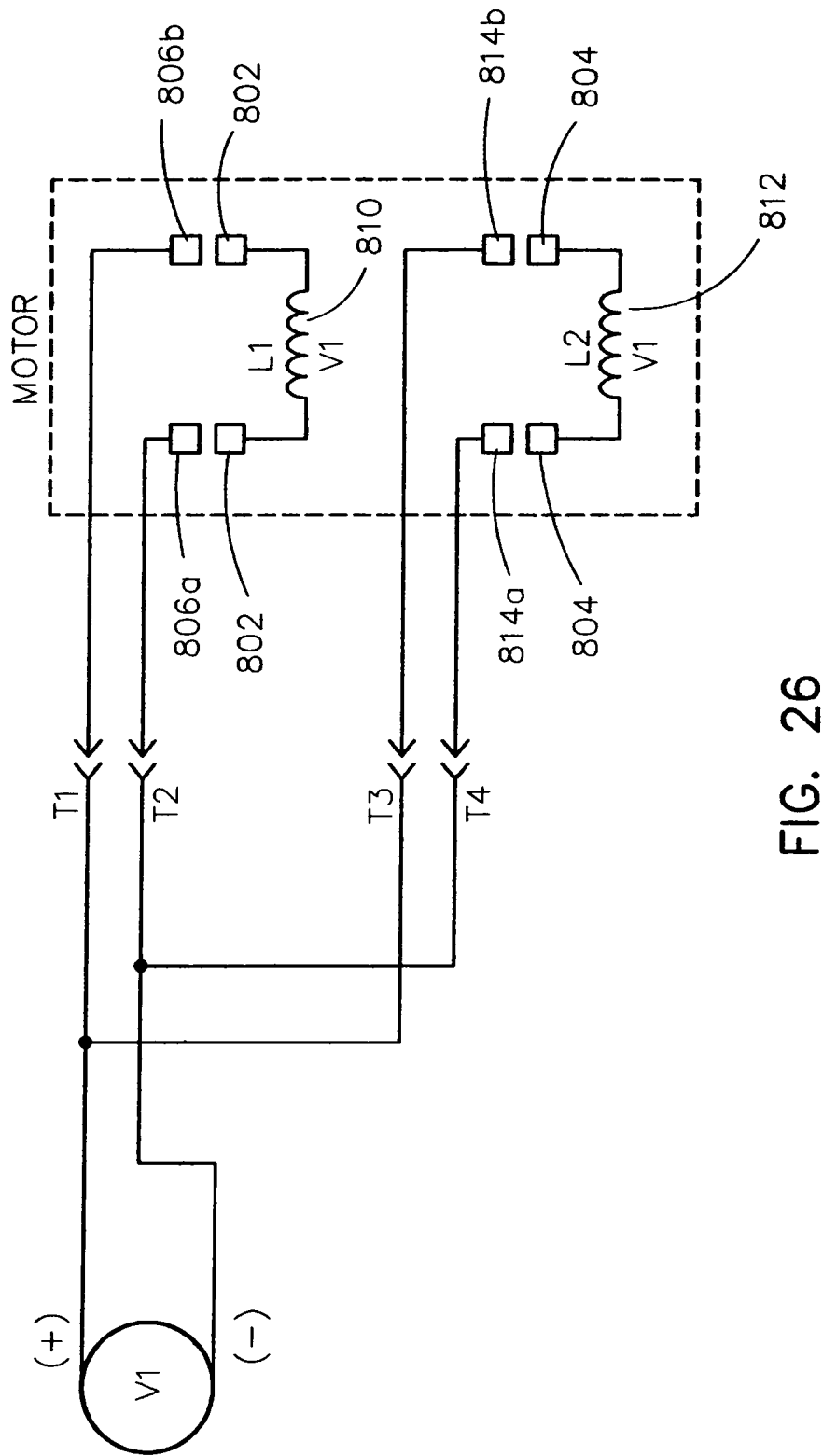
FIG. 26 is a circuit diagram illustrating a parallel configuration utilized by the motor illustrated in FIG. 25.

Turning to an additional embodiment for the power supply circuit 160 of the present embodiment in FIG. 26, this embodiment provides an AC wall plug 23 which connects to an AC voltage and to the hybrid AC/DC controller 100 which in turn is connected to the power selection switch 21 which allows toggling between output of the AC/DC hybrid controller 100 when in the AC selection and to a boost conserve switch 26 and alternative power source when in the DC position. The boost conserve switch 26 toggles between shorting the positive side of the battery source 52 directly to the boost switch 26 when off and connecting the battery source 52 in series with the secondary or boost battery 64 before connecting to the power selection switch or AC/DC switch 21. The power selection switch 21 then feeds a voltage meter V which is connected in parallel with an interlock handle switch 31, here depicted as a double pole double throw switch. The interlock handle switch 31 toggles between shorting the DC motor 56 through a resistor R1 to ground and connecting the output of the power selection switch 21 through the circuit breaker 28 to the DC motor 56.

Figure 18:
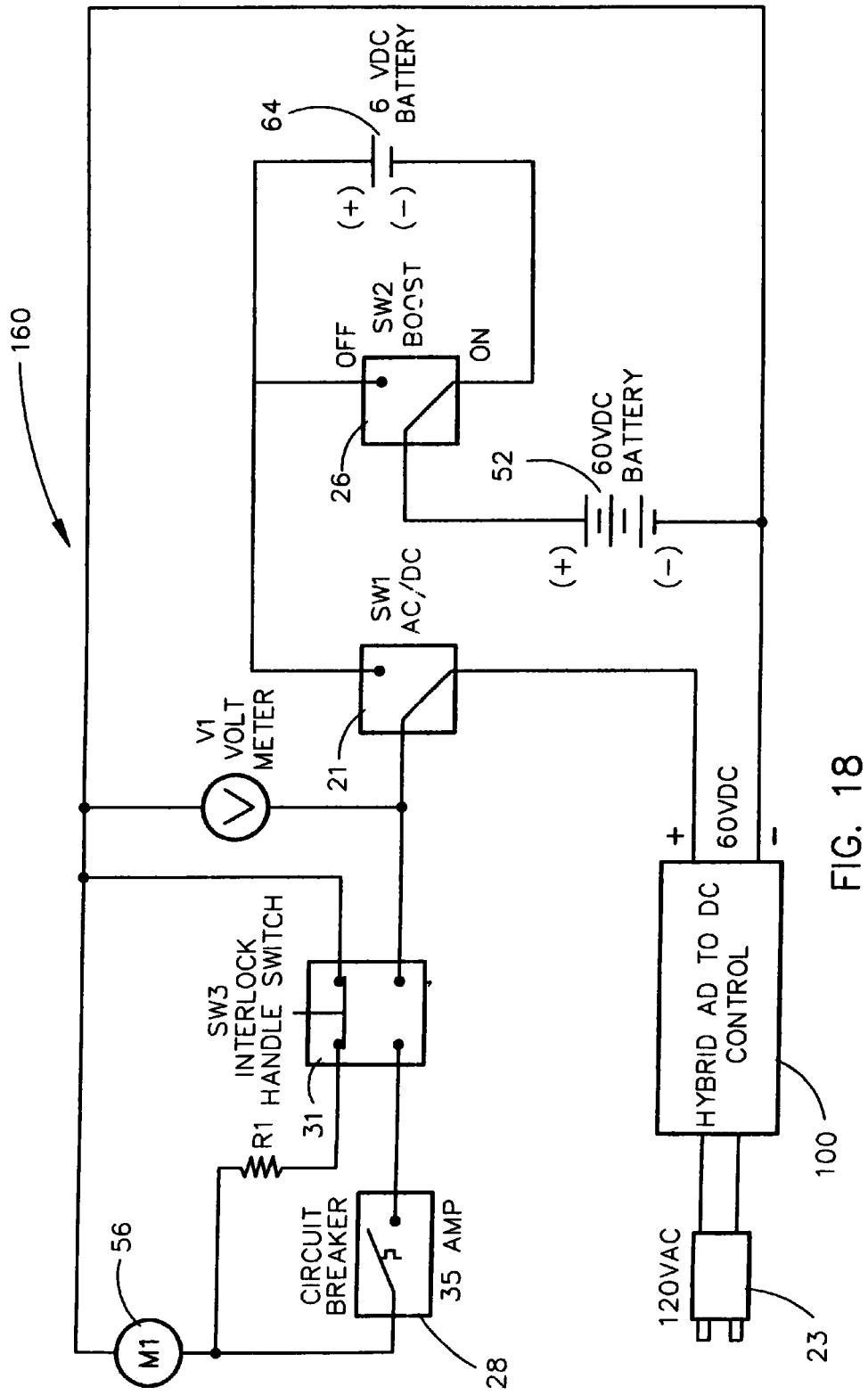
FIG. 18 is a circuit diagram illustrating one option of the power control circuit for use with the hybrid vacuum cleaner illustrated in FIG. 1.

As depicted, in the example shown in FIG. 18, additional voltage is provided to the DC motor 56 when the hybrid vacuum cleaner is positioned in the DC power selection option and the boost switch 26 is activated thereby providing an additional 6 volts DC to the 60 volts DC provided by the battery 52. A secondary battery 64 provides additional voltage to the motor thereby increasing the motor speed and corresponding impeller speed through actuation of the boost/conserve switch 26 to the boost setting. Thus, the power control circuit or power supply 160 depicted in FIG. 18 allows the operator, while in the DC battery operation mode, to increase the operating speed of the motor 56 corresponding to/via the additional voltage provided by the secondary battery 64. Controls are also provided allowing the operator to select between the operation of the motor 56 through the use of line voltage, namely 120 VAC, or through the use of the battery pack 52. Depicted herein is a secondary boost battery 64 which is provided separately from the battery pack 52, but it may be more practical to provide a secondary boost battery 64 in combination with and contiguous to the battery pack 52 as assembled and shown in the figures. Thus, the secondary boost battery 64 may be continuous with the battery pack 52 or may be separate but is provided to add additional voltage to the motor 56 in order to modify the operating output voltage of the power supply as presented to the motor 56.

The hybrid AC/DC controller 100 as shown provides both power inverter and step down capabilities in order to modify and regulate the 120 VAC to the proper voltage required to run the DC motor 56. However, these functions are provided to be only exemplary. The controller 100 acts as an inverter via rectifier 110 and also acts to properly modulate the voltage via the PWM controller 120 and associated gates. The power inverter and step down controller 100 may be part of the power supply or power control module 60 (see FIG. 16), 160 (see FIG. 18), 260 (see FIG. 19) and 360 (see FIG. 20) as needed, or may be excluded, depending on the voltage characteristics of the input line voltage and the requirements of the electric motor implemented in the present design.

Figure 19:
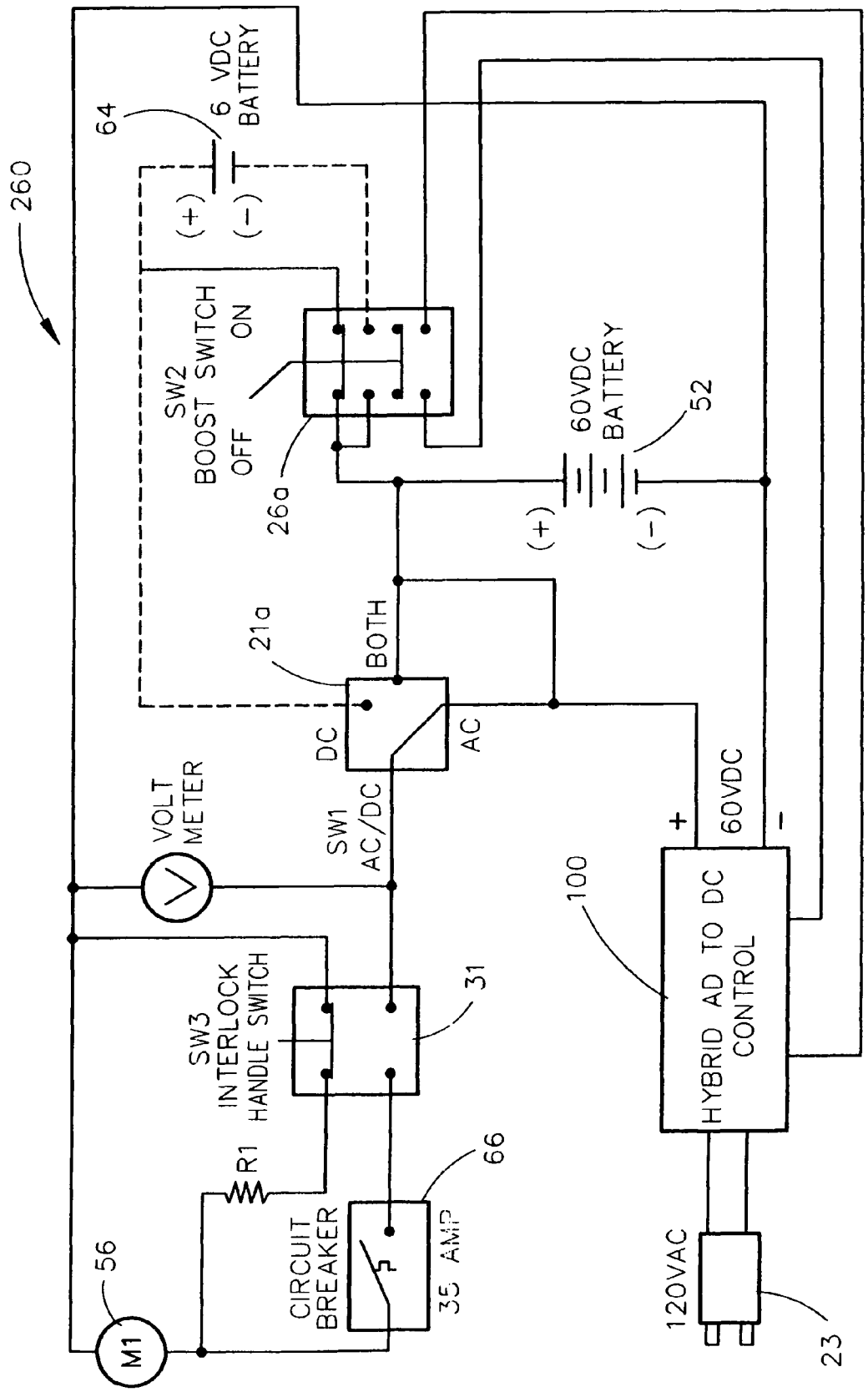
FIG. 19 is a circuit diagram illustrating an alternative option of the power control circuit for use with the hybrid vacuum cleaner illustrated in FIG. 1.

An alternative construction for the power control is the power supply circuit 260 depicted in FIG. 19 wherein both 120 VAC may be provided to supply power to the motor 56 while optionally a 60 volt DC battery may be provided and may be operatively selectable by the user through/via the power selection switch 21*a*. As depicted in this example, the boost switch 26*a* is operative to bring in series a secondary battery 64 which is 6 volts DC (when set in "BOTH" mode) with the voltage provided by the hybrid controller 100 of the power supply or the battery pack 52. The secondary battery 54, as previously described and as depicted in this embodiment of the power control circuit 260, may be in combination with the battery pack or may be secondary and separate therefrom. Additionally, as shown in the illustrated example, the 6 volt battery is brought into the circuit in series with the DC output of the hybrid control 100 or with the battery pack 52. Also, many variations for the structure, assembly and actual value of the secondary battery 64 for all embodiments may be provided in order to increase the voltage to the motor 56.

As depicted in FIG. 19, the power selection switch 21*a* further provides for three settings allowing user selectable options of powering the DC motor 56 by either 120 VAC, by the direct battery pack connection or by a hybrid BOTH connection. When operating in the strictly 120 VAC mode, the hybrid AC to DC control 100 of the present embodiment regulates and modulates the voltage for proper supplying of voltage to the DC motor 56. Alternatively, the power selection switch 21*a* provides for a DC operation whereby the motor 56 is operated merely by the battery pack 52. A third option is placement of the power selection switch 21*a* into the BOTH mode, wherein there may be a limited amount of power contribution from the battery. In such instance, voltage drops caused by increased load on the motor 56 may result in increased contribution from the battery pack 52. Additionally, as depicted in the embodiment shown, the boost conserve switch 26*a* may be provided for contribution of additional voltage from the secondary battery 64 when the power selection switch 21*a* is placed in either the BOTH or DC mode. In such an instance, the secondary battery 64 is brought in series with the voltage contribution from either the power supply 100 or the battery pack 52.

Figure 20:
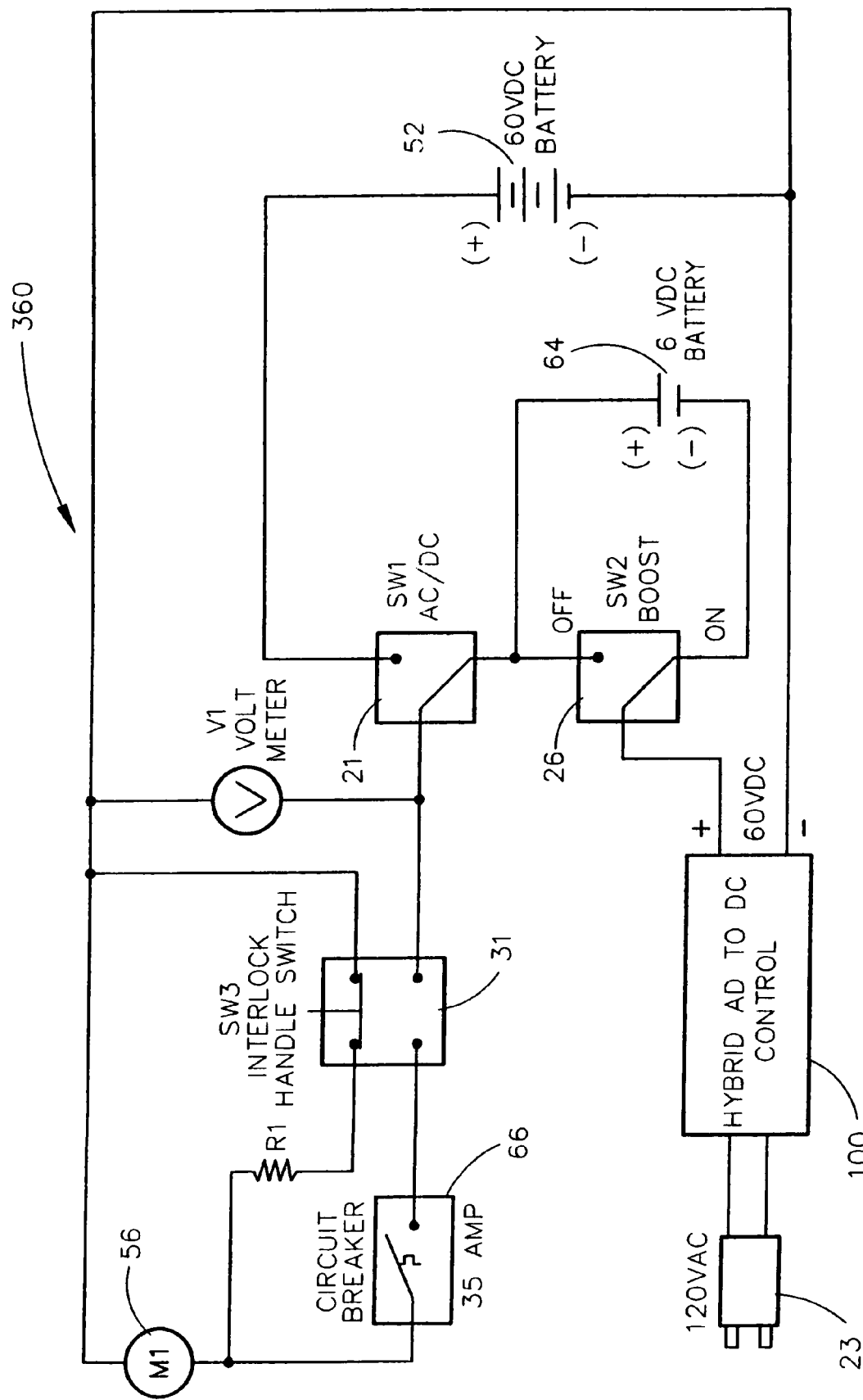
FIG. 20 is a circuit diagram illustrating still an alternative option of the power control circuit for use with the hybrid vacuum cleaner illustrated in FIG. 1.

Turning to FIG. 20, an alternative construction and embodiment of the power control and supply circuit 360 is depicted. In the example depicted, the power supply circuit 360 consist of a 120 VAC wall receptacle 23 which connects to the hybrid AC controller 100 which in turn is connected to an exemplary single pole double throw boost switch 26 thereby allowing the circuit to bypass boost battery 64 when off or be connected to the boost battery 64 when on. Additionally, the circuit continues to an exemplary single pole double throw power selection switch 21 which toggles between the output of the speed selection switch 26 when in the AC position and the DC battery assembly 52 when in the DC position. The power selection switch 21 feeds a voltage meter V which is connected in parallel with an exemplary double pole double throw interlock handle 31, the interlock handle switch 31 toggling between short in the DC motor 56 through a resistor R1 to ground and connecting the output of the power selection switch 26 through a circuit breaker 66 to the DC motor 56. In this example of the power control circuit 360, the boost or secondary battery 64 is brought in parallel with the power pack 52 or with the output of the hybrid controller 100 which may increase the current capacity for the motor when in higher speed or boost mode.

Multiple variations of power control module or power supply may be provided and are described herein. When mentioned herein as a hybrid power controller, power supply, power control module, step down controller or hybrid controller, these terms are collectively meant to imply providing electricity to the motor placed on the vacuum cleaner housing. No single element set forth in the exemplary embodiments provided herein, namely the power supply elements of the switches, battery packs, circuit breakers, inverters and modulation elements are to be unnecessarily applied to the interpretation of these terms. In fact, the power supply circuit collectively described herein may be implemented through the use of a significant number of alternative structures for regulation, modulation, controlling or limiting the proper voltage or power to the motor implemented in the examples herein. No unnecessary limitation should be interpreted from the particular use of the term controller, inverter, regulator or regulation or modulation as depicted herein. Furthermore, it will be appreciated that exemplary variations may not include a controller at all. For example, it is contemplated that implementations including a motor having two separate commutators on a single armature (as previously described) may be connected to either power supplied from AC mains (e.g., at 120V) or power supplied from a DC battery (e.g., at 60V) without requiring such a controller. Thus, a hybrid vacuum cleaner 10 may be provided that is capable of operating one or more motors utilizing either AC or DC current (or both) while not requiring a complex/costly electronic control mechanism.

Figure 17:
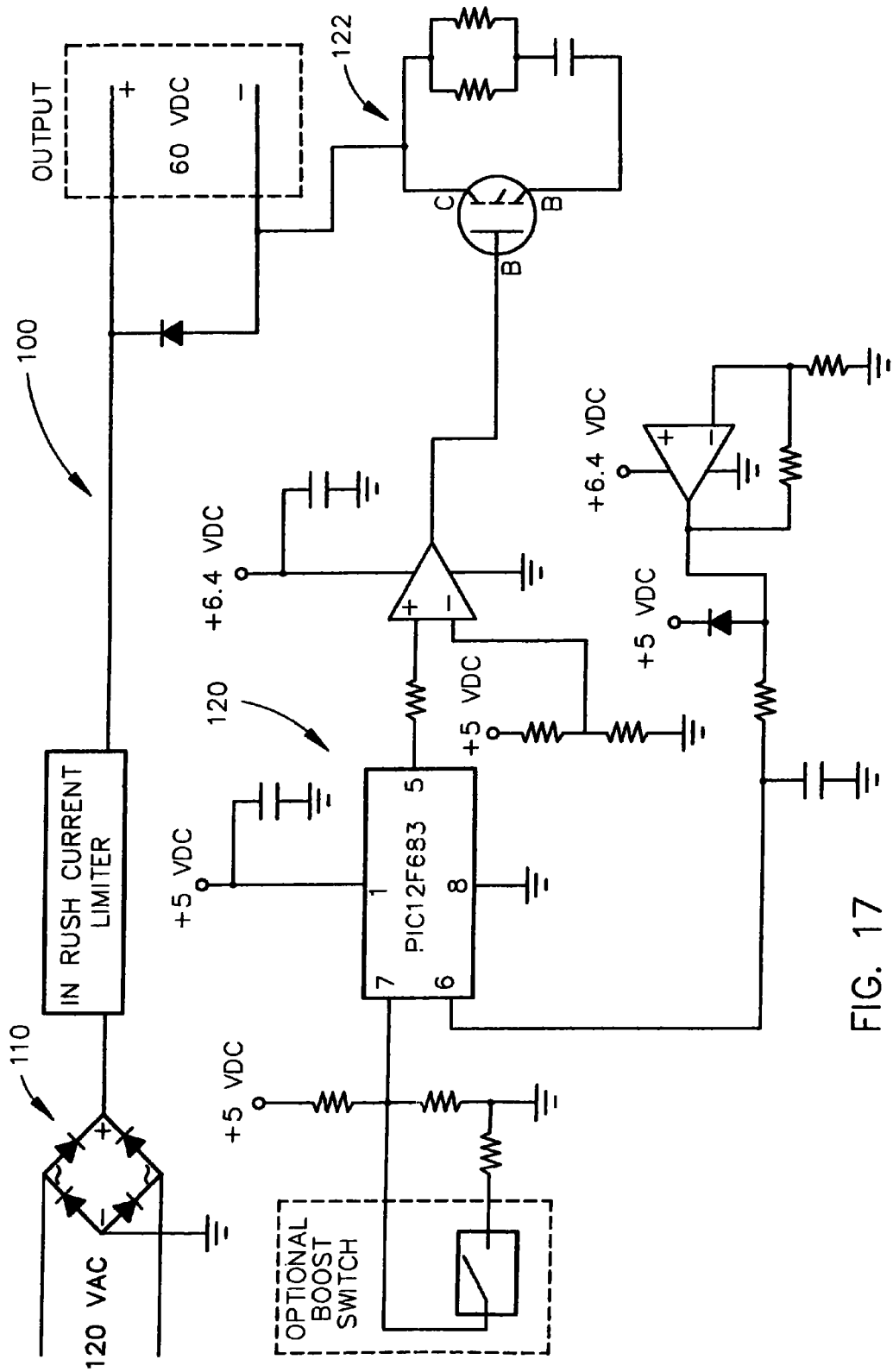
FIG. 17 is a circuit diagram of one option of the power inverter and hybrid control illustrated in FIG. 16 for use with the hybrid vacuum cleaner illustrated in FIG. 1.

Turning to the exemplary power inverter and in combination step down controller 100 which acts as a portion of the power control module, the hybrid controller 100 receives as input 120 volts AC which, in this example, is inverted utilizing a full bridge rectifier 110 depicted in FIG. 17. An in rush current limiter is provided also to prevent current surges during initial loading of the circuit and prevent further damage or over-saturation. A number of different inverter designs may be used in order to provide voltage rectification. As depicted in the present example, a full bridge rectifier may be utilized but this may be replaced with other known inverter circuitry as is available and known in the art.

In addition, as depicted in FIG. 17, an optional boost switch may be provided which may correspond to the boost switch 26 depicted in FIG. 16. In the present exemplary embodiment, the optional boost switch may be operable to modify the input to the pulse width modulation controller 120 which defines the voltage output for the step down controller 100. As shown, a micro-controller is utilized in order to set the appropriate pulse rate for the PWM control and feeds into the insulated gate bi-polar transistor (IGBT) which provides the switching or pulse gate driver 122 for the DC output of the hybrid AC/DC control 100. Thus, the hybrid controller 100 incorporates, but does not necessarily require, the utilization of voltage rectification and a voltage rectifier as is necessary in combination with variations of voltage modification such as a pulse width modifier. However, multiple options for step down voltage and control are known and may be utilized such as diode controls, triac controls, MOSFET controls and the like. Many of these are well known in the art and may be utilized in the step down controller and power inverter in combination as described herein. Additionally, as depicted, the pulse width modulation control circuit 120 receives as input in one possible embodiment the ability to modify the voltage by use of the boost switch. The boost switch in this embodiment modifies the reference signal fed into pin 7 of the micro-controller for the reference value which operates to modify the gating of the IGBT and therefore, the voltage characteristics of the DC output depicted. The boost mode depicted provides the alternative function of a boost integrated with the power inverter and step down controller. As shown integrated with the controller 100 in FIG. 24, the boost switch can be alternatively provided in many connections and this integrated boost switch may be integrated with many of the other alternative embodiments.

As is known, many variations of a step down controller and inverter may be utilized and in general, the power control module of the present embodiment may utilize power input of 120 VAC and may incorporate many switches and controls for electrically connecting the DC motor to either the 60 volt DC battery or the DC output of the hybrid power controller. This may include utilization of a power source switch as indicated wherein the power source switch effectively has a first power input as a connection of the power control module of the DC output of the power inverter and step down controller 100 or receive as a second input the 60 volt DC of the battery pack, the power selection switch providing the ability of the operator to switch between 120 VAC power and 60 VDC power from the battery pack. The power selection switch may be directly connected to the DC motor, in this exemplary embodiment a 60 volt DC motor, which operates the impeller. The 60 volt DC motor may be operationally modified by utilization of a boost switch which is optional in many embodiments depicted herein, the boost switch changing voltage applied to the DC motor from 60 volts by an incremental value, thereby increasing rotational speed of the impeller as necessary by the operator. Such increase in impeller speed, as previously indicated, may be necessitated by thicker carpet or other items being cleaned by the hybrid vacuum cleaner 10 of the present embodiment. This boost/conserve function which is shown herein provides the ability through the many embodiments disclosed to increase the voltage of the power control module, thereby increasing the rotational speed of the impeller. As indicated, this may be desirable for short periods of time and may provide a first power output of the power control module, the first power output higher than a second power output, the second power output being a conserve feature wherein the DC motor draws less current and thereby increases the battery life charge of the battery pack. However, such feature does not have to be implemented only with the use of DC operation and DC power input as it is apparent that the increase rotational speed (boost) feature may be implemented also with 120 VAC wall power by increasing the DC voltage output of the hybrid AC/DC control 100 or by adding a supplemental DC power supply from the operating batteries, whether primary or secondary.

Figure 21:
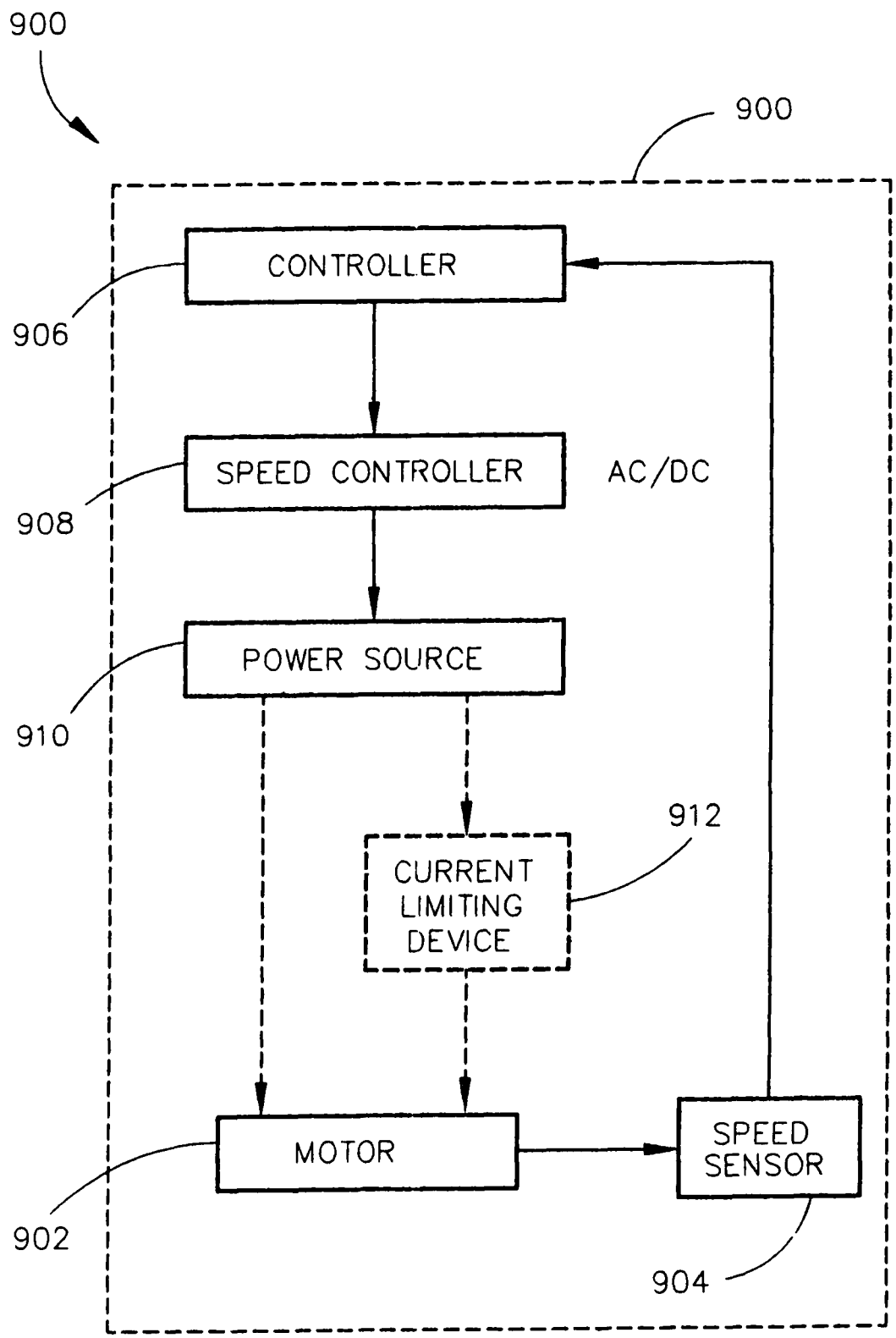
FIG. 21 is a block diagram of an electric vacuum cleaner of the present invention implementing a speed control unit.

It will be appreciated that the vacuum cleaner may be configured to limit the speed of the impeller and/or the beater bar to a pre-determined level. Referring now to FIG. 21 there is shown a block diagram of an electric vacuum cleaner 900 utilizing a speed control unit. In one specific embodiment, the speed control unit comprises a speed sensor 904 and a controller 906 that processes signals (feedbacks) from the speed sensor 904. The controller 906 further comprises a speed controller 908, which may be an embedded component of the controller 906, or a secondary controller that further processes signals from the controller 906. Based on the signals from the speed sensor 904 and the pre-determined impeller speed requirement, the speed controller 908 adjusts (when necessary) the voltage of the power source 910 (AC, DC, or BOTH) to the motor 902. For example, the power may be adjusted from approximately 72V to 80V to 90V, depending upon the desired impeller speed.

It is further contemplated that the vacuum cleaner may include circuitry and/or hardware for increasing the power supplied from the power source 910 to the motor 902 on an as-needed basis, such as when cleaning through thicker carpet. The increased power may provide increased suction and more effective cleaning abilities for the vacuum cleaner. However, when control circuitry is utilized for affecting the power characteristics of the vacuum cleaner, it may be difficult to control the amount of current through the control circuitry/hardware. For this reason, it is contemplated by the present invention that the vacuum cleaner may include a fast-acting circuit protection device (current-limiting device) 912, such as a fuse, a thermal overload device, and/or a circuit breaker, as well as any other current limiting devices as needed. Such a device may be configured to act when the load on the vacuum cleaner changes rapidly and an overabundance of current is supplied to the motor. In one embodiment, the vacuum cleaner 900 includes a current-limiting device 912 for preventing the vacuum cleaner from consuming a pre-determined amount of current. For example, when operating from AC mains in a residential setting, it may be desirable for the vacuum cleaner not to exceed 20 amps. Thus, the vacuum cleaner may include current limiting circuitry configured to limit the power consumption of the motor to approximately 20 amps or less.

It will be appreciated that various markets for the vacuum cleaner may have different power supply characteristics for power supplied by commonly available power sources, such as those found in buildings, including homes. For example, in the United States, AC power is typically supplied by a central utility via power lines or from a physical plant that is part of a facility at 120V. However, in the European markets, AC power is typically supplied at 240V. Thus, while a vacuum cleaner operating off of AC mains in the United States may provide one and three-quarters horsepower at 120V, the same type of vacuum cleaner in a European market may provide up to four horsepower.

Figure 22:
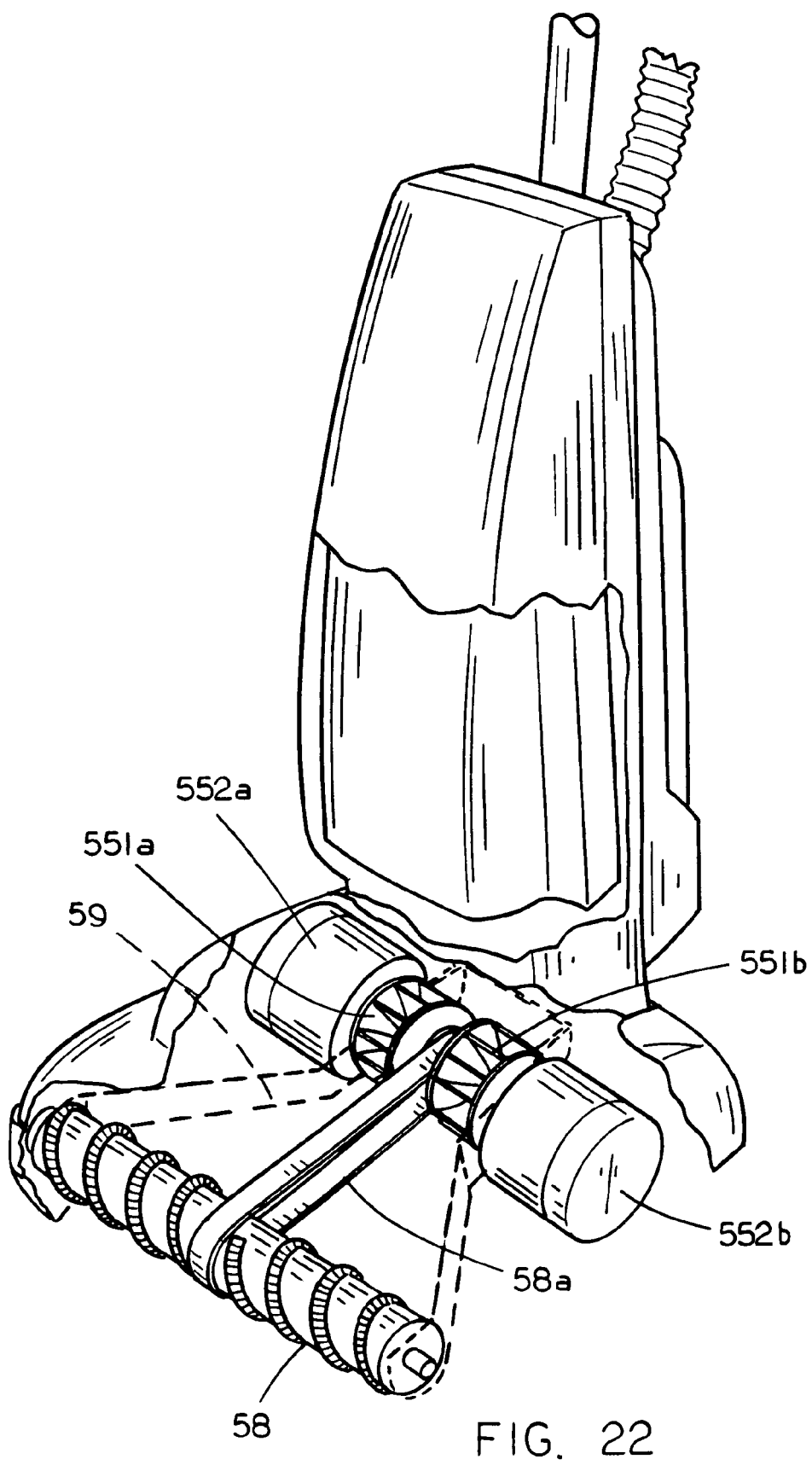
FIG. 22 is a partial cross-sectional isometric view of a hybrid vacuum cleaner including two motors and two impellers.
Figure 23:
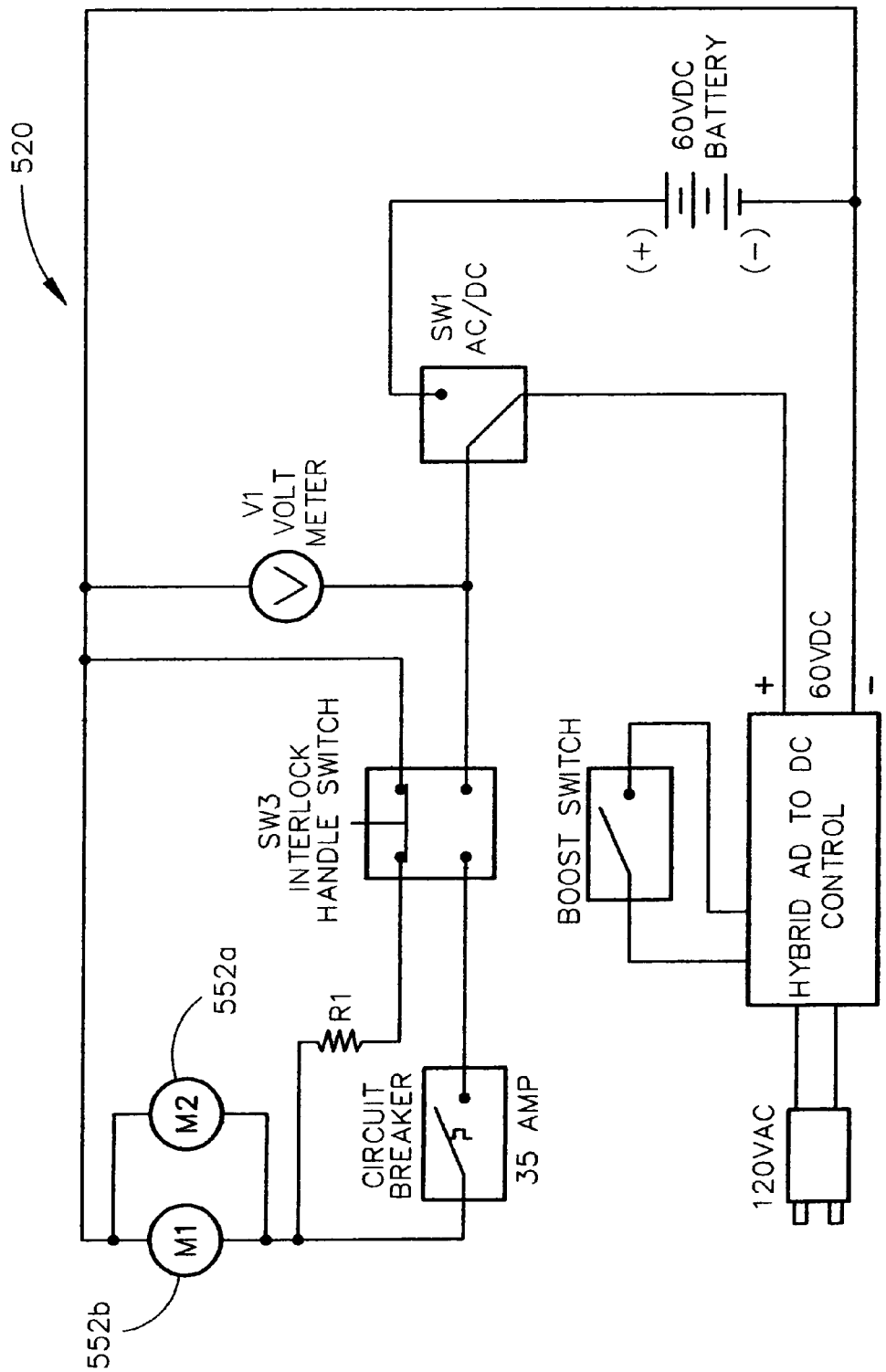
FIG. 23 is a circuit diagram illustrating one option of the power control circuit for use with the hybrid vacuum cleaner illustrated in FIG. 22.
Figure 24:
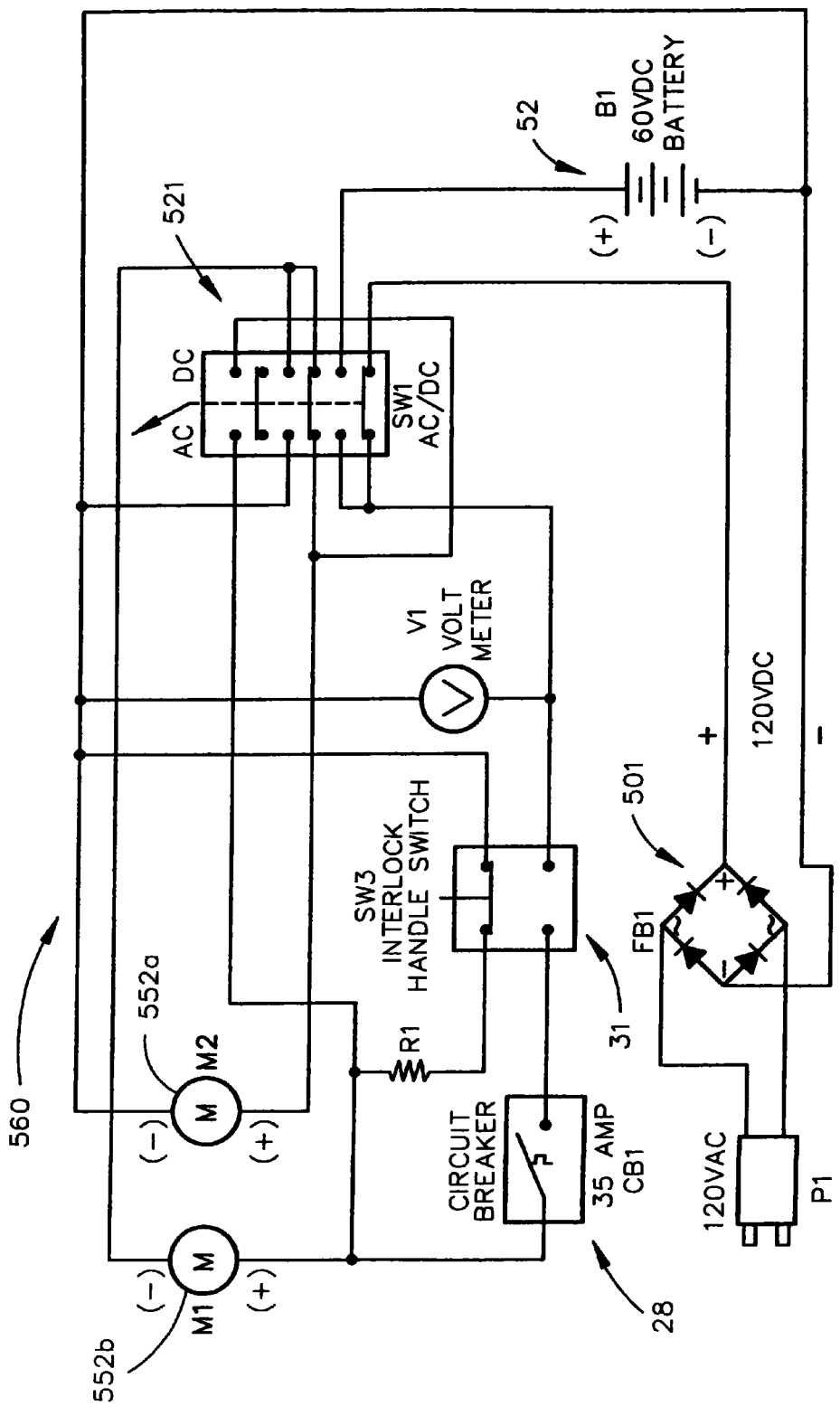
FIG. 24 is a circuit diagram illustrating an alternative option of the power control circuit for use with the hybrid vacuum cleaner illustrated in FIG. 22.

Referring now to FIGS. 22 through 24, an alternative embodiment of the electric vacuum cleaner of the present invention is depicted. In such an alternative construction, the electric vacuum cleaner 500 has a first and a second impeller 551A and 551B enclosed in the vacuum chamber 559. Driving each of the impellers, 551A and 551B, are a first and second motor 552A and 552B as depicted in FIGS. 23 and 24. The dual motor construction with two impellers enclosed in the vacuum chamber may be capable of providing a suction strength that would otherwise require a single motor construction with one impeller to have a faster rotational speed of its impeller to achieve the same suction strength. The dual motor construction as is depicted may substantially use similar power control circuitry with the modification in the series or parallel connection of the DC motors 552A and 552B to the power supply voltage. It may be desirable to provide the DC motors with either 120 VAC line power (which is current rectified) or with the battery pack supplied DC electrical power.

By utilizing two motors as opposed to a single motor with an increased rotational speed, significant power savings may be experienced and run time lengths for the power supply battery as well as power consumption in both DC and AC operations may be significantly reduced. Additionally, when using dual motors 552A and 552B, such dual motor implementation may preferably not be used in series in conjunction with battery operation due to the motors running at half speed, i.e. sharing the battery pack supplied voltage in series. Thus, in a preferred implementation for dual motor use, although not necessarily required, the DC electric motors may preferably be placed in parallel (as is depicted in FIG. 23) in certain operations, such as when operated by the battery pack, and possibly in series in others, such as when connected to higher line voltage. However, the DC motors may be placed in either operation as is deemed necessary. Also, power usage may not become an issue when providing line voltage through the hybrid AC to DC controller wherein the AC current is rectified for operation of the DC motors depicted.

As depicted in FIG. 23, the dual DC motors 552A and 552B for the power control and supply system 520 of the present embodiment are shown in parallel. A circuit breaker may be provided in combination with the interlock handle switch as previously described in order to operationally connect and disconnect the motors as selected by the user through the power switch 31. Further, an AC/DC operational switch may be provided for selection of either power supply, either AC line voltage or DC battery power supply as previously described. Further, a hybrid AC/DC controller may be utilized to implement rectification of the 120 VAC to provide an adequate supply of DC current to the motors 552A and 552B. Further, the boost switch may be provided in combination with the hybrid controller or separately as previously described as various combinations of these individual elements may be selected.

Both motors are depicted in parallel combination with the motors seeing approximately 60 volts from the power supply. When the motors are in such parallel connectivity, as one motor is loaded disproportionately due to various factors from either air resistance or debris resistance, the second motor slows down due to the reduced power available from the battery caused by the internal resistance and the higher amperage of the power supply as is depicted. Such self adjustment of the motor and hence impeller speeds provide automated self regulation of both motors.

Given the power supply and control embodiment depicted in FIG. 24, the user may select either AC or DC operation, which also serves as a circuit setting switch, and places the two motors 552a and 552b in either series or parallel configuration. When in DC mode, the battery 52 supplies constant current and may result in better performance of the motors. Further, when placed in DC mode, the motors are in parallel and, as one motor is loaded disproportionately, the second motor may slow down due to the reduced power available from the battery pack caused by the internal resistance of the power supply design and motor configuration and by the higher amperage.

Turning to the alternative construction and embodiment of the power supply and control circuitry of FIG. 24, the power supply and control circuit 560 indicates that the dual DC motors 552A and 552B are connected to the output of the AC/DC power selection switch 521 which toggles the power supply of the circuit from the full bridge rectifier 501 when in the AC position, to the DC battery source 52 when in the DC position as is depicted. The output of the power selection switch 521 feeds the voltage meter shown which is connected in parallel with the double pole, double throw interlock handle switch 31. The interlock handle switch 31 toggles between short in the DC motors 552A and 552B through a resistor, R1 to ground and connecting the output of the power selection switch 521, a three pole double throw switch in this disclosed embodiment, through circuit breaker 28 to the dual DC motors 552A and 552B. When the power selection switch 521 is in the AC selection position, the dual motors M1 and M2 are connected in series thereby splitting the voltage output of the rectifier. In such operation, the full bridge rectifier may provide 12 0VDC with 60V the seen by each motor. When the AC/DC power selection switch 521 is in the DC position, the motors M1 and M2 are connected in parallel thereby each sharing in the DC voltage output of the battery pack. The battery, being a constant current power supply, may provide better performance of the DC motors M1 and M2 in parallel and thus the connection as is described may be provided with the capability of switching between parallel and series connectivity of the motors M1 and M2 depending on the power source.

Further, as disclosed in FIG. 24, a full bridge rectifier or possibly other current rectification is depicted wherein the 120 VAC is input into the hybrid controller (not depicted as previously shown for simplicity). The full bridge rectifier in this embodiment may readily be replaced by various rectification circuitry, such as that previously disclosed herein. Thus, the rectifier depicted may be replaced by other current rectification techniques/hardware to rectify the current from AC to DC. These known systems include but are not limited to pulse width modulation which may readily be implemented herein.

When AC mode is selected from the user selectable power selection switch shown in FIG. 24, the total current going through many of the switches and electronic circuit elements presented herein may be one half of that going through the same switches and electronic circuit elements in the parallel or battery mode, given the embodiments depicted as a result of the rectification of the current and positioning of the loads. In other words, as shown in FIG. 24, the battery pack provides 60 VDC which is shared by the dual motors in parallel and the AC input line provides 120 VDC to be split by the dual motors in series in the disclosed embodiments. The response to uneven loading also may be more desirable as previously described in parallel as opposed to in series mode, since, when in series mode, as one motor is disproportionately loaded and slows down, the other motor will speed up. The actual speed modification of the motors in series however may be mitigated due to the nature of the air resistance to the impeller and the significant amount of energy and load required to move the air in the vacuum chamber. The relationship between air movement resistance and impeller speed is an exponential relationship thus adding a significantly higher load when the impeller is spinning faster, thus tending to cause the impeller to operate at similar speeds in these embodiments. However, either combination of either series or parallel connection of the two DC motors as is depicted may readily be implemented and such description as set forth herein is not deemed limiting.

In both configurations of the dual motor design depicted, the ability and functionality of the boost and conserve features are still present in that the impeller speed for both motors may be reduced in a conserve mode, particularly when operating off of the DC battery power supply in order to increase charge life. As shown in FIG. 23, a boost and conserve switch and feature may be implemented in conjunction with the hybrid controller shown. However, many differing combinations of the boost and conserve feature previously described may be applicable to either design and power supply shown. In conjunction with the power supply and control depicted in either embodiment, a secondary battery pack may be utilized as discussed herein to increase the voltage output of the DC operation and power supply thereby increasing the impeller speed for both motors while also allowing battery use to be conserved in a second state thereby increasing overall run life per charge. Alternatively, increased voltage may be provided directly from the hybrid controller as depicted when drawing power from AC power supply.

In addition to the dual motor or other designs depicted, a dual voltage motor may also be desirable. Such dual voltage may be seen by the electric motor when switching between rectified line voltage from an outlet or from a battery pack, which may, in one embodiment, roughly be one half the line voltage. It would be preferable that a dual voltage electric motor be implemented for hybrid operation wherein all electrical or electromechanical aspects of the electric motor are in operation and use when utilizing either high voltage operation or lower voltage operation. By all electrical or electromechanical aspects being in use, it is meant that windings, brushes, commutators and other aspects of the electrical motor are mostly in operation and electrically connected to the power supply, whether high voltage AC or lower voltage DC. The described DC voltage permanent magnet motor design of the exemplary embodiment allows a single motor to operate using two different DC voltages. This may be accomplished through providing a hybrid controller which places electrically separated windings on the armature in either serial or parallel configuration, parallel for lower voltage operation and serial configuration for higher voltage configuration. In either configuration, the voltage potential across each coil will be about 60 VDC, or half the high voltage, as the coils are placed in series when in AC mode and in parallel when in lower voltage mode. Similarly alternative constructions may be implemented in the embodiment shown.

Presently, in the various embodiments depicted, a dedicated electric motor design may be implemented in the hybrid electric vacuum cleaner which implements the ability and functionality of direct AC power supplied from a standard line voltage power source providing 120 VAC, or, of power provided from a secondary power supply source such as a battery pack, which would supply about 60 VDC to about 72 VDC, as is necessary or as is designed, all to the same electric motor driving the impeller in the vacuum chamber. In one embodiment, the hybrid controller utilized in the embodiment may convert the 120 VAC to 120 VDC through the use of various techniques, such as a rectifier or other circuit implementations. In such implementation, the user would elect to switch the vacuum cleaner power supply selection switch to AC, the hybrid controller would rectify the voltage to DC and the motor would operate at a possibly higher voltage supply. Alternatively, user selection of the power selection switch to DC would electrically connect the battery pack or other lower voltage power supply to the motor in order to operate the impeller in the vacuum chamber.

In either situation, user selection of AC operation as when the vacuum cleaner embodiment depicted is plugged into an outlet, or when user selection has been modified to DC operation for running the vacuum cleaner off of the battery pack or other direct current power supply, the electric vacuum cleaner of the present embodiment may alternate between high voltage operation or low voltage operation, the low voltage supply typically being one half the high voltage supply. Through implementation of dual core windings which are electrically separated and both rated at the lower voltage level, the rpm of the hybrid motor presently described may be maintained in either voltage configurations.

Figure 25:
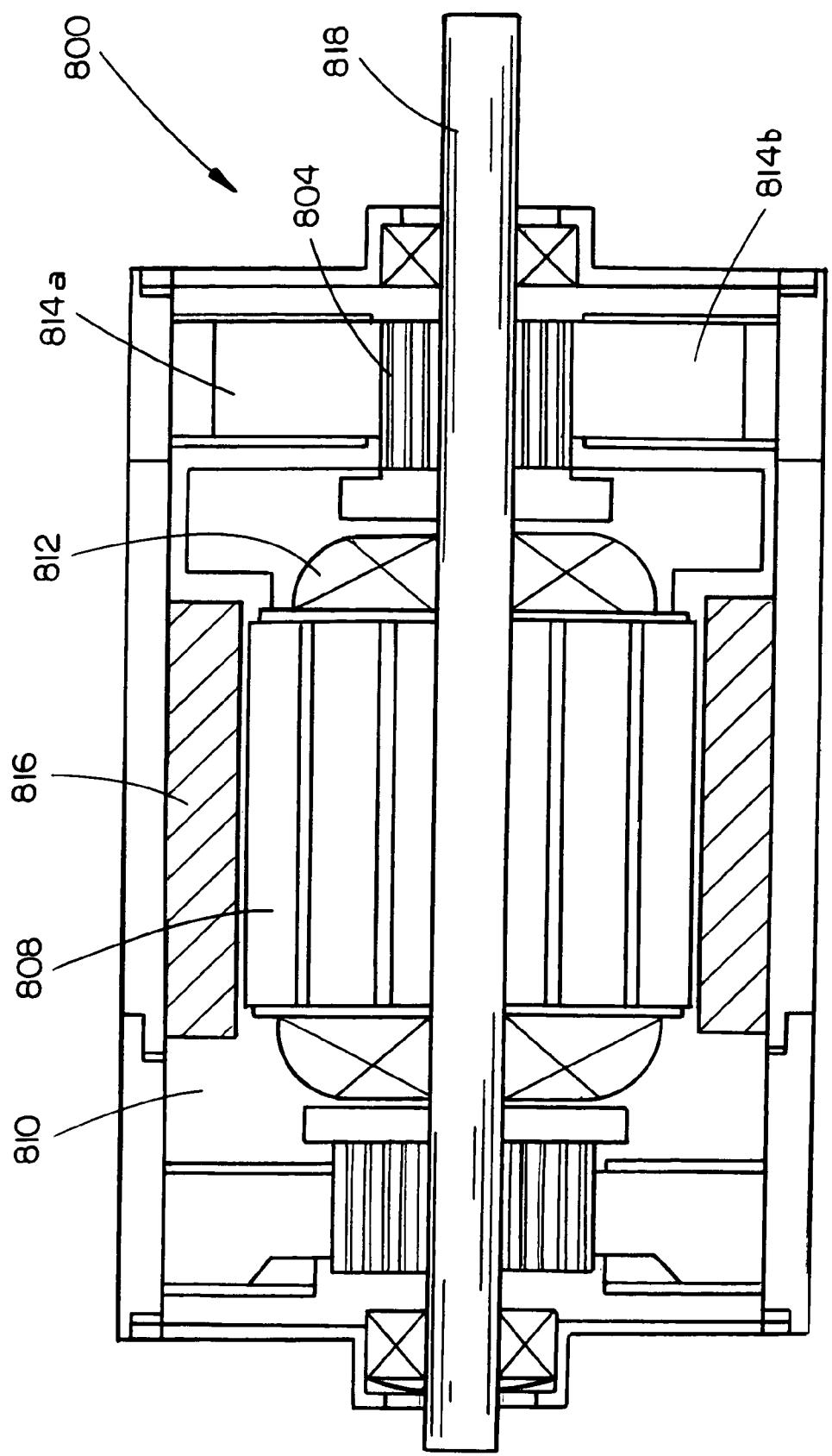
FIG. 25 is a cross-sectional side view of a motor assembly.

Referring now to FIG. 25, there is shown a dual voltage motor 800. In this exemplary embodiment, the dual voltage motor 800 includes a permanent magnet 816 and a single armature 808 connected to an axle 818. Attached to the armature 808 are a first commutator 802 separated from a second commutator 804. The first commutator 802 connects to a first set of windings (coils) 810, and the second commutator 804 connects to a second set of windings 812. The first set of windings 810 is separated from the second set of windings 812. Further, the first commutator 802 is in electric contact with a corresponding first set of brushes 806A and 806B, and the second commutator 804 is in electric contact with a corresponding second set of brushes 814A and 814B. The two sets of brushes (806 and 814) may be selectively configured through the use of a user selection switch which reconfigures the windings (810 and 812) on the motor from series connectivity (for higher voltage source such as rectified line voltage), to parallel connectivity (for a lower voltage source such as a battery pack). If the higher voltage is approximately twice the potential of the lower voltage, the power supply will provide approximately the same voltage potential across a first and a second commutator on the electric motor.

Referring now to FIG. 26, there is shown a parallel configuration of the dual voltage motor. In such configuration, the positive terminal of the V1 voltage source is connected to the terminal T1 of the motor, and the negative terminal of the V1 voltage source is connected to the terminal T2 of the motor. Terminals T1 and T2 are connected to the first commutator 802 through brushes 806A and 806B, which creates a voltage potential of V1 across the first coil 810. The positive terminal of the V1 voltage source is also connected to terminal T3 of the motor, and the negative terminal of the V1 voltage source is also connected to terminal T4 of the motor. The terminals T3 and T4 are connected to the second commutator 804 through brushes 814A and 814B, which creates a voltage potential of V1 across the second coil 810.

Figure 27:
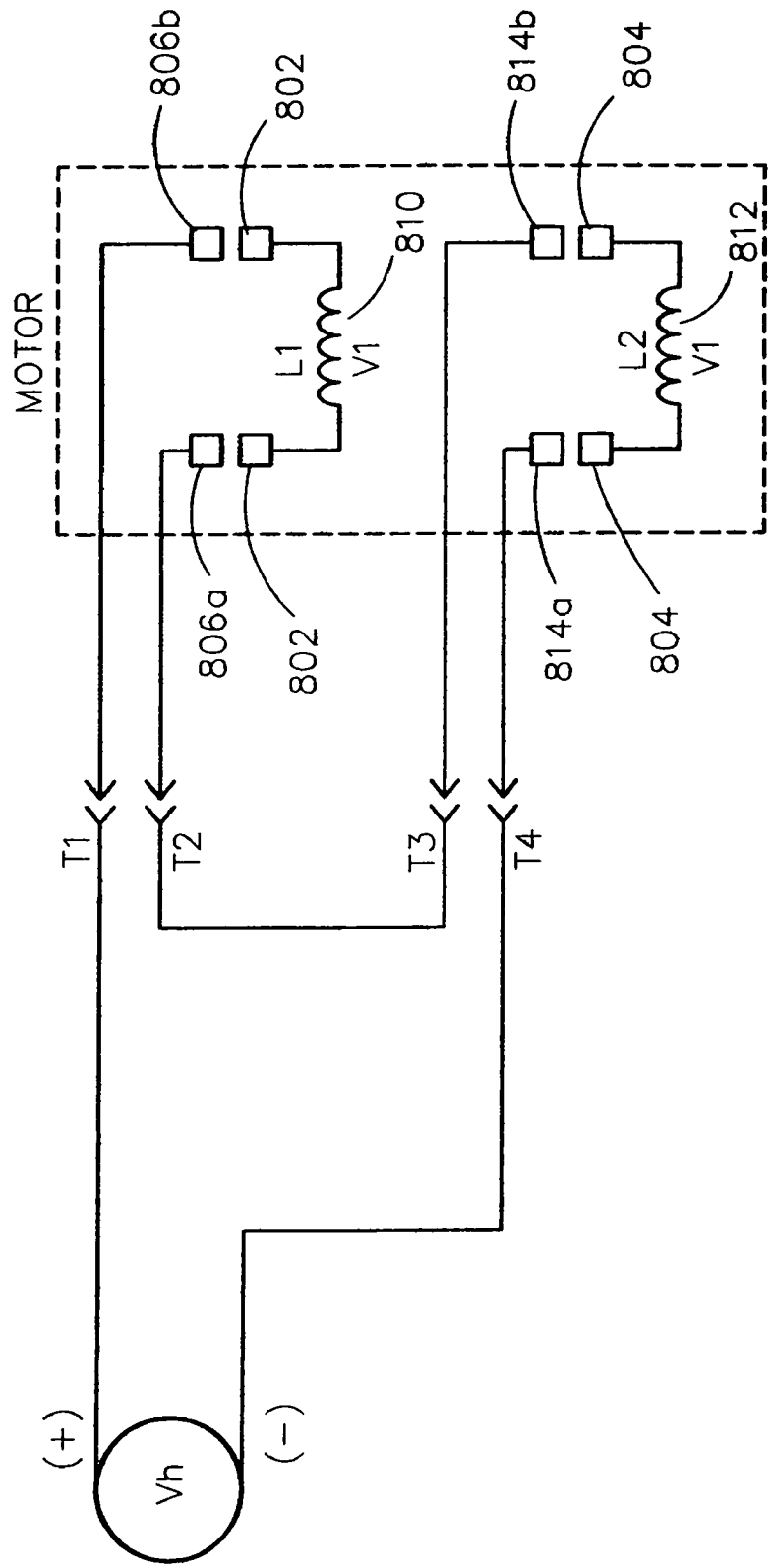
FIG. 27 is a circuit diagram illustrating a parallel configuration utilized by the motor illustrated in FIG. 25.

Referring to FIG. 27, there is shown a series configuration of the dual voltage motor. In such configuration, the positive terminal of the V2 voltage source is connected to the terminal T1 of the motor, and the negative terminal of the V2 voltage source is connected to the terminal T4 of the motor. Further, terminal T2 is connected in series to terminal T3. Terminals T1 and T2 are connected to the first commutator 802 through brushes 806A and 806B, and terminals T3 and T4 are connected to the second commutator 804 through the brushes 814A and 814B. This configuration creates a voltage potential of V2 across both coils which means that each coil will have a potential of a half of V2 in the present embodiment.

Figure 28:
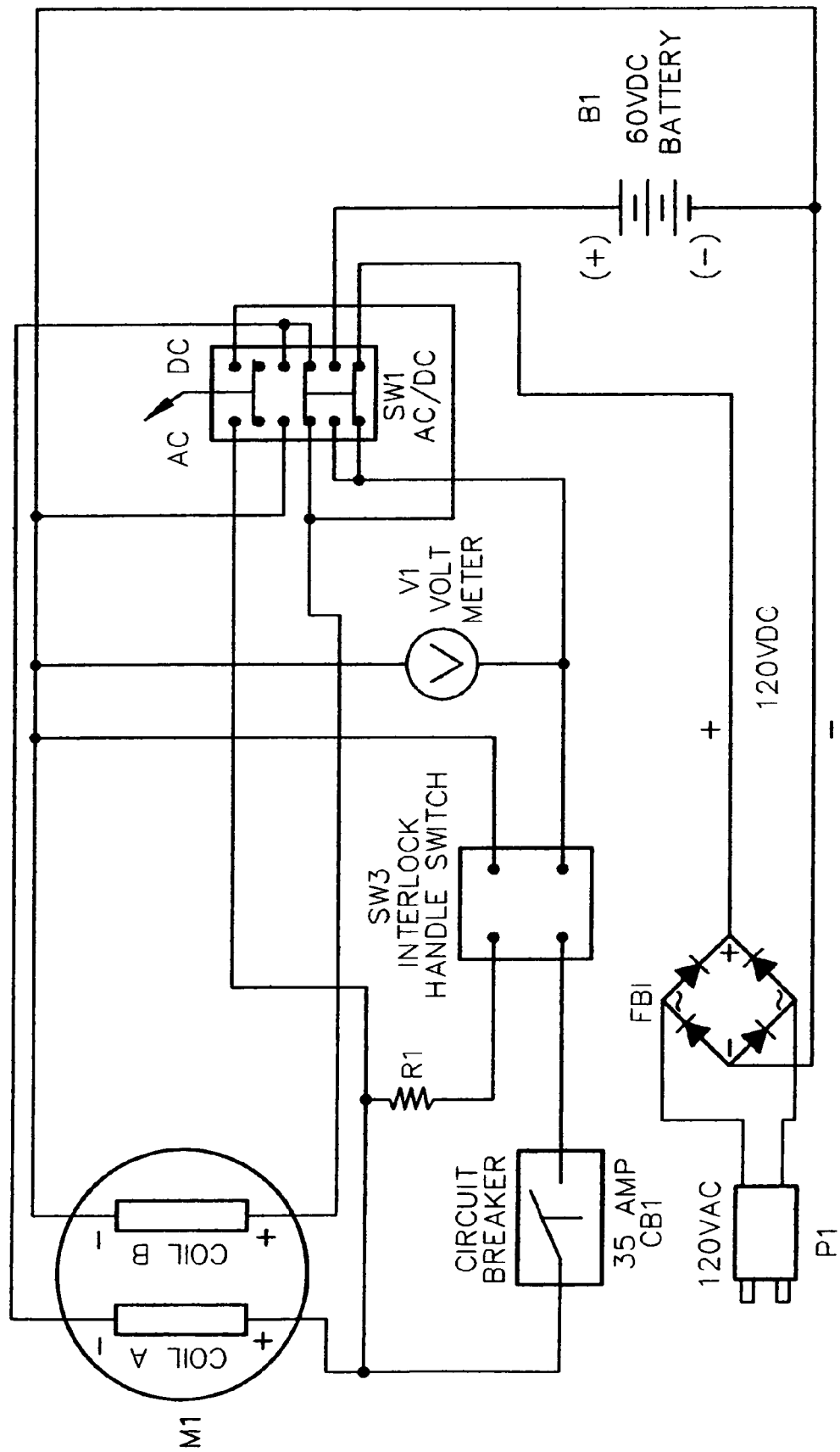
FIG. 28 is a circuit diagram illustrating one option of the power control circuit for use with the hybrid vacuum cleaner utilized the motor illustrated in FIG. 25.

FIG. 28 depicts an exemplary circuit implementation of an electric vacuum cleaner utilizing a dual voltage motor 553. The coils may be placed in either a high voltage configuration or a low voltage configuration by the user. In a high voltage configuration the coils 554A and 554B are placed in series. In a low voltage configuration the coils are placed in parallel. User selection of the high or low voltage configuration may be achieved through the use of the three pole double throw switch SW1 which provides the operator of the hybrid vacuum cleaner presently described in this embodiment the ability to provide a power supply of 120 VAC for higher voltage operation or 60-72 VDC for lower voltage operation.

In one specific embodiment, for example, when the vacuum cleaner is connected to a standard AC power source of 120 VAC, a rectifier may rectify the voltage to about 120 VDC (a higher voltage source). Thus, a series configuration will provide each set of coils about 60 VDC. Alternatively, when the vacuum cleaner is connected to a 60 VDC battery pack (a lower voltage source), a parallel configuration will provide each set of coils about 60 VDC as well. Substantially the same voltage provided to the sets of coils in both higher and lower voltages results in substantially the same revolutions per minute/rounds-per-minute (RPM) of the motor. In this manner, the dual-voltage vacuum cleaner may be capable of executing speed control over the motor without utilizing an electronic controller. This may represent a significant cost benefit to a consumer. In one specific embodiment, the lack of a controller may represent a cost savings of approximately ten percent. It will be appreciated that the number of windings in the motor may vary and/or the diameter of wires including the windings may vary. In another specific embodiment, when the vacuum cleaner is connected to a standard AC power source of 120 VAC, a rectifier may rectify the voltage to a desired voltage (e.g., about 90 VDC). Alternatively, the vacuum cleaner may be connected to approximately a 90 VDC battery. In this manner, the vacuum cleaner may achieve AC or DC operation (e.g., in the case of a permanent magnet DC motor). Substantially the same voltage provided to the motor results in substantially the same revolutions per minute (RPM) of the motor on either or both of the AC and DC configurations. In this manner, a dual-power source vacuum cleaner may be provided without utilizing an electronic controller. This may represent a significant cost benefit to a consumer.

Figure 29:
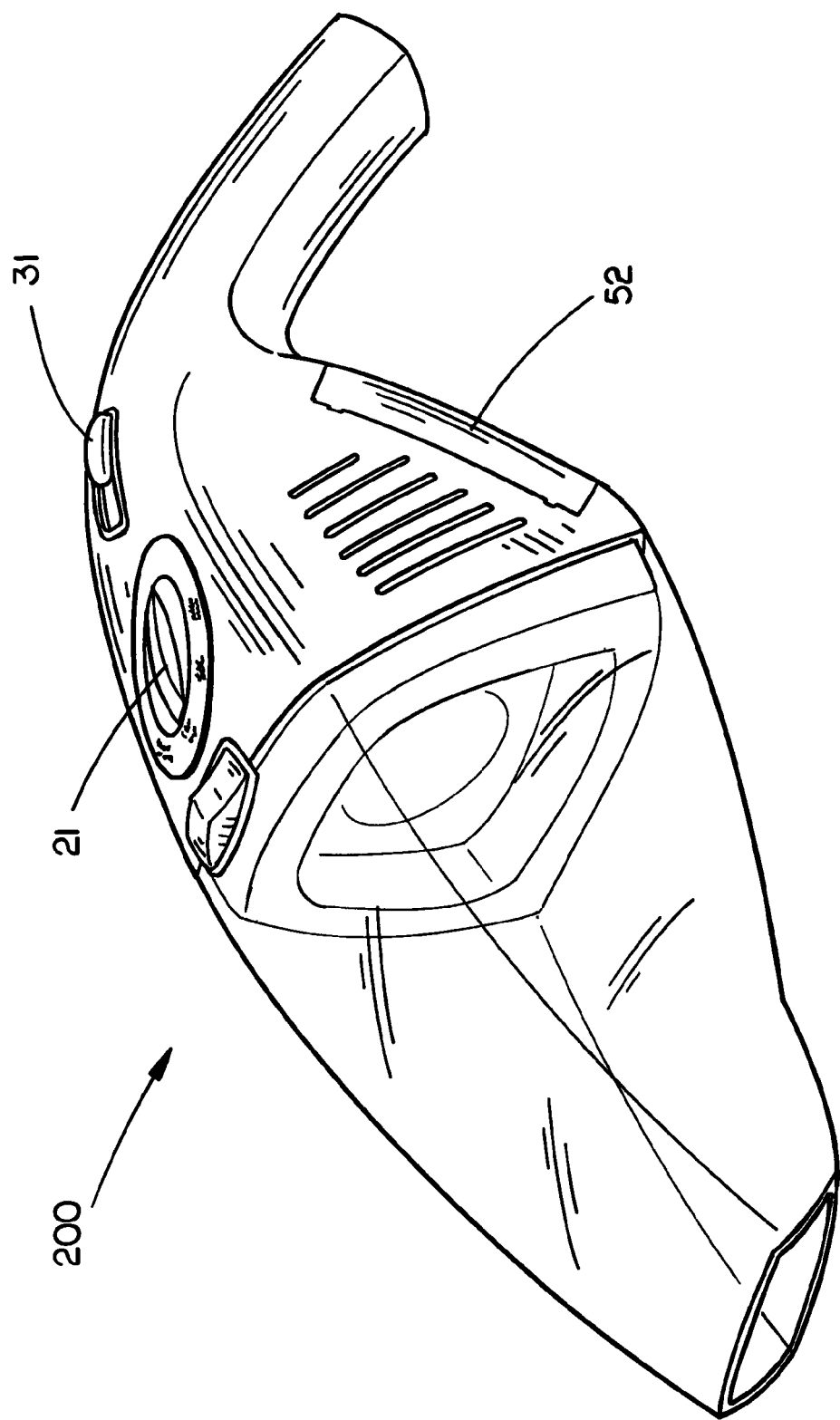
FIG. 29 is an isometric view of a handheld vacuum cleaner.
Figure 31:
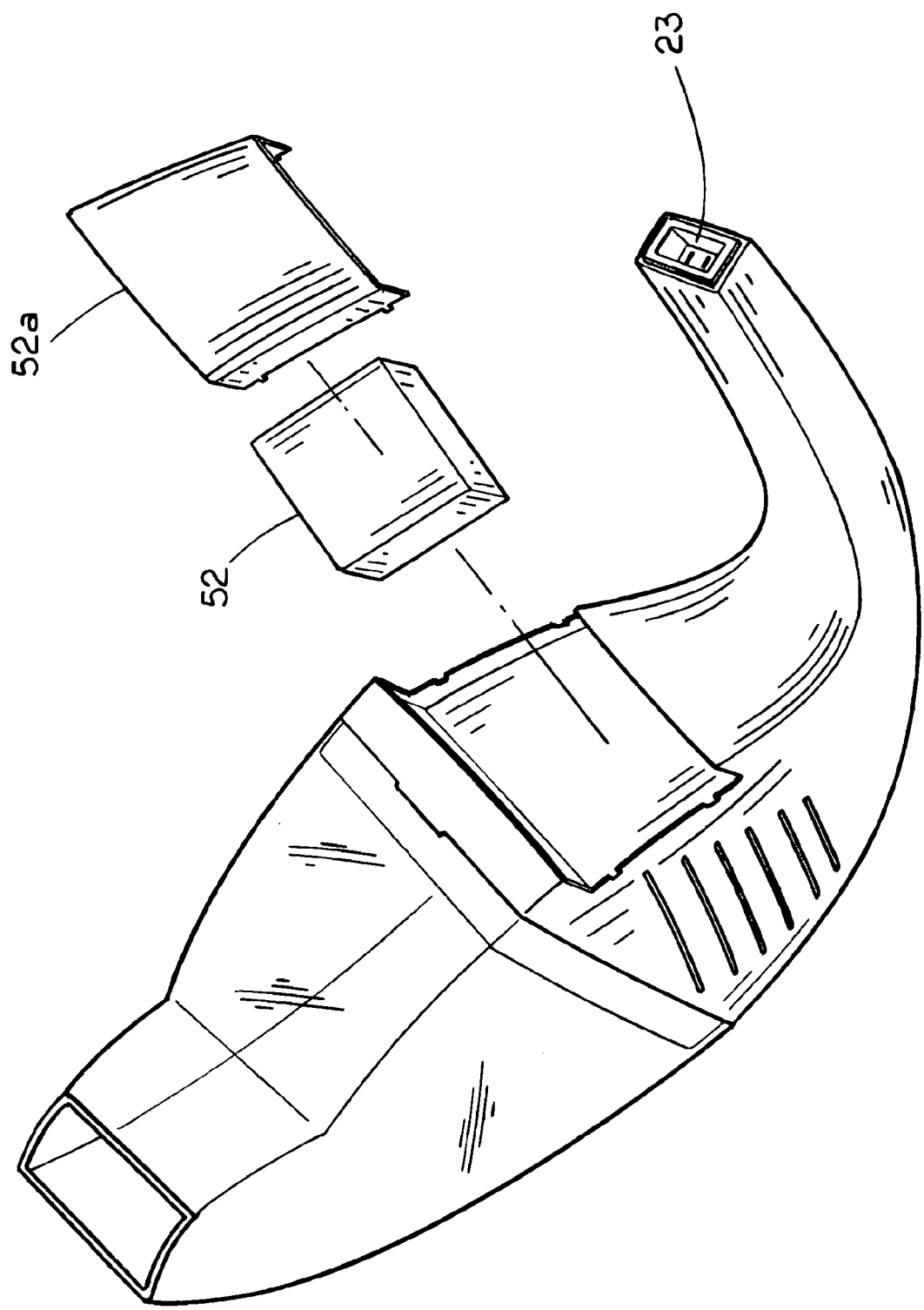
FIG. 31 is another perspective view of the handheld vacuum cleaner illustrated in FIG. 29.

It will be appreciated that while the hybrid device disclosed herein has been described with some specificity as a hybrid upright vacuum cleaner, many other devices may be provided which also utilize some or all of the features disclosed herein. Moreover, while the hybrid vacuum cleaner described above has been shown and described as including a vacuum chamber including an impeller and/or beater bar, it will be appreciated that the impeller and/or beater bar are exemplary only, and a variety of other working elements may be utilized with the hybrid electric device of the present invention. For example, FIGS. 29 to 31 illustrate a handheld vacuum cleaner 200 having a power selection switch 21. The handheld vacuum cleaner 200 comprises an impeller enclosed in a vacuum chamber, which provides suction when operating to guide debris through a nozzle into a dust collector.

Figure 32:
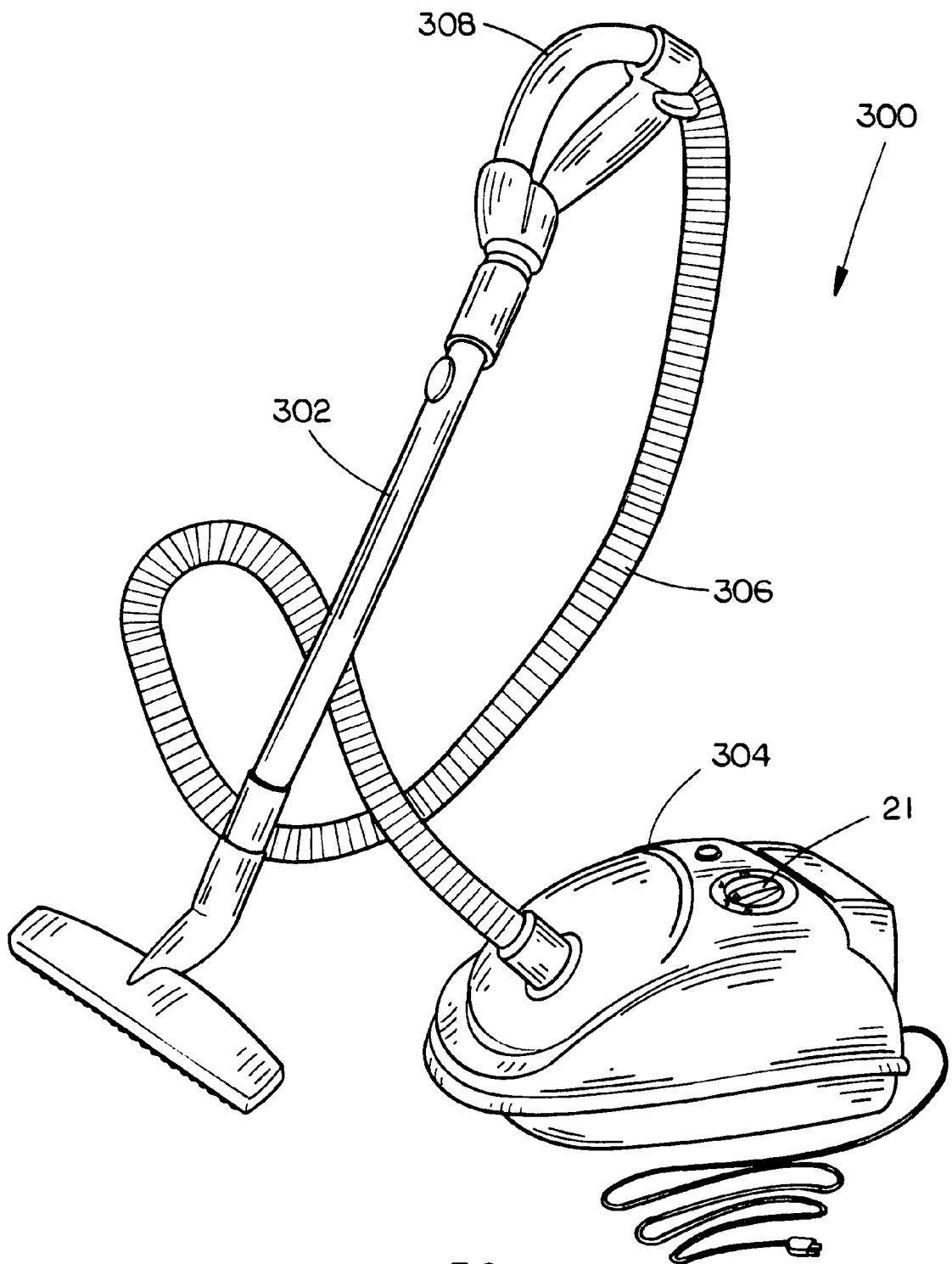
FIG. 32 is a perspective view of a canister vacuum cleaner with power selection switch positioned near the motor housing.
Figure 33:
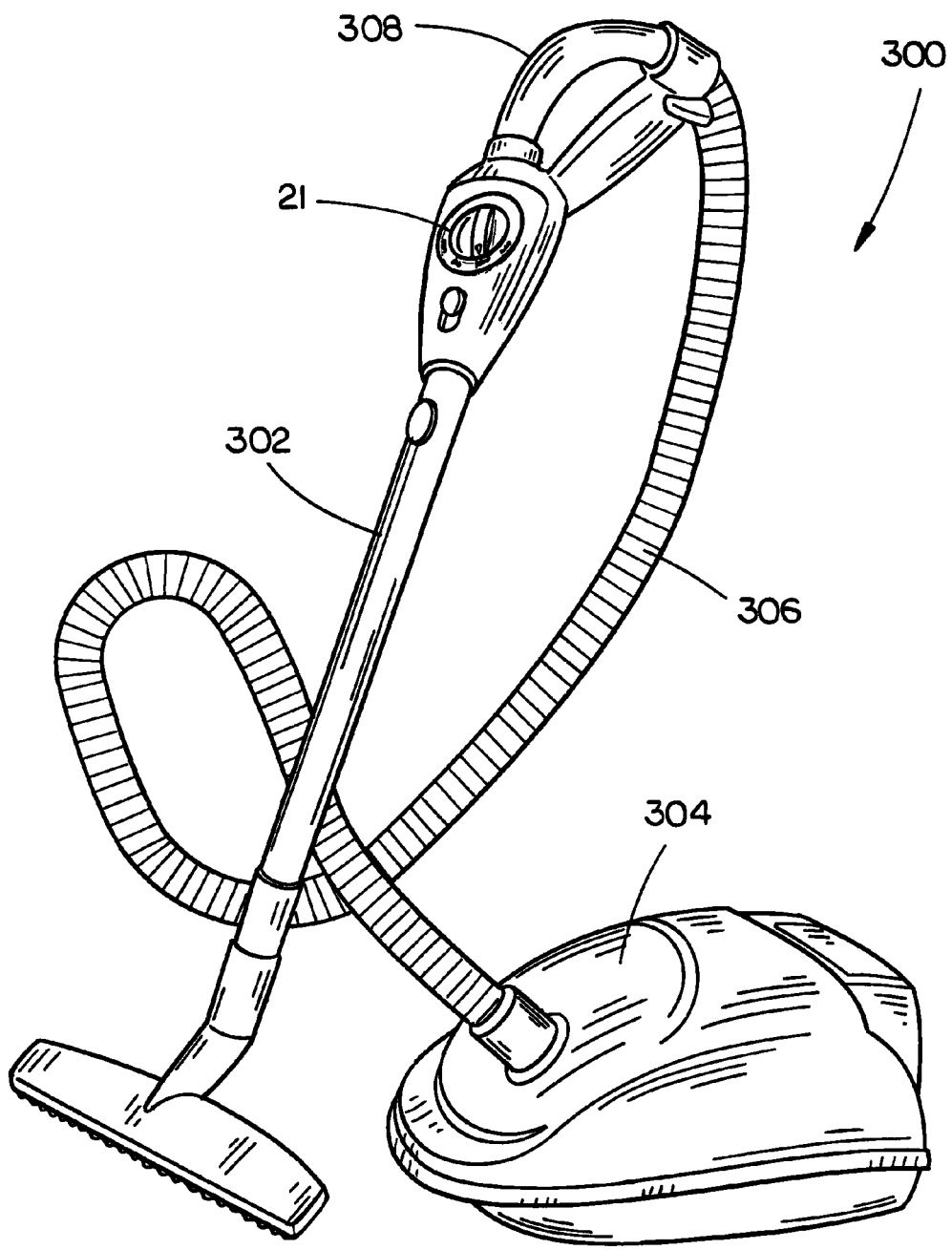
FIG. 33 is a perspective view of a canister vacuum cleaner with power selection switch positioned near the handle.
Figure 34:
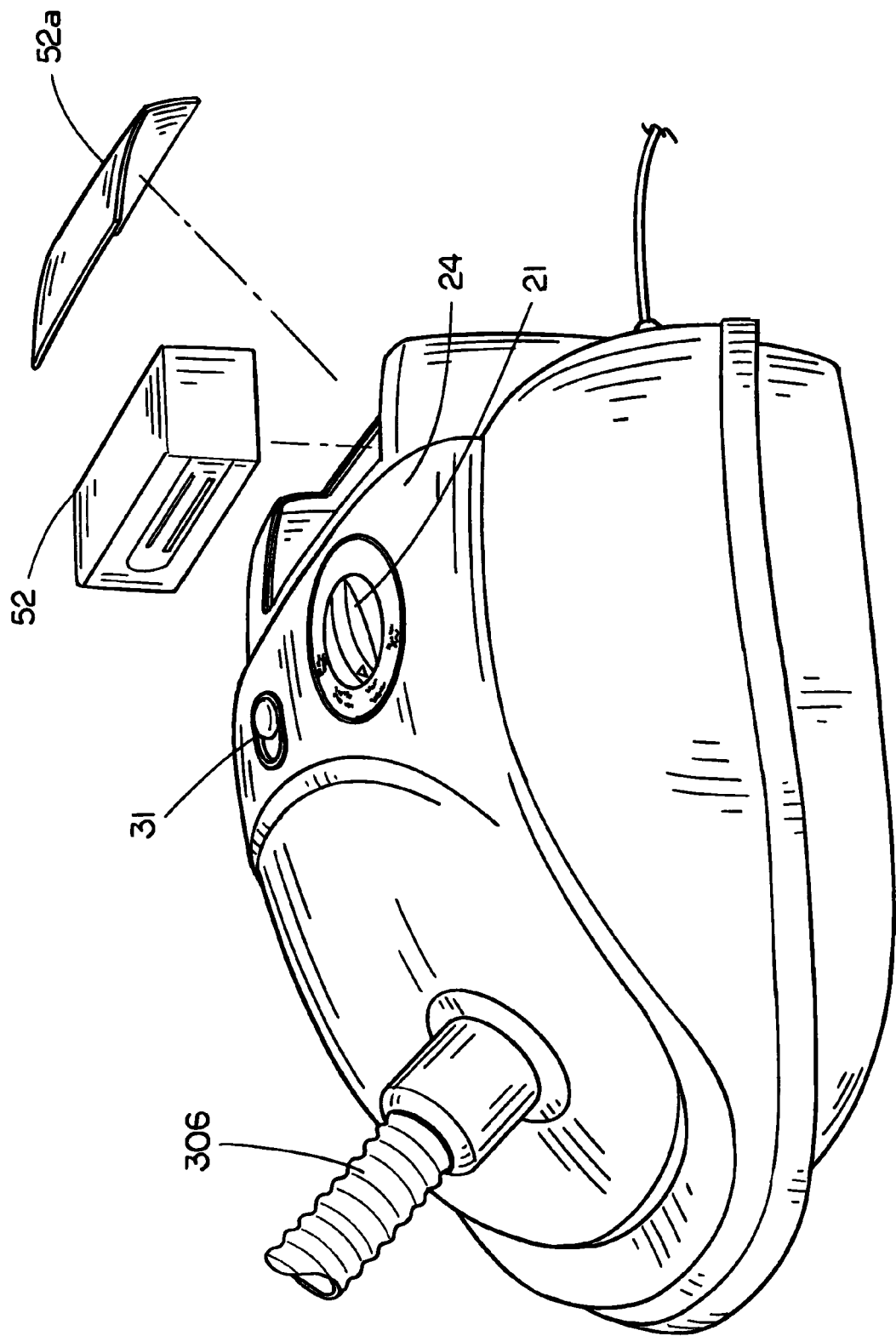
FIG. 34 is another perspective view of the canister vacuum cleaner illustrated in FIG. 32.

Another hybrid electric device example, a canister vacuum, is depicted in FIGS. 32 to 34. The canister vacuum 300 comprises an extended dust pipe 302 connected to a vacuum housing 304 with a dust connecting hose 306. The vacuum housing 304 having an impeller enclosed in a vacuum chamber, which provides suction when operating to guide debris through the dust pipe 302 into a dust collector enclosed in the vacuum housing. In a specific embodiment, as depicted in FIG. 32, the power selection switch 21 is positioned on the vacuum housing 304 to reduce the amount of wiring needed for connection. In an alternative embodiment, as depicted in FIG. 33, the power control switch 21 may be positioned near a handle 308 to promote ease of use.

Figure 35:
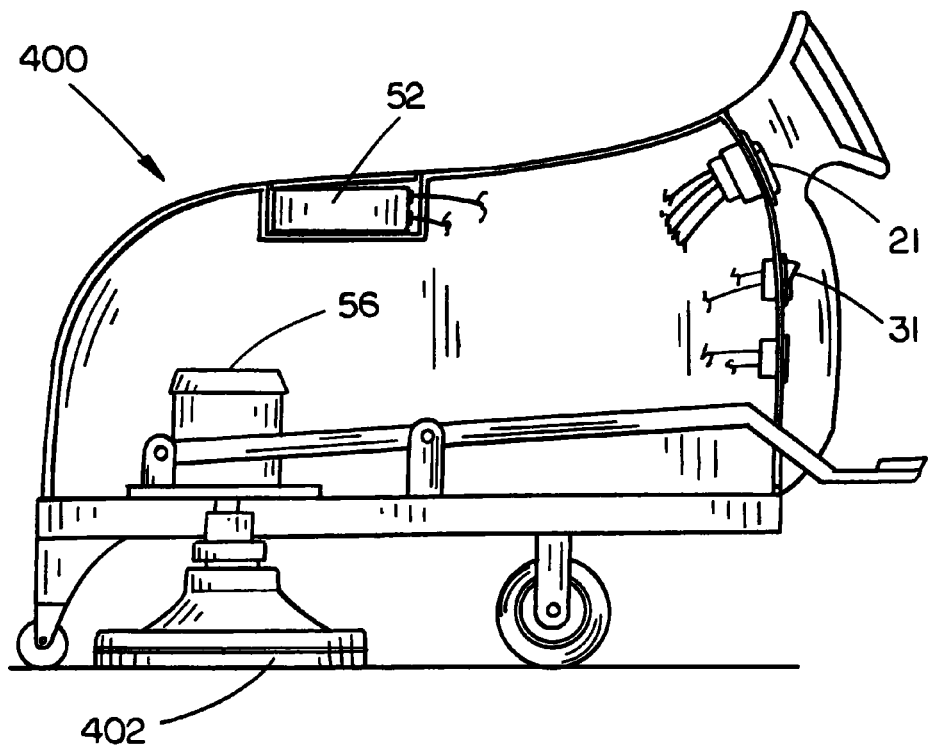
FIG. 35 is a cross-sectional side elevation view of a floor polisher with one motor configuration.
Figure 36:
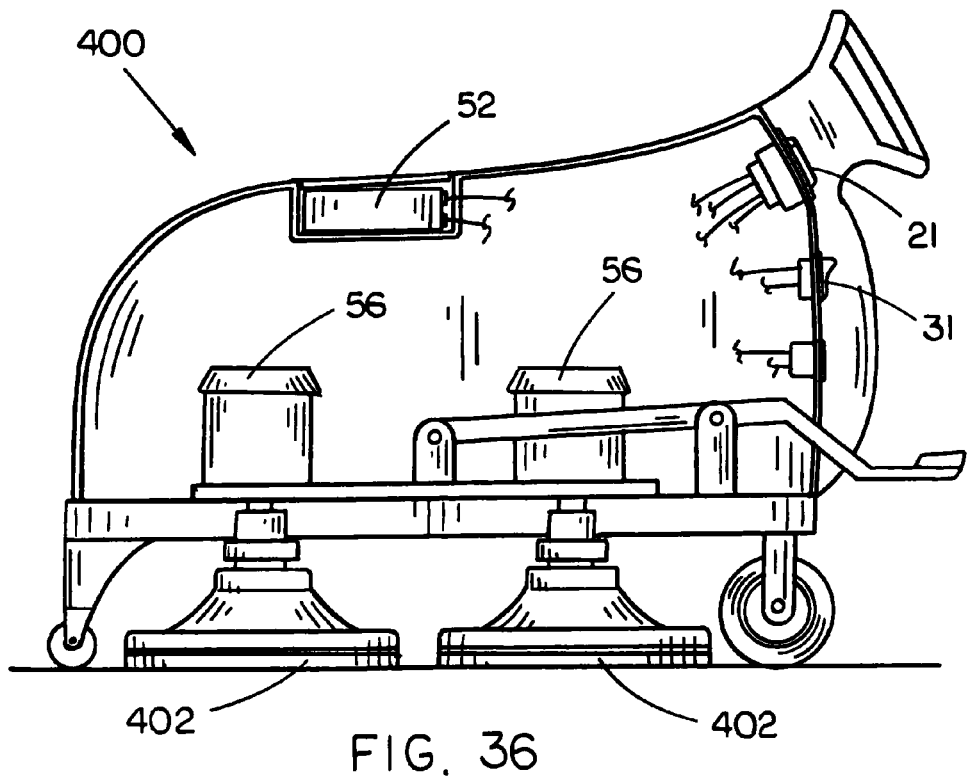
FIG. 36 is a cross-sectional side elevation view of a floor polisher with two motors configuration.
Figure 37:
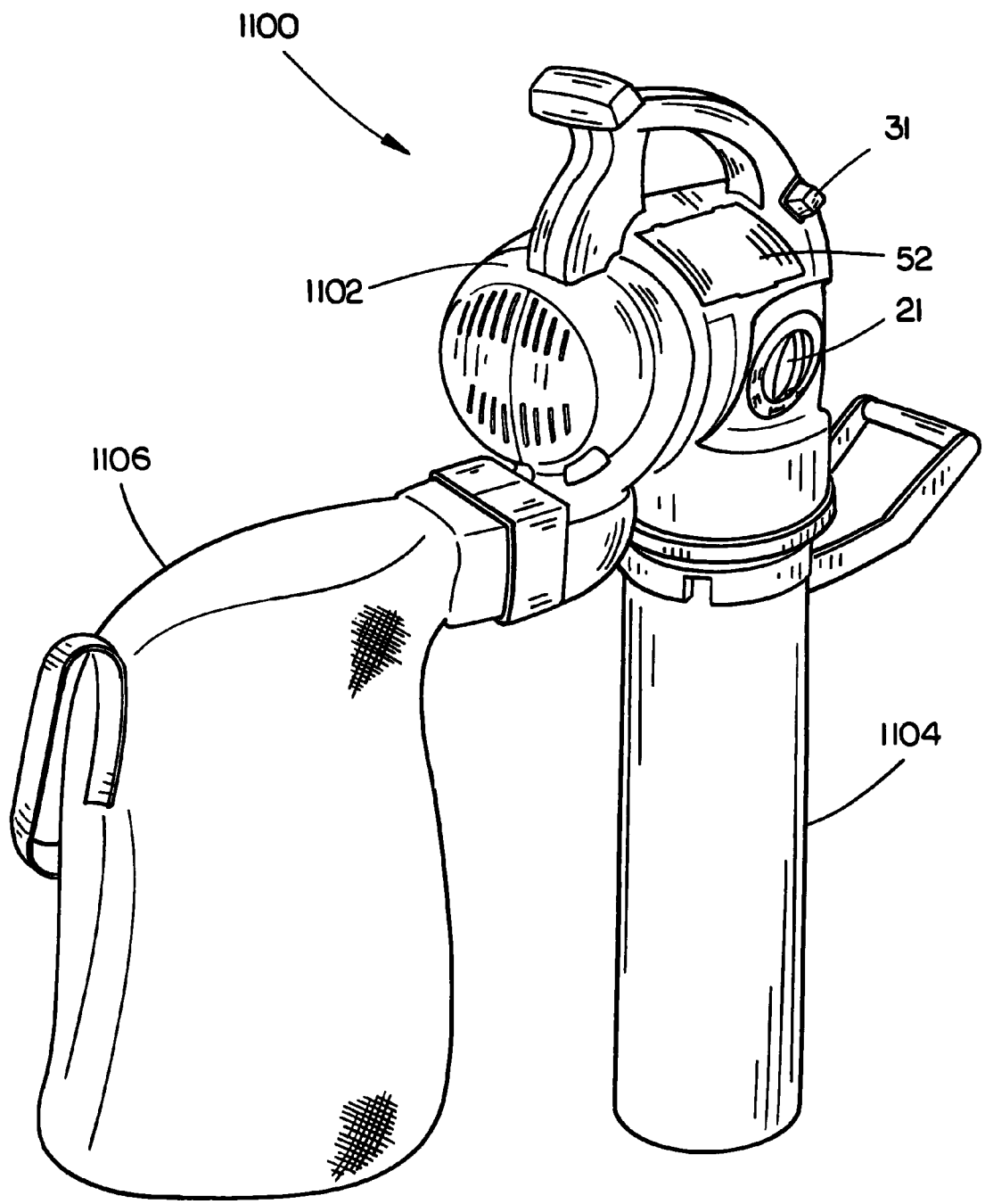
FIG. 37 is a perspective view of a blower/vacuum device in vacuum configuration.
Figure 38:
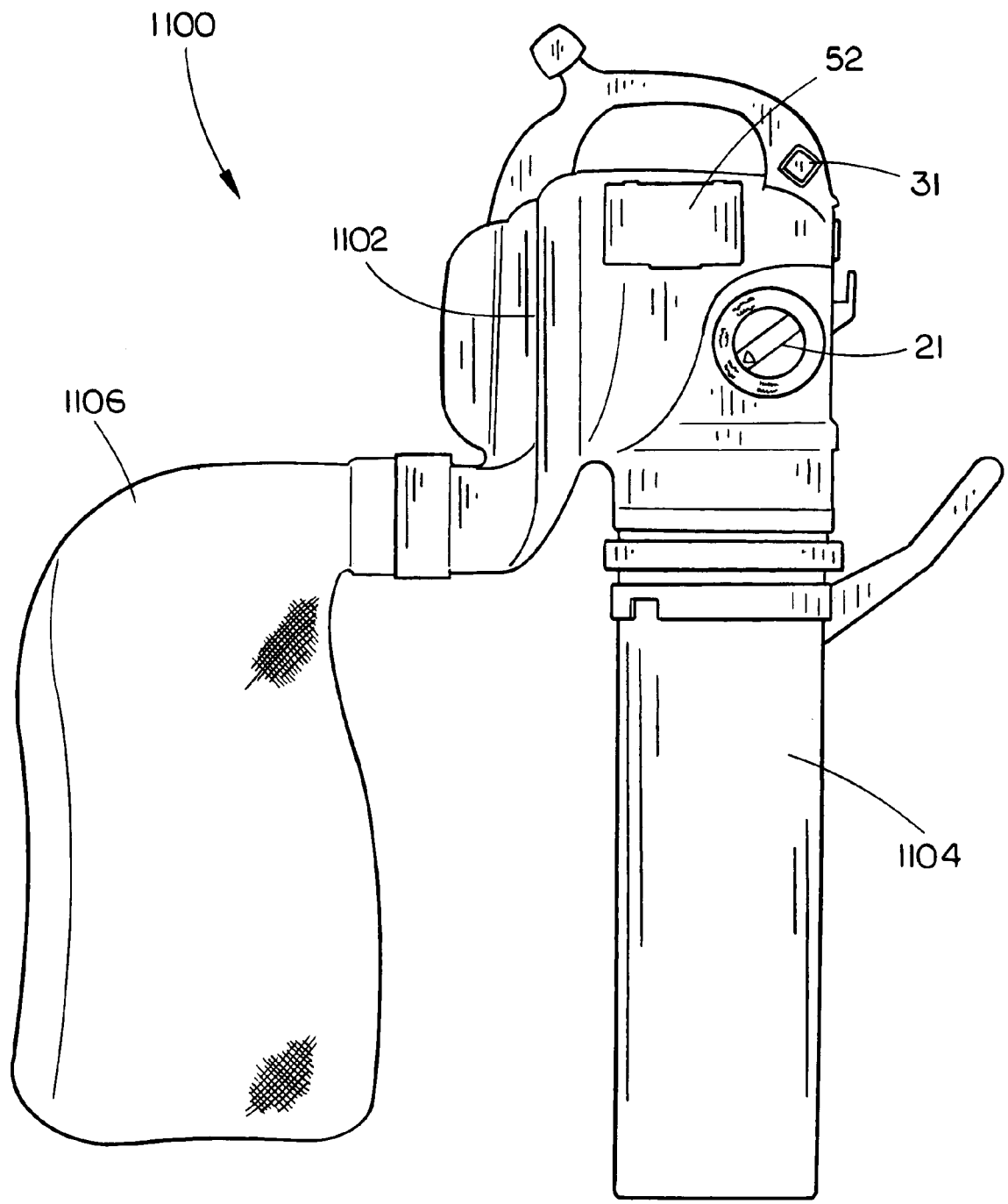
FIG. 38 is a side elevation view of the blower/vacuum device in vacuum configuration illustrated in FIG. 37.
Figure 39:
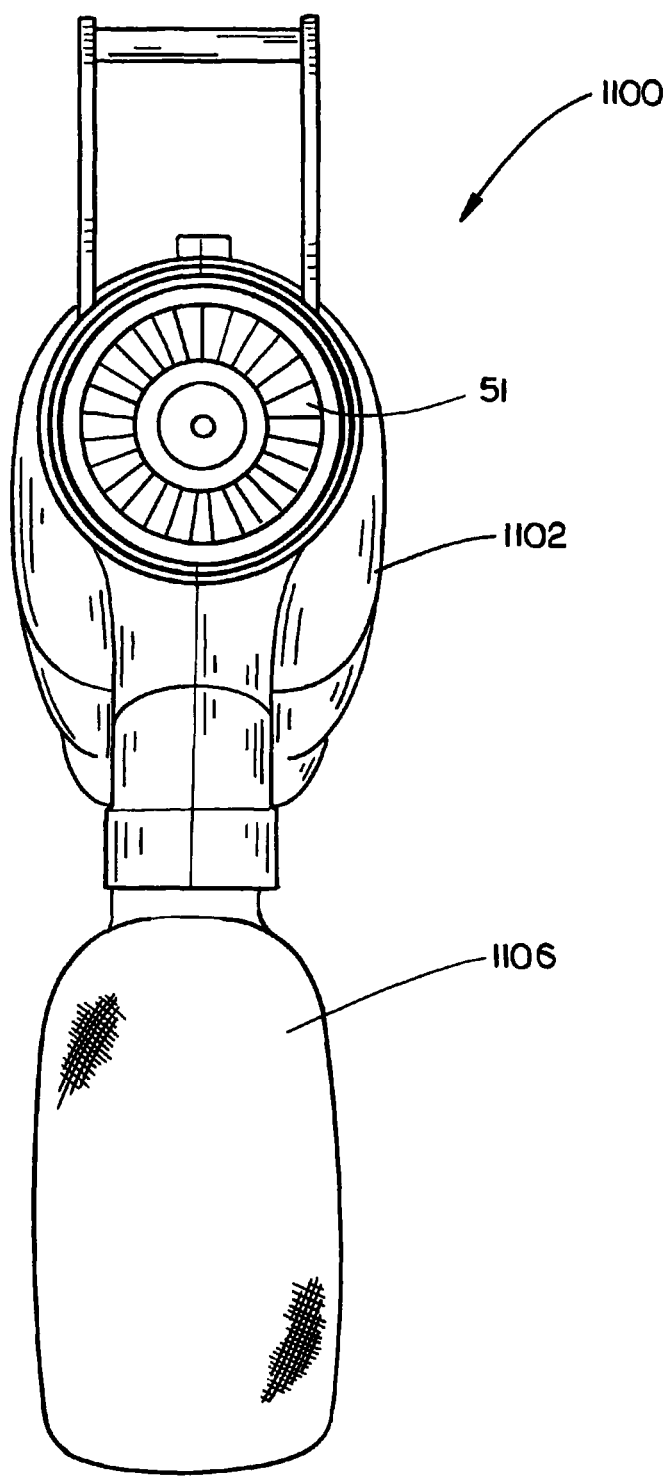
FIG. 39 is bottom view of the blower/vacuum device in vacuum configuration illustrated in FIG. 37.
Figure 40:
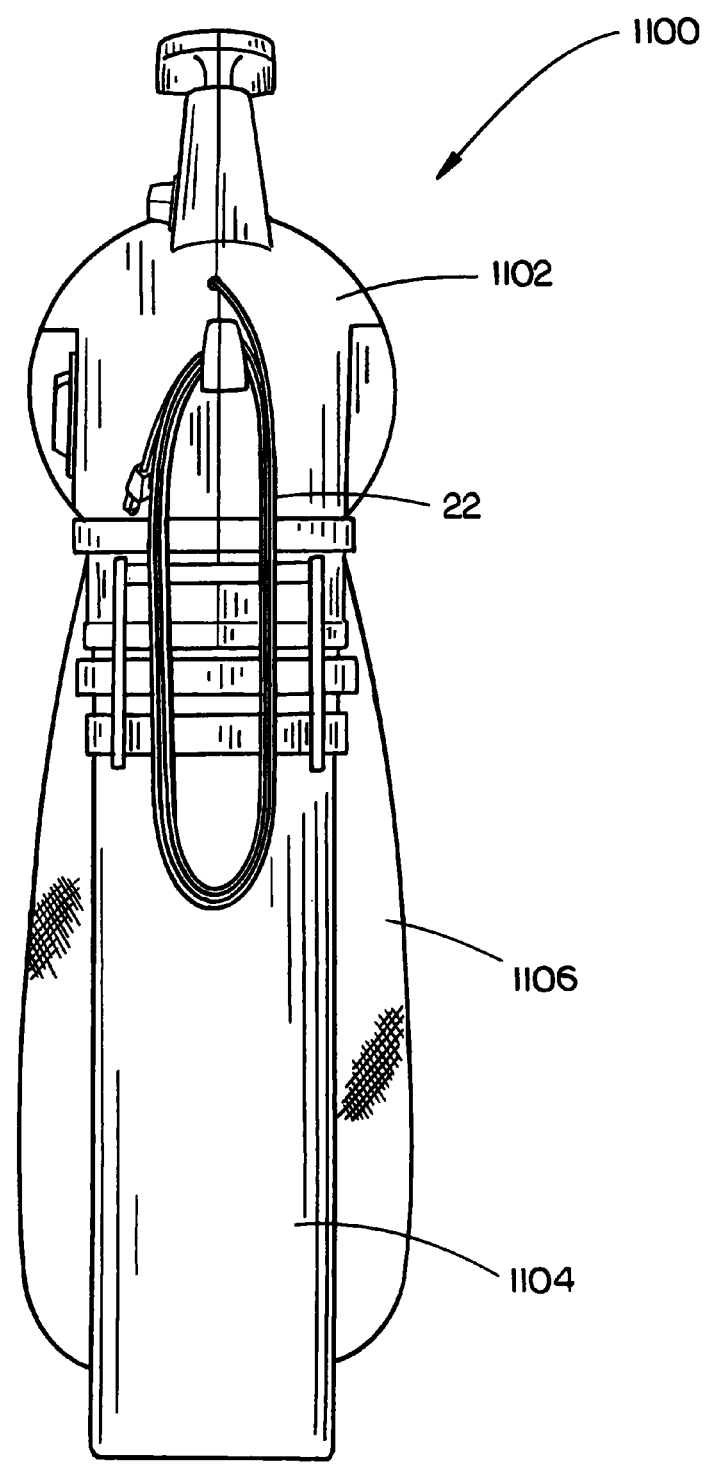
FIG. 40 is rear elevation view of the blower/vacuum device with AC power cord in vacuum configuration illustrated in FIG. 37.
Figure 41:
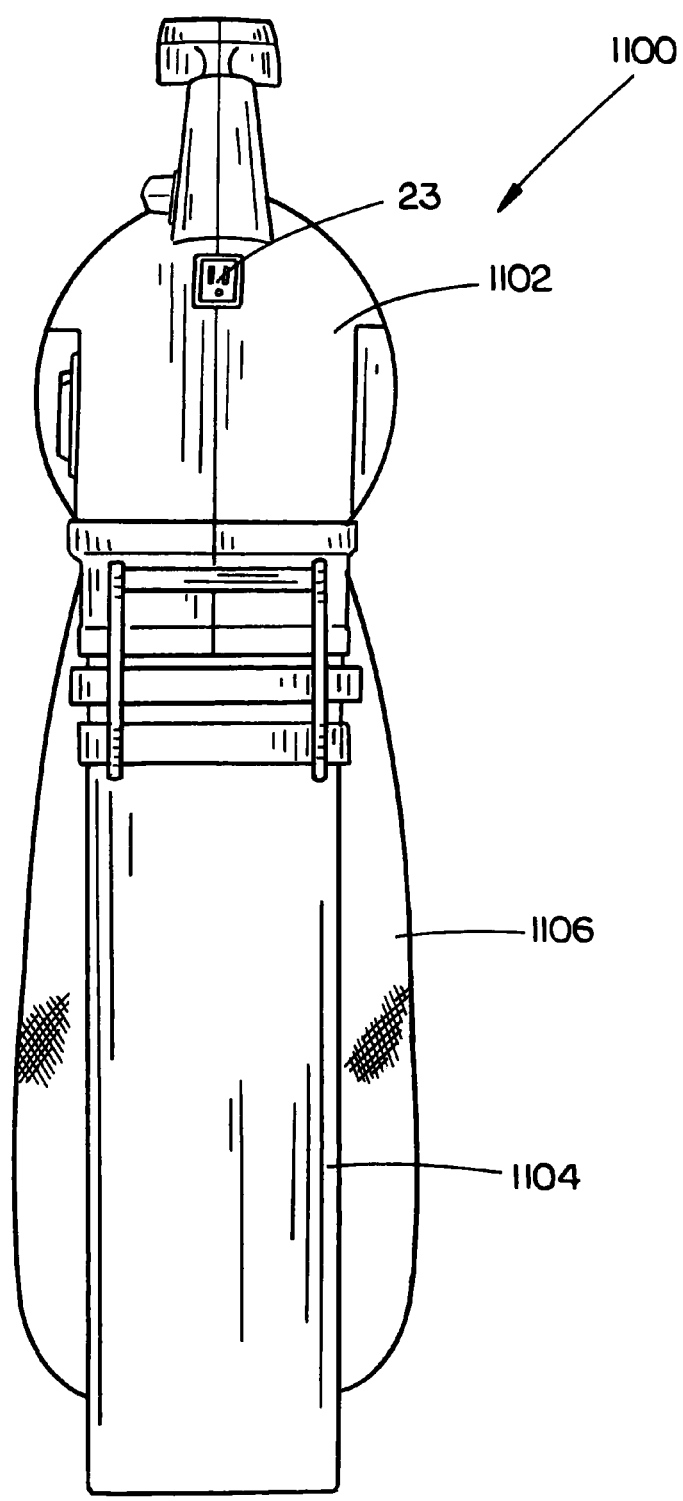
FIG. 41 is rear elevation view of the blower/vacuum device with AC receiver in vacuum configuration illustrated in FIG. 37.
Figure 42:
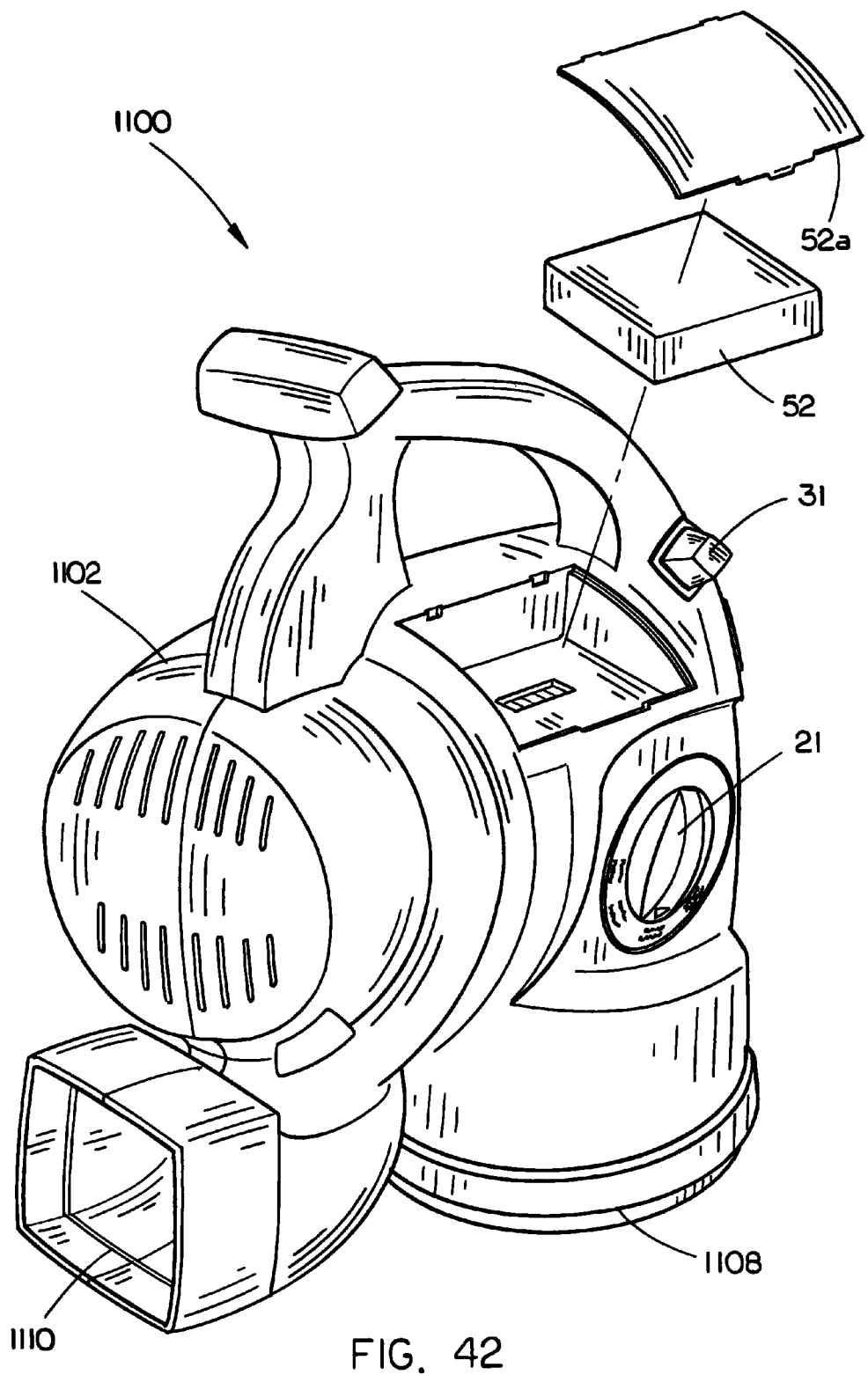
FIG. 42 is a perspective view of the blower/vacuum device illustrated in FIG. 37.
Figure 43:
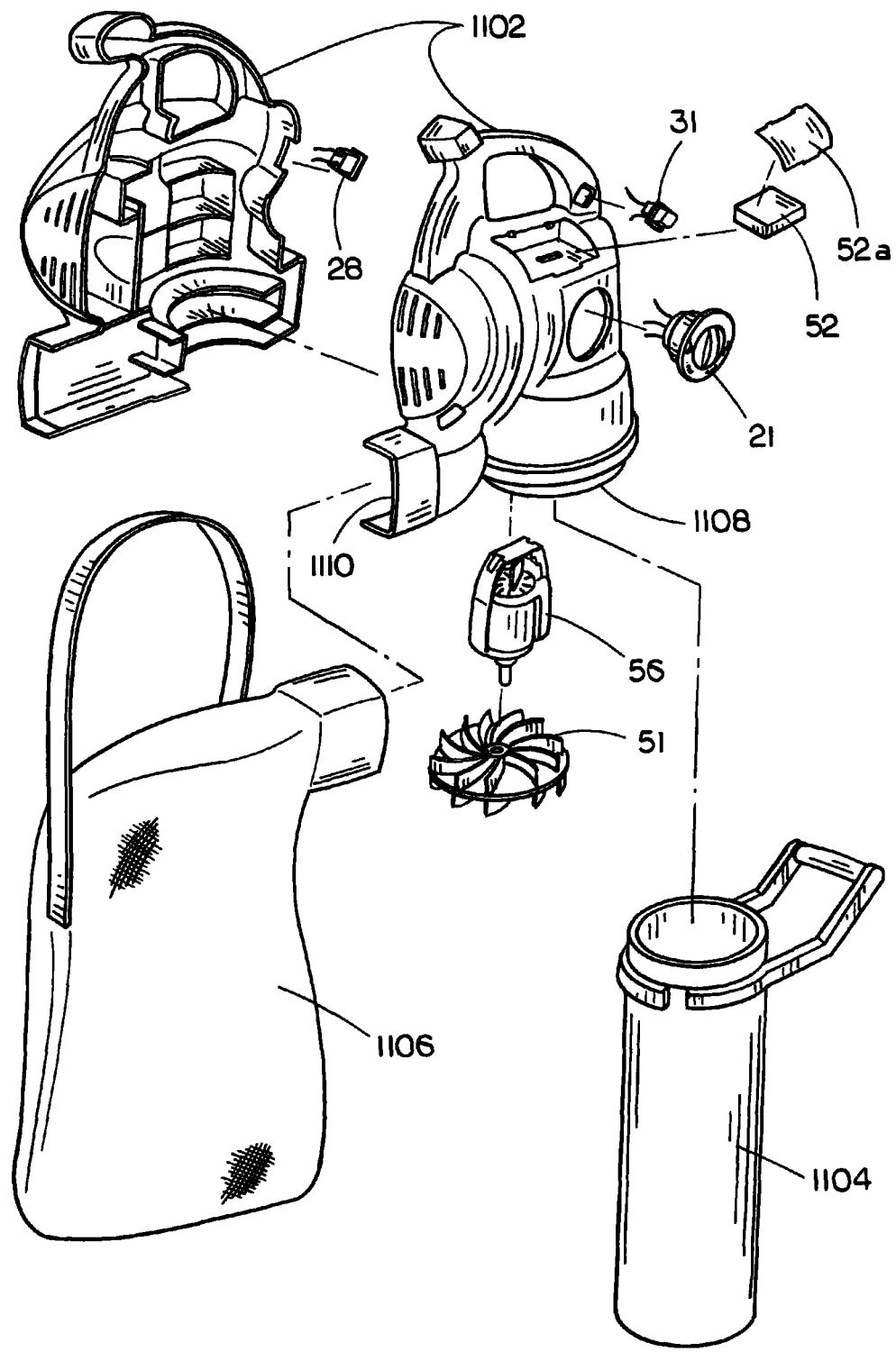
FIG. 43 is an exploded isometric view of the blower/vacuum device in vacuum configuration illustrated in FIG. 37.

Still another hybrid electric device example, a floor polisher 400, is depicted in FIG. 35. In a specific embodiment, a floor polisher 400 comprises a housing including a motor 56 and a shaft to transfer rotational energy to a rotary brush 402 mounted to the bottom portion of the housing. The housing is supported by a plurality of wheels. During operation of the floor polisher, the rotary brush 402 establishes contacts with the floor beneath the brush. The rotary forces of the brush 402 polish the floor beneath the brush 402 along the path of the floor polisher guided by an operator. In an alternative embodiment, as depicted in FIG. 36, additional motors and brushes may be utilized to increase the area being polished. It is appreciated that circuitry configuration presented in the present invention may be utilized by the floor polishers with more than one motors to selectively connected the motors in series or in parallel.

Figure 44:
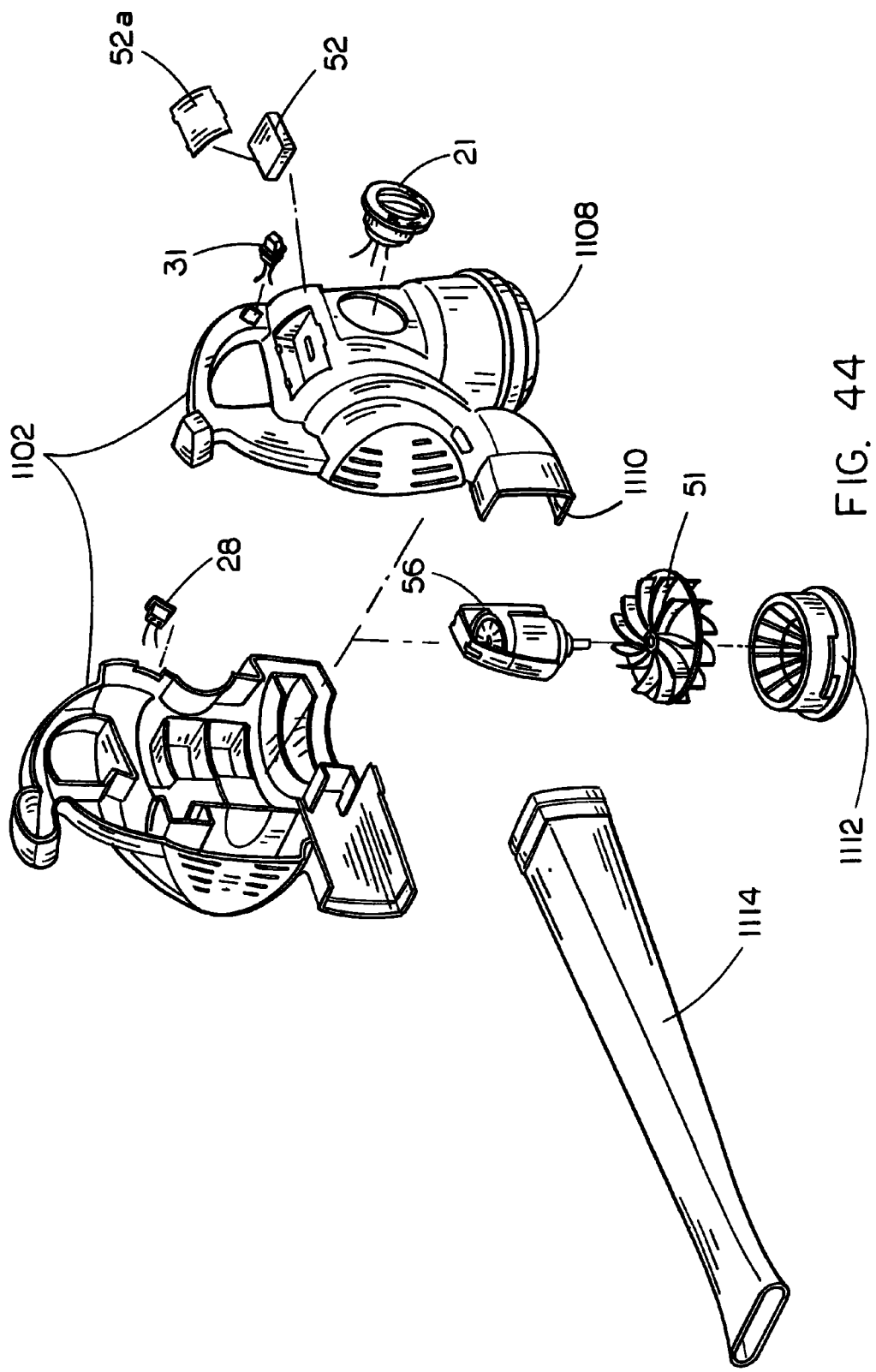
FIG. 44 is an exploded isometric view of the blower/vacuum device in blower configuration.

Still another hybrid electric device example, a blower/vacuum device 1100, is depicted in FIGS. 37 to 44. A motor housing 1102 having a motor 56 and a shaft to transfer rotational energy to an impeller 51. The rotation of the impeller moves air from an inlet air way 1108 towards an outlet air way 1110. In blower mode, as shown in FIG. 44, a cover 1112 is removably attached to the inlet air way 1108. The cover 1112 is designed with a plurality of apertures to let air flow through, while providing protection against larger matters. Air drawn by the impeller 51 from the inlet air way 1108 is discharged through the outlet air way 1110. A blower tube 1114 is removably attached to the outlet air way 1110 to help concentrating the discharged air for cleaning purposes. In vacuum mode, as shown in FIGS. 37 to 43, the cover is removed and a vacuum tube 1104 is removably attached to the inlet air way 1108. The blower tube is removed and a waste collector 1106 is removably attached to the outlet air way 1110. During operation in vacuum mode, matters are drawn through the vacuum tube into the housing, where the impeller 51 chops the matters into smaller pieces. These smaller pieces are disposed of through the outlet air way 1110 into the waste collector 1106.

It is contemplated that other hybrid powered devices may be utilized as well, including indoor and outdoor devices similar to the vacuum cleaner and the floor polisher for household and commercial property maintenance. Moreover, it will be appreciated that these devices may include a variety of working elements. Further, these working elements may be provided in various quantities. For example, one hybrid electric device may include two working elements (and various types and combinations of motors for driving the working elements as needed), while another hybrid device may include three working elements (with an appropriate number and configuration of motors as needed).

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A cleaning device, comprising:
 a housing configured with a working element;
 a stepper motor configured for urging motion of the working element;
 a power control module, the power control module configurable for being in electrical connection with at least one of the motor, a first power source configuration and a second power source configuration, a electric current is provided to the motor by at least one of the first and the second power source configuration, the first power source configuration configurable for being electrically connected to a battery assembly having a Direct Current (DC) power output, the second power source configuration configurable for being electrically connected to a power inverter, the power inverter configured for receiving an Alternating Current (AC) power and further configured for outputting a DC power to the second power source configuration; and an electronic controller, the electronic controller configurable for controlling the electric current provided to the motor;

wherein the motor receives power via the power control module from at least one of the first power source configuration and the second power source configuration.

2. The cleaning device as claimed in claim 1, wherein the working element is a rotary element.

3. The cleaning device as claimed in claim 2, wherein the working element has a maximum rotational speed of a predetermined level.

4. The cleaning device as claimed in claim 2, further comprising a feedback sensor to maintain the rotational speed of the working element.

5. The cleaning device as claimed in claim 2, wherein the rotational speed of the working element is controlled by adjusting voltage of the electric current provided to the motor.

6. The cleaning device as claimed in claim 5, wherein the voltage is adjustable using the electronic controller to at least one of 72 V, 80 V and 90 V.

7. The cleaning device as claimed in claim 2, wherein the rotational speed of the working element is adjustable to balance power consumption requirements.

8. The cleaning device as claimed in claim 7, wherein power consumption is balanced to achieve a desired operation time.

9. A cleaning device, comprising:
a housing configured with a working element;
a motor configured for urging motion of the working element;
a power control module, the power control module configurable for being in electrical connection with the motor, a first power source configuration and a second power source configuration, a electric current is provided to the motor by both of the first and the second power source configuration simultaneously, the first power source configuration configurable for being electrically connected to a battery assembly having a Direct Current (DC) power output, the second power source configuration configurable for being electrically connected to a power inverter, the power inverter configured for receiving an Alternating Current (AC) power and further configured for outputting a DC power to the second power source configuration; and an electronic controller, the electronic controller configurable for controlling the electric current provided to the motor;

wherein the motor receives power via the power control module from both of the first power source configuration and the second power source configuration simultaneously.

10. The cleaning device as claimed in claim 9, wherein the motor is a brushless DC motor.

11. The cleaning device as claimed in claim 9, wherein the motor is a switched reluctance motor.

12. The cleaning device as claimed in claim 9, wherein the motor is a stepper motor.

13. The cleaning device as claimed in claim 9, wherein the working element is a rotary element.

14. The cleaning device as claimed in claim 13, wherein the working element has a maximum rotational speed of a predetermined level.

15. The cleaning device as claimed in claim 13, further comprising a feedback sensor to maintain the rotational speed of the working element.

16. The cleaning device as claimed in claim 13, wherein the rotational speed of the working element is controlled by adjusting voltage of the electric current provided to the motor.

17. The cleaning device as claimed in claim 16, wherein the voltage is adjustable using the electronic controller to at least one of 72 V, 80 V and 90 V.

18. The cleaning device as claimed in claim 13, wherein the rotational speed of the working element is adjustable to balance power consumption requirements.

19. The cleaning device as claimed in claim 18, wherein power consumption is balanced to achieve a desired operation time.

* * * * *